US010182083B2

(12) United States Patent
Cannon et al.

(10) Patent No.: US 10,182,083 B2
(45) Date of Patent: Jan. 15, 2019

(54) SYSTEM AND METHOD FOR ELECTRONIC DATA RECONCILIATION AND CLEARING

(71) Applicant: Commodities Square LLC, Stamford, CT (US)

(72) Inventors: Tim Cannon, Ridgewood, NJ (US); Marc Lefebvre, Southport, CT (US); Greg Drillock, Pleasantville, NY (US)

(73) Assignee: COMMODITIES SQUARE LLC, Stamford, CT (US)

( * ) Notice: Subject to any disclaimer, the term of this patent is extended or adjusted under 35 U.S.C. 154(b) by 365 days.

(21) Appl. No.: 14/634,327

(22) Filed: Feb. 27, 2015

(65) Prior Publication Data

US 2015/0242456 A1 Aug. 27, 2015

Related U.S. Application Data

(60) Provisional application No. 61/945,575, filed on Feb. 27, 2014.

(51) Int. Cl.
*G06Q 10/10* (2012.01)
*H04L 29/06* (2006.01)

(52) U.S. Cl.
CPC ......... *H04L 65/403* (2013.01); *G06Q 10/101* (2013.01)

(58) Field of Classification Search
None
See application file for complete search history.

(56) References Cited

U.S. PATENT DOCUMENTS

| | | | |
|---|---|---|---|
| 6,073,114 | A | 6/2000 | Perkins, III et al. |
| 6,260,043 | B1 | 7/2001 | Puri et al. |
| 7,131,585 | B2 | 11/2006 | Gyi et al. |
| 7,518,511 | B1 | 4/2009 | Panja et al. |
| 7,783,557 | B2 | 8/2010 | Laurent et al. |
| 7,805,340 | B2 | 9/2010 | Blakeslee et al. |
| 7,810,025 | B2 | 10/2010 | Blair et al. |
| 8,005,743 | B2 | 8/2011 | Tupper et al. |
| 8,094,976 | B2 | 1/2012 | Berard et al. |
| 8,209,236 | B2 | 6/2012 | Stone et al. |
| 8,392,292 | B2 | 3/2013 | Heitner et al. |
| 8,504,464 | B2 | 8/2013 | Laurent et al. |
| 2002/0010661 | A1 | 1/2002 | Waddington et al. |
| 2003/0028388 | A1 | 2/2003 | Jorgenson |
| 2003/0135428 | A1 | 7/2003 | Smith |
| 2003/0149674 | A1 | 8/2003 | Good et al. |

(Continued)

*Primary Examiner* — Mark D Featherstone
*Assistant Examiner* — Ranjit P Doraiswamy
(74) *Attorney, Agent, or Firm* — Leason Ellis LLP

(57) ABSTRACT

Electronic source information is reconciled by normalizing at least some electronic source information, transport information and destination information by applying a plurality of rules to extract the information into at least one schema. At least some of the normalized information is identified to contain at least one discrepancy or missing data record, and reconciliation information is provided in a graphical user interface. Electronic information is received that reconciles the discrepancy or the missing record, and the reconciled and normalized electronic source, transport and destination information is processed to provide data analytics. A report is generated that represents the data analytics and that is output to at least one user. This can occur in one or more implementations of the present application.

20 Claims, 82 Drawing Sheets

(56) References Cited

U.S. PATENT DOCUMENTS

| | | | |
|---|---|---|---|
| 2004/0054607 A1 | 3/2004 | Waddington et al. | |
| 2004/0117373 A1 | 6/2004 | Yeung et al. | |
| 2005/0187852 A1* | 8/2005 | Hwang | G06Q 40/02 705/36 R |
| 2005/0187871 A1 | 8/2005 | Yeung et al. | |
| 2006/0080242 A1 | 4/2006 | Yeung et al. | |
| 2007/0016459 A1* | 1/2007 | King | G06Q 10/087 705/28 |
| 2008/0154677 A1 | 6/2008 | Casey | |
| 2008/0162311 A1 | 7/2008 | Hendrix et al. | |
| 2008/0168109 A1* | 7/2008 | Gaurav | G06F 17/30297 |
| 2008/0262959 A1 | 10/2008 | Tupper | |
| 2010/0023431 A1 | 1/2010 | Kano | |
| 2010/0036674 A1 | 2/2010 | Johnson | |
| 2010/0250338 A1* | 9/2010 | Banerjee | G06Q 20/20 705/16 |
| 2012/0072266 A1 | 3/2012 | Schullian et al. | |
| 2013/0024330 A1 | 1/2013 | Christie et al. | |
| 2013/0304614 A1 | 11/2013 | Christie et al. | |
| 2014/0019312 A1 | 1/2014 | Renz | |
| 2014/0136440 A1* | 5/2014 | Ahmed | G06Q 10/10 705/342 |

* cited by examiner

150

300

400

500

600

800

900

1000

1200

FIG.13
Data 1
Acct 3
Acct 3
Acct 2
Acct 2
Acct 2
Acct 2
Acct 2
Acct 1
Loc 2
Loc 2
Loc 2
Loc 2
Loc 2
Loc 2
Loc 2
Loc 1
Acct 2

1300

1400

1800

1900

2100

2200

2300

2400

2500

2600

3000

3100

3230

3250

3300

3400

3500

4000

4100

4200

4300

4400

4600

4700

4800

5000

5002

5004

5300

5500

5800

6200

| DELIVERED VOL | Column Labels | | | | | | | |
|---|---|---|---|---|---|---|---|---|
| Row Labels | Lease C 14 | Lease C 16 | Lease C 19 | Lease C 2 | Lease C 22 | Lease C 23 | Lease C 24 | Grand Total |
| 2013-12-01 | | 457.58 | 647.52 | 230.45 | | 960.65 | 450.06 | 2746.26 |
| 2013-12-02 | | | 65.13 | 231.29 | | | | 296.42 |
| 2013-12-03 | 249.95 | | 214.17 | 202.07 | | | 121.07 | 787.26 |
| 2013-12-04 | | 242.56 | 492.23 | | | 938.53 | 476.77 | 2150.09 |
| 2013-12-05 | | | 722.68 | 246.74 | | 471.35 | | 1440.77 |
| 2013-12-06 | | | | 243.40 | | 350.70 | | 594.10 |
| 2013-12-07 | | 231.29 | | | | | | 231.29 |
| 2013-12-08 | | | | | 476.78 | 231.29 | | 708.07 |
| Grand Total | 249.95 | 931.43 | 2141.73 | 1153.95 | 476.78 | 2952.52 | 1047.90 | 8954.26 |

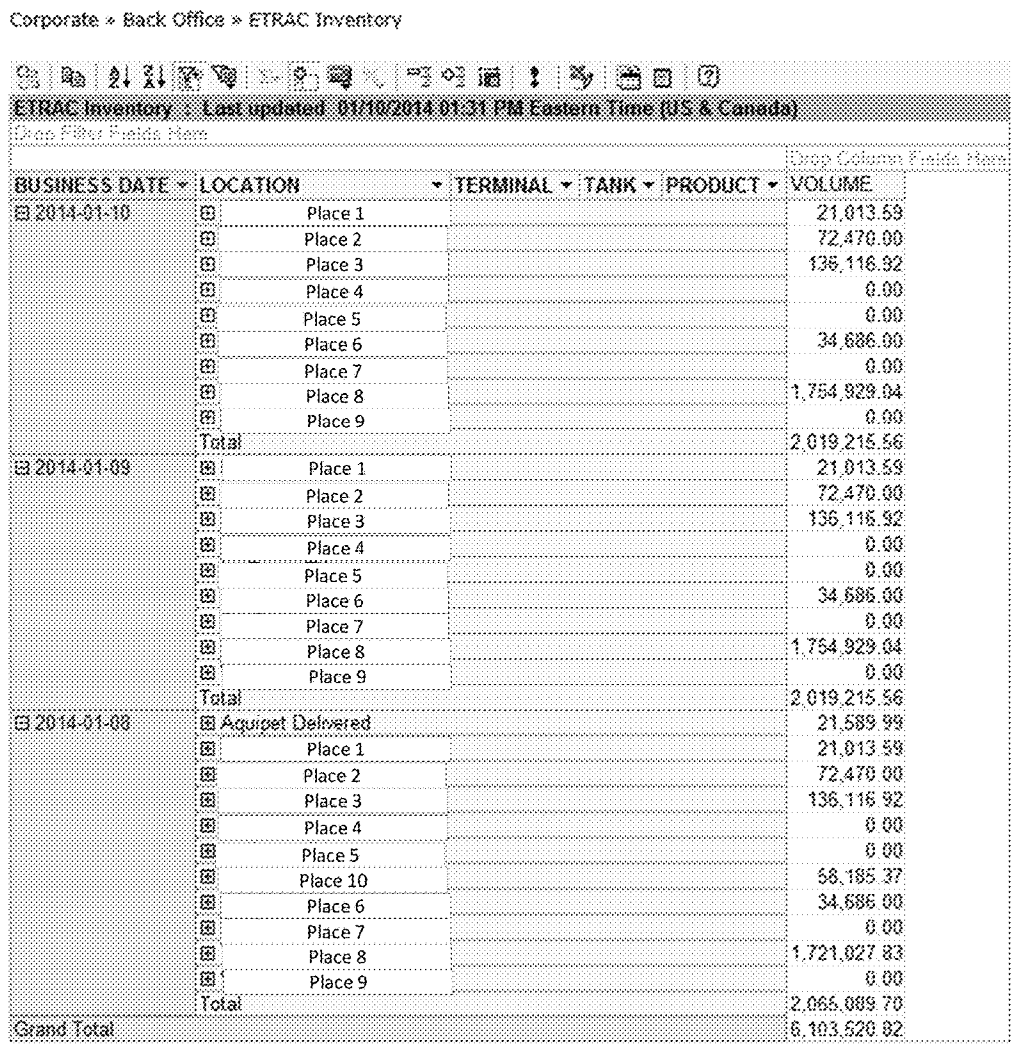
Corporate » Back Office » ETRAC Inventory

ETRAC Inventory : Last updated 01/10/2014 01:31 PM Eastern Time (US & Canada)

Drop Filter Fields Here

Drop Column Fields Here

| BUSINESS DATE | LOCATION | TERMINAL | TANK | PRODUCT | VOLUME |
|---|---|---|---|---|---|
| 2014-01-10 | Place 1 | | | | 21,013.59 |
| | Place 2 | | | | 72,470.00 |
| | Place 3 | | | | 136,116.92 |
| | Place 4 | | | | 0.00 |
| | Place 5 | | | | 0.00 |
| | Place 6 | | | | 34,686.00 |
| | Place 7 | | | | 0.00 |
| | Place 8 | | | | 1,754,929.04 |
| | Place 9 | | | | 0.00 |
| | Total | | | | 2,019,215.56 |
| 2014-01-09 | Place 1 | | | | 21,013.59 |
| | Place 2 | | | | 72,470.00 |
| | Place 3 | | | | 136,116.92 |
| | Place 4 | | | | 0.00 |
| | Place 5 | | | | 0.00 |
| | Place 6 | | | | 34,686.00 |
| | Place 7 | | | | 0.00 |
| | Place 8 | | | | 1,754,929.04 |
| | Place 9 | | | | 0.00 |
| | Total | | | | 2,019,215.56 |
| 2014-01-08 | Aguget Delivered | | | | 21,589.99 |
| | Place 1 | | | | 21,013.59 |
| | Place 2 | | | | 72,470.00 |
| | Place 3 | | | | 136,116.92 |
| | Place 4 | | | | 0.00 |
| | Place 5 | | | | 0.00 |
| | Place 10 | | | | 58,185.37 |
| | Place 6 | | | | 34,686.00 |
| | Place 7 | | | | 0.00 |
| | Place 8 | | | | 1,721,027.83 |
| | Place 9 | | | | 0.00 |
| | Total | | | | 2,066,089.70 |
| Grand Total | | | | | 6,103,520.82 |

Figure 68:
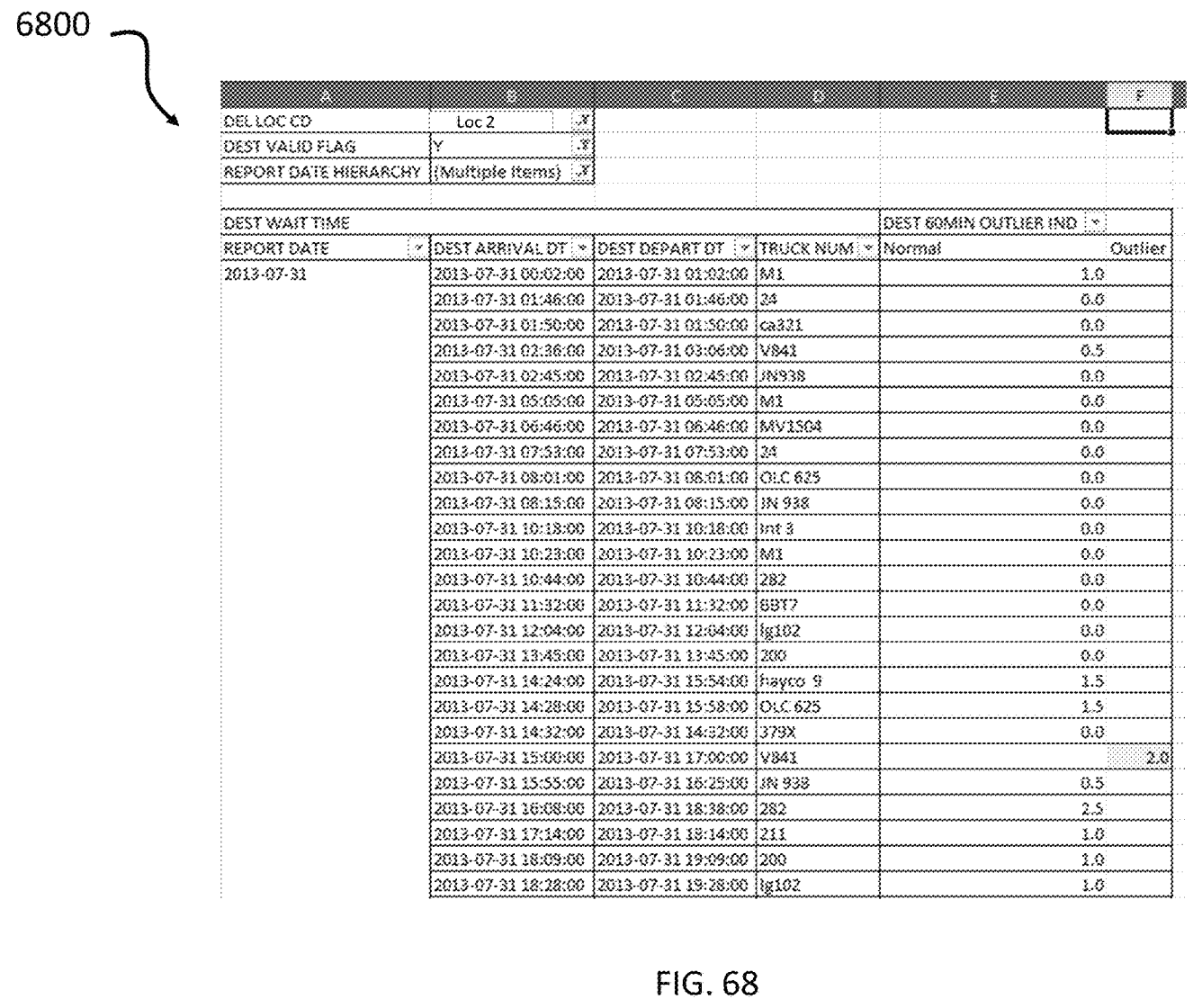

| DEL LOC CD | Loc 2 | | | | |
|---|---|---|---|---|---|
| DEST VALID FLAG | Y | | | | |
| REPORT DATE HIERARCHY | (Multiple Items) | | | | |
| | | | | | |
| DEST WAIT TIME | | | | DEST 60MIN OUTLIER IND | |
| REPORT DATE | DEST ARRIVAL DT | DEST DEPART DT | TRUCK NUM | Normal | Outlier |
| 2013-07-31 | 2013-07-31 00:02:00 | 2013-07-31 01:02:00 | M1 | 1.0 | |
| | 2013-07-31 01:46:00 | 2013-07-31 01:46:00 | 34 | 0.0 | |
| | 2013-07-31 01:50:00 | 2013-07-31 01:50:00 | ca331 | 0.0 | |
| | 2013-07-31 02:36:00 | 2013-07-31 03:06:00 | V841 | 0.5 | |
| | 2013-07-31 02:45:00 | 2013-07-31 02:45:00 | JN938 | 0.0 | |
| | 2013-07-31 05:05:00 | 2013-07-31 05:05:00 | M1 | 0.0 | |
| | 2013-07-31 06:46:00 | 2013-07-31 06:46:00 | MV1504 | 0.0 | |
| | 2013-07-31 07:53:00 | 2013-07-31 07:53:00 | 34 | 0.0 | |
| | 2013-07-31 08:01:00 | 2013-07-31 08:01:00 | OLC 625 | 0.0 | |
| | 2013-07-31 08:15:00 | 2013-07-31 08:15:00 | JN 938 | 0.0 | |
| | 2013-07-31 10:18:00 | 2013-07-31 10:18:00 | Int 3 | 0.0 | |
| | 2013-07-31 10:23:00 | 2013-07-31 10:23:00 | M1 | 0.0 | |
| | 2013-07-31 10:44:00 | 2013-07-31 10:44:00 | 282 | 0.0 | |
| | 2013-07-31 11:32:00 | 2013-07-31 11:32:00 | BBT7 | 0.0 | |
| | 2013-07-31 12:04:00 | 2013-07-31 12:04:00 | lg102 | 0.0 | |
| | 2013-07-31 13:45:00 | 2013-07-31 13:45:00 | 200 | 0.0 | |
| | 2013-07-31 14:24:00 | 2013-07-31 15:54:00 | hayco 9 | 1.5 | |
| | 2013-07-31 14:28:00 | 2013-07-31 15:58:00 | OLC 625 | 1.5 | |
| | 2013-07-31 14:32:00 | 2013-07-31 14:32:00 | 379X | 0.0 | |
| | 2013-07-31 15:00:00 | 2013-07-31 17:00:00 | V841 | | 2.0 |
| | 2013-07-31 15:55:00 | 2013-07-31 16:25:00 | JN 938 | 0.5 | |
| | 2013-07-31 16:08:00 | 2013-07-31 18:38:00 | 282 | 2.5 | |
| | 2013-07-31 17:14:00 | 2013-07-31 18:14:00 | 211 | 1.0 | |
| | 2013-07-31 18:09:00 | 2013-07-31 19:09:00 | 200 | 1.0 | |
| | 2013-07-31 18:28:00 | 2013-07-31 19:28:00 | lg102 | 1.0 | |

Figure 70:
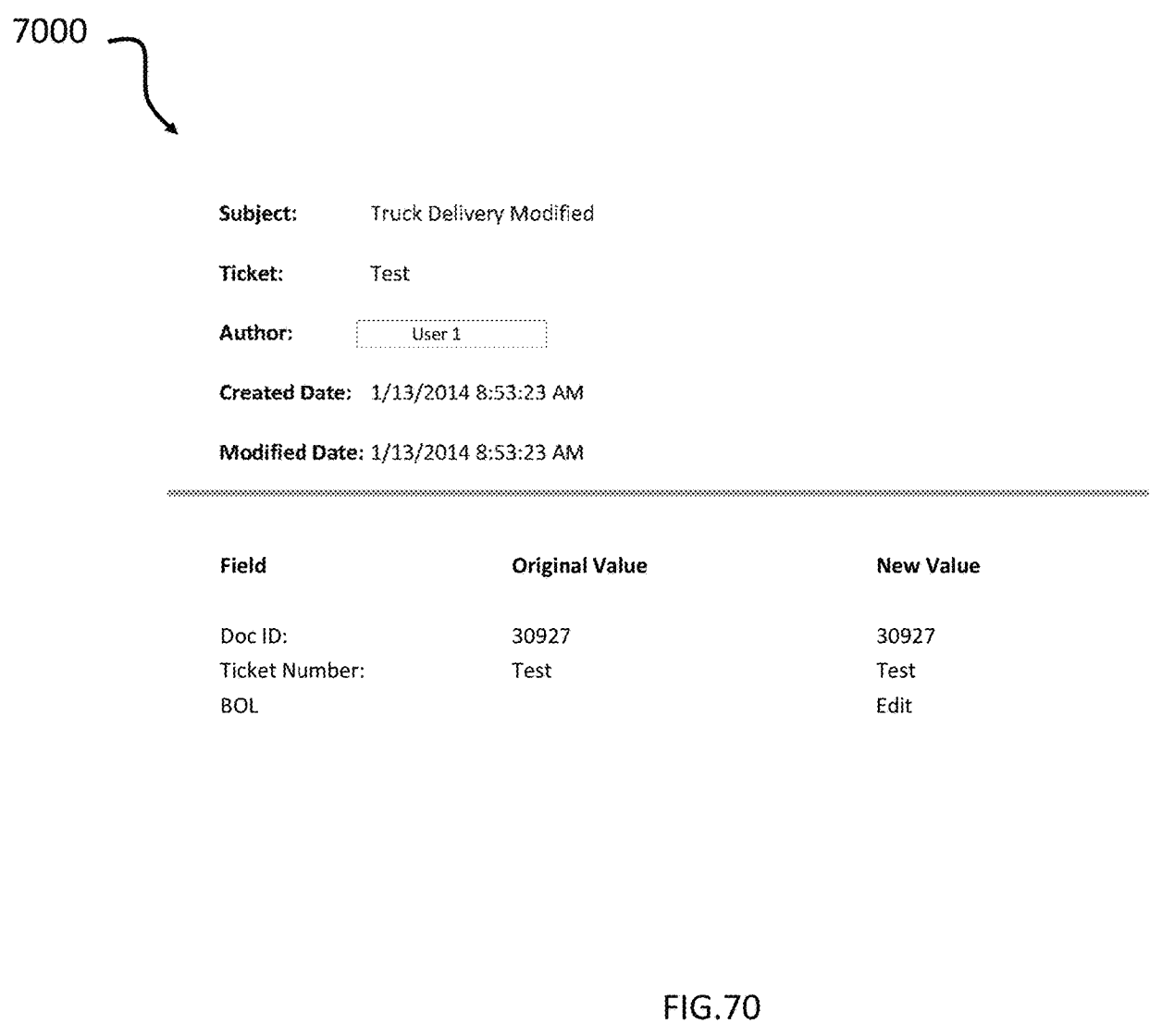

Subject: Truck Delivery Modified

Ticket: Test

Author: User 1

Created Date: 1/13/2014 8:53:23 AM

Modified Date: 1/13/2014 8:53:23 AM

| **Field** | **Original Value** | **New Value** |
|---|---|---|
| Doc ID: | 30927 | 30927 |
| Ticket Number: | Test | Test |
| BOL | | Edit |

Figure 73:
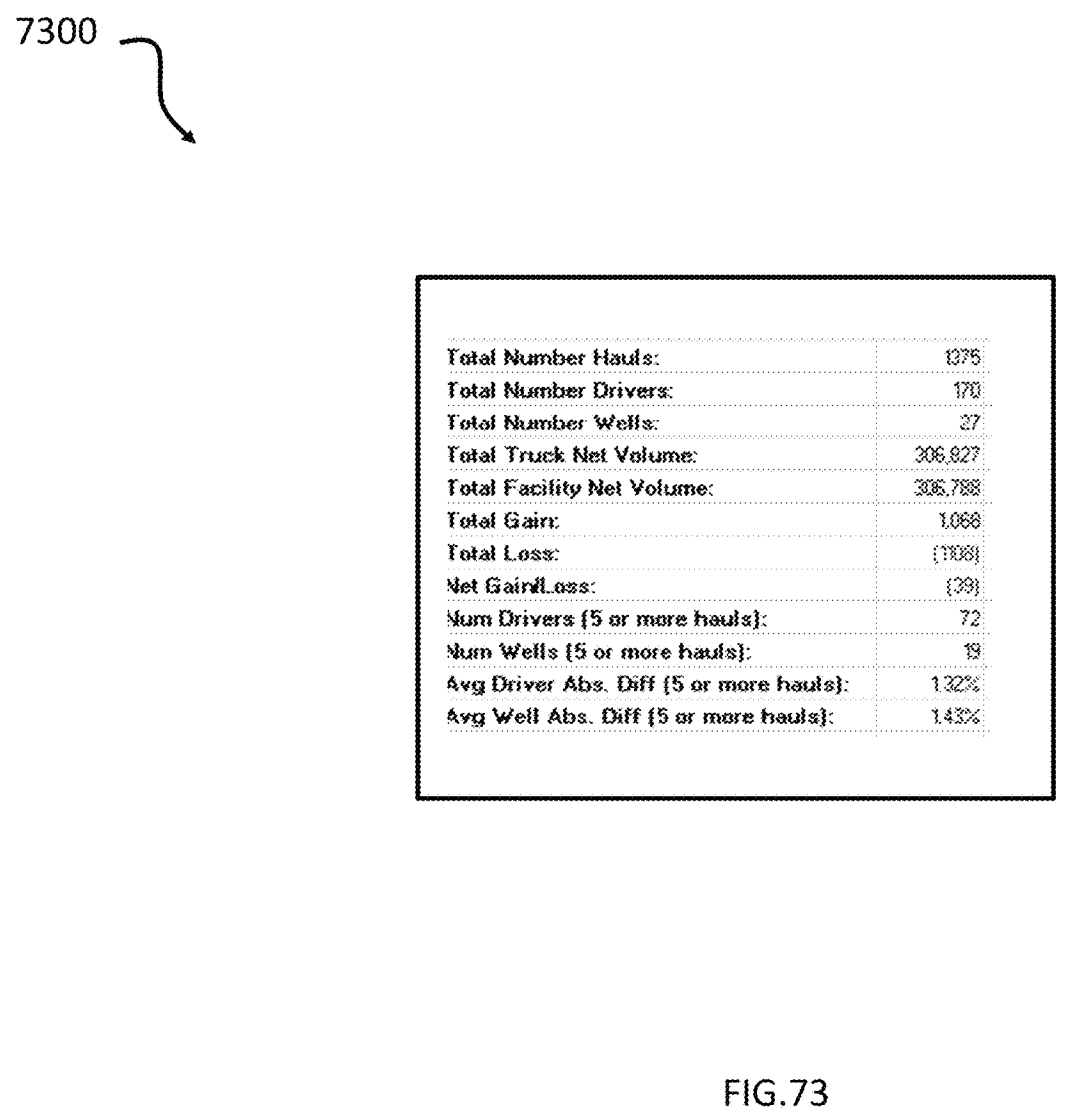

| | |
|---|---|
| Total Number Hauls: | 1375 |
| Total Number Drivers: | 170 |
| Total Number Wells: | 27 |
| Total Truck Net Volume: | 306,827 |
| Total Facility Net Volume: | 306,788 |
| Total Gain: | 1,068 |
| Total Loss: | (1108) |
| Net Gain/Loss: | (39) |
| Num Drivers (5 or more hauls): | 72 |
| Num Wells (5 or more hauls): | 19 |
| Avg Driver Abs. Diff (5 or more hauls): | 1.32% |
| Avg Well Abs. Diff (5 or more hauls): | 1.43% |

SYSTEM AND METHOD FOR ELECTRONIC DATA RECONCILIATION AND CLEARING

CROSS-REFERENCE TO RELATED APPLICATIONS

This application is based on and claims priority to U.S. Provisional Patent Application Ser. No. 61/945,575, filed on Feb. 27, 2014, which is hereby incorporated by reference as if set forth in its entirety herein.

FIELD OF THE INVENTION

The present invention relates to systems and methods for electronic cloud-based data management, including to reconcile and confirm processed information associated with commodity delivery.

BACKGROUND

Managing information received or processed from multiple parties often includes reconciliation and enrichment processes. Such processes can be cumbersome, incomplete or impractical.

SUMMARY

In one or more implementations, the present application provides systems and methods for reconciling electronic source information associated with a source of a commodity, electronic transport information associated with transport of the commodity and electronic destination information associated with a destination of the transported commodity. Code executing in at least one processor, can reconcile at least some of the electronic source information, the electronic transport information and the electronic destination information, wherein the step of normalizing includes applying a plurality of rules to extract the at least some of the electronic source information, the electronic transport information and the electronic destination information into at least one schema. At least some of the normalized electronic source information, the normalized electronic transport information and/or the normalized electronic destination information can be processed to identify at least one discrepancy or missing record. Moreover, reconciliation information is provided to identify the at least one discrepancy or missing record in a graphical user interface that provides an on-line collaboration environment for each of a plurality of users. Electronic information is received from a computing device associated with at least one of the source, transport and destination, that is usable to reconcile the discrepancy or the missing record, and using the received electronic information the at least one discrepancy or missing record is reconciled. Furthermore, the reconciled and normalized electronic source information, the electronic transport information and the electronic destination information is processed to provide data analytics, and a report is generated and output that represents the data analytics.

These and other aspects, features, and advantages can be appreciated from the accompanying description of certain embodiments of the invention and the accompanying drawing figures and claims.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIGS. 61-70 illustrate example data management and reporting functionality associated with one or more implementations of the present application;

FIGS. 72-77 illustrate example reports and graphs for data analytics, including as set forth in the flowchart shown in FIG. 71, in accordance with one or more example implementations;

DETAILED DESCRIPTION

In accordance with one or more implementations, systems and methods for electronic clearing via one or more data and/or communication networks ("cloud-based") processing are provided, for example, that reconcile and confirm many or all data points associated with commodity delivery. For example, truck and rail delivery information is received, parsed and normalized at least partially automatically to confirm pickup and discharge of a commodity, such as with a producer, inspector, terminal and/or vessel. Moreover, in one or more implementations, an online notification and comments interface is provided that allows companies and individuals to efficiently identify and resolve delivery discrepancies. Further, business intelligence reporting is provided that allows various parties to monitor and respond to delivery information.

Accordingly, disclosed herein is a platform that is configured to capture and parse data in virtually any format, (e.g., PDF, Excel, Word, HTML, XML, or the like) and then normalize and enrich the data into one or more predefined schemas as a function of one or more custom parsers. A document parsing workflow is provided to automate the process, which can be stopped upon receipt of user intervention. After data are successfully extracted into a normalized schema and enriched, the data are eligible for downstream processes, such as for reconciliation, reporting and/or consumption in external systems, such as a trade capture system, an accounting system, an inventory system, a dispatching system, and/or a regulatory system that executes on at least one or more computing device.

The present application can run as a single platform with one or more copies of data shared among users from different companies that are authorized to access the data. Alternatively, the application can run as a plurality of platforms. Document-level and record-level security levels are provided to restrict a user's respective access to data. By providing a shared-data model, users from different companies, for example, are able to view and validate data through the one or more online collaboration mechanisms, which can include processes to record and provide document-level comments, notifications and instant messaging.

Moreover, in one or more implementations, the present application includes a reconciliation process that is configured to compare data between one or more predefined schemas. One purpose of a reconciliation process is to compare data in each of a plurality of data sets and to identify any discrepancies and/or missing records from one or more respective data sets. The reconciliation processes further allow comparisons of any one data set to multiple data sets. The online collaboration features help users to identify and quickly resolve discrepancies in the data.

Figure 1A:
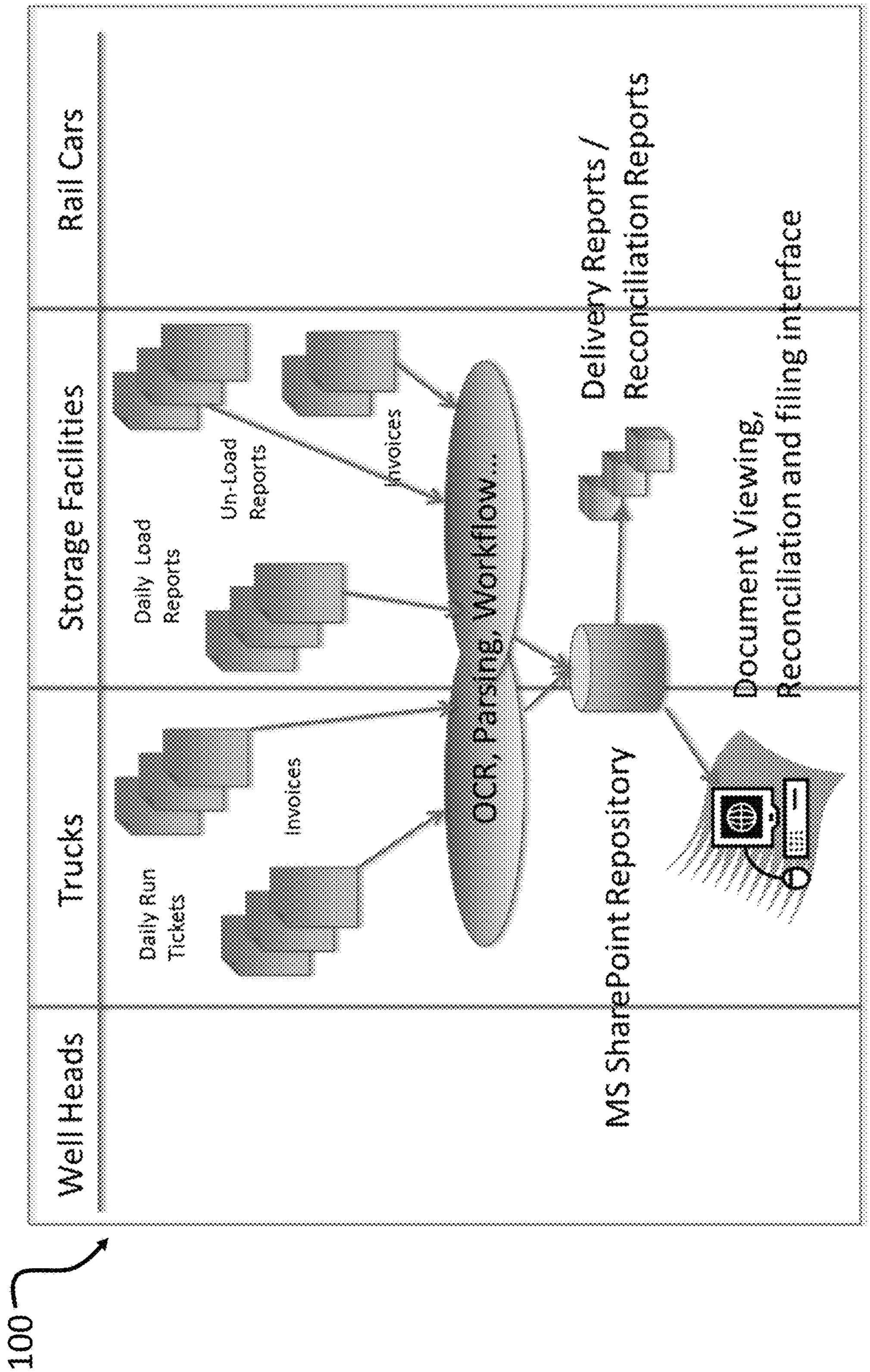
FIGS. 1A and 1B are a block diagrams illustrating a plurality of components and example management of data flow in accordance with certain embodiments of the application.
Figure 1B:
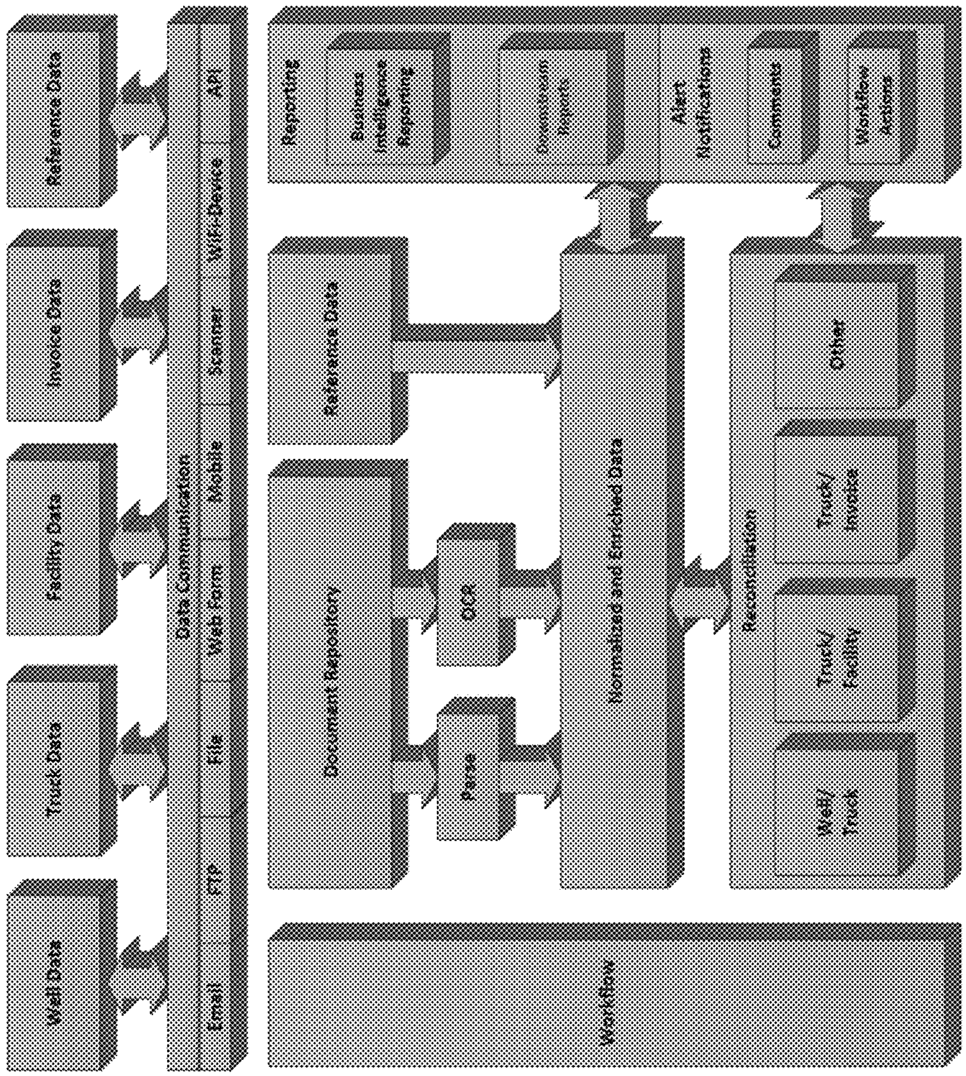

FIGS. 1A and 1B are block diagrams 100 and 150 respectively illustrating a plurality of components and management of data flow in accordance with certain embodiments of the application. As shown in FIGS. 1A and 1B, information is sent to and received from a plurality of sources, such as producers (well data), carriers (truck data), facilities (facility data), business professionals (invoice data) and other sources (reference data). Information can be sent and received via the plurality of data communication protocols and formats, such as email, file transfer protocol, delimited data files, web form data, as well as from various devices such as mobile communication devices, scanners, and/or Wi-Fi devices. Further, information may be available as a function of an application programming interface ("API"). The API can provide a programmatic interface for interacting with the system. For example, the API supports submitting documents, interacting with the inbound document workflow, interacting with the reconciliation workflow and retrieving the enriched and normalized records. The API can also allow for integration with a client's backend inventory, accounting and/or ETRM systems.

Received information can be stored in a document repository and acted on, such as to parse information into usable formats or quantities. Moreover, optical character recognition and/or voice recognition processes can act on one or more files to extract information. Further reference information may be used to act on information received from a plurality of sources and/or parties.

Continuing with reference to the block diagrams shown in FIGS. 1A and 1B, information that is received and processed can, thereafter, be normalized and/or enriched, in accordance with one or more implementations of the present application. For example, information may be reconciled, particularly as it pertains to having originated from various sources. Additionally, normalized and enriched data (and reconciled data) may be used for reporting purposes and/or to provide alerts in one or more contexts. For example, business intelligence reporting or reports for one or more downstream processes can be provided in accordance with the present application. Furthermore, alerts and notifications can include comments or prompts for one or more workflow actions.

Moreover, the present application provides business intelligence reporting that builds reports across one or more data sets, for example, to uncover information that would otherwise not be known if the data sets were not combined. Record-level security can be provided to restrict a user's rights to or from data within the reports.

The present application provides a document viewer that manages processes associated with inbound document parsing and normalization, and can also provide for search capabilities with normalized records. Documents can be received and processed in accordance with the teachings herein, for example, through pre-defined email distribution lists or can be directly imported via an import function. A document viewer can assign users to a set of document types and roles. Each role can control various user rights, such as whether a user has read-only rights, edit rights, administrative rights and/or document approval rights.

Figure 2:
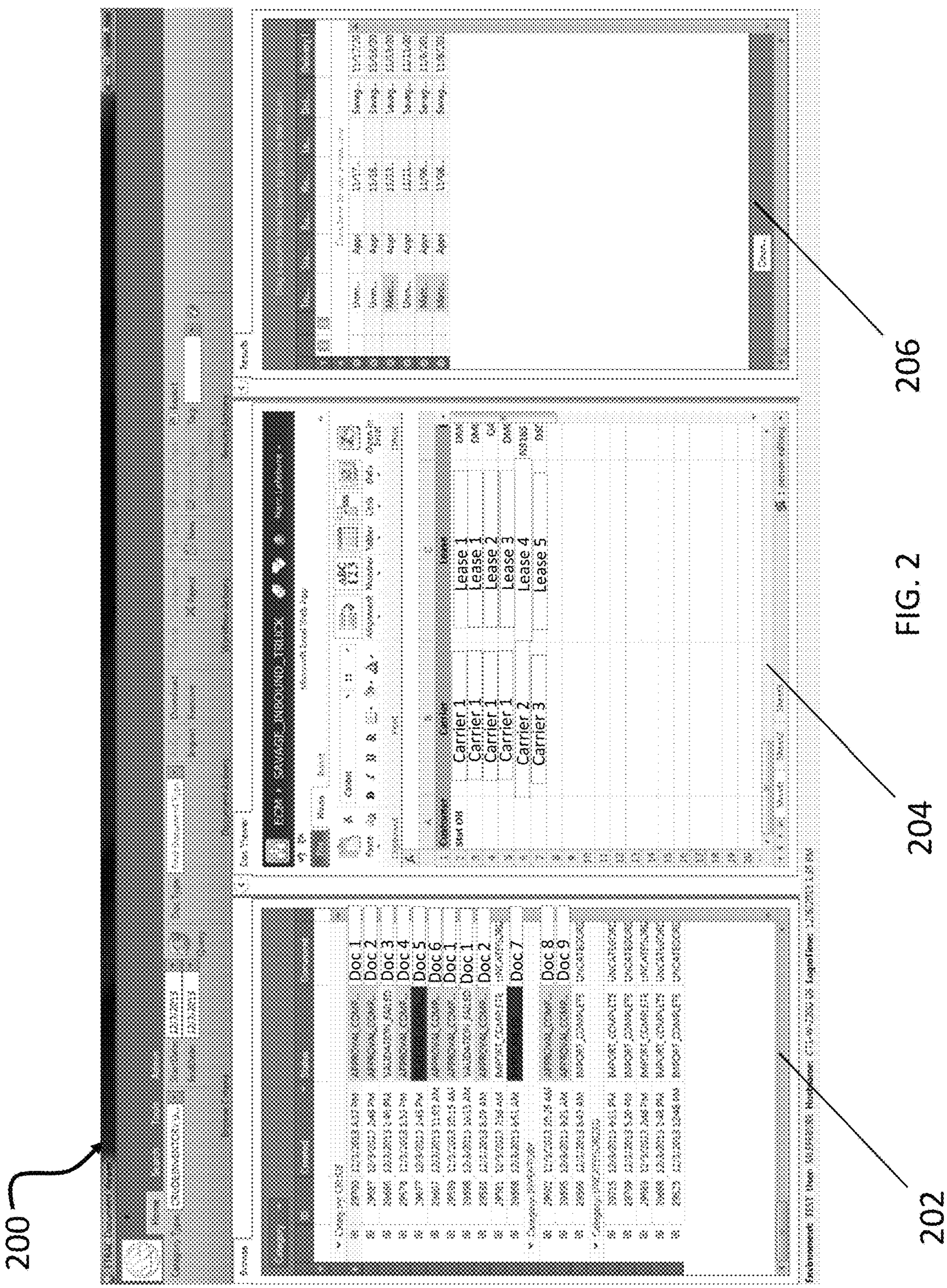
FIG. 2 illustrates an example display screen showing a home screen of an example inbound document queue and identifying a respective state of each document, in accordance with an example implementation of the present application.

FIG. 2 illustrates an example display screen 200 showing a home screen of an example inbound document queue and identifying a respective state of each document. In the implementation shown in FIG. 2, the display screen 200 is divided into three panels: a browse panel 202, a document viewer panel 204 and a results panel 206. As shown in the example display screen 200, the browse panel 202 shows inbound documents (described in greater detail herein) along with respective transport meta-info (e.g., that identifies senders, recipients or the like), as well as current document status. Browse panel 202 also categorizes the document into folders, which makes browsing more efficient. Moreover, a workflow audit trail is exposed in a sub-grid, which can be accessible by the user, such as by selecting the plus sign ("+") at the left of each document, as illustrated in FIG. 2.

Continuing with reference to the example display screen 200 shown in FIG. 2, the document viewer panel 204 shows a document using an "in-application" browser. The document shown in the document viewer panel 204 corresponds to the first (selected) record shown in the browse panel 202. When a user selects (e.g., clicks on) a document in the browse panel 202, the document viewer panel 204 can automatically refresh to display the selected document. In-browser editing and saving can be also supported for one or more document types. Moreover and as illustrated in FIG. 2, the right-most results panel 206 displays normalized and enriched data that were extracted from the document. This results panel 206 can identify for the user any validation errors in the data, as well as any duplicate records. The user can be provided with options to correct the data, as well as to accept, reject or clear any duplicate records. The operations can be performed in bulk and on multiple records, such as by using graphical screen controls (e.g., buttons) in the ribbon bar. Alternatively, operations can be performed for individual records, such as by right clicking on a record.

The inbound document browse panel displays current inbound documents along with a workflow state of a respective document. Relevant inbound information, such as time of import, email sender, document type, or the like, is displayed in the browse panel 202. Moreover, an audit history can be displayed that illustrates the times when a document transitioned through the various workflow states.

Figure 3:
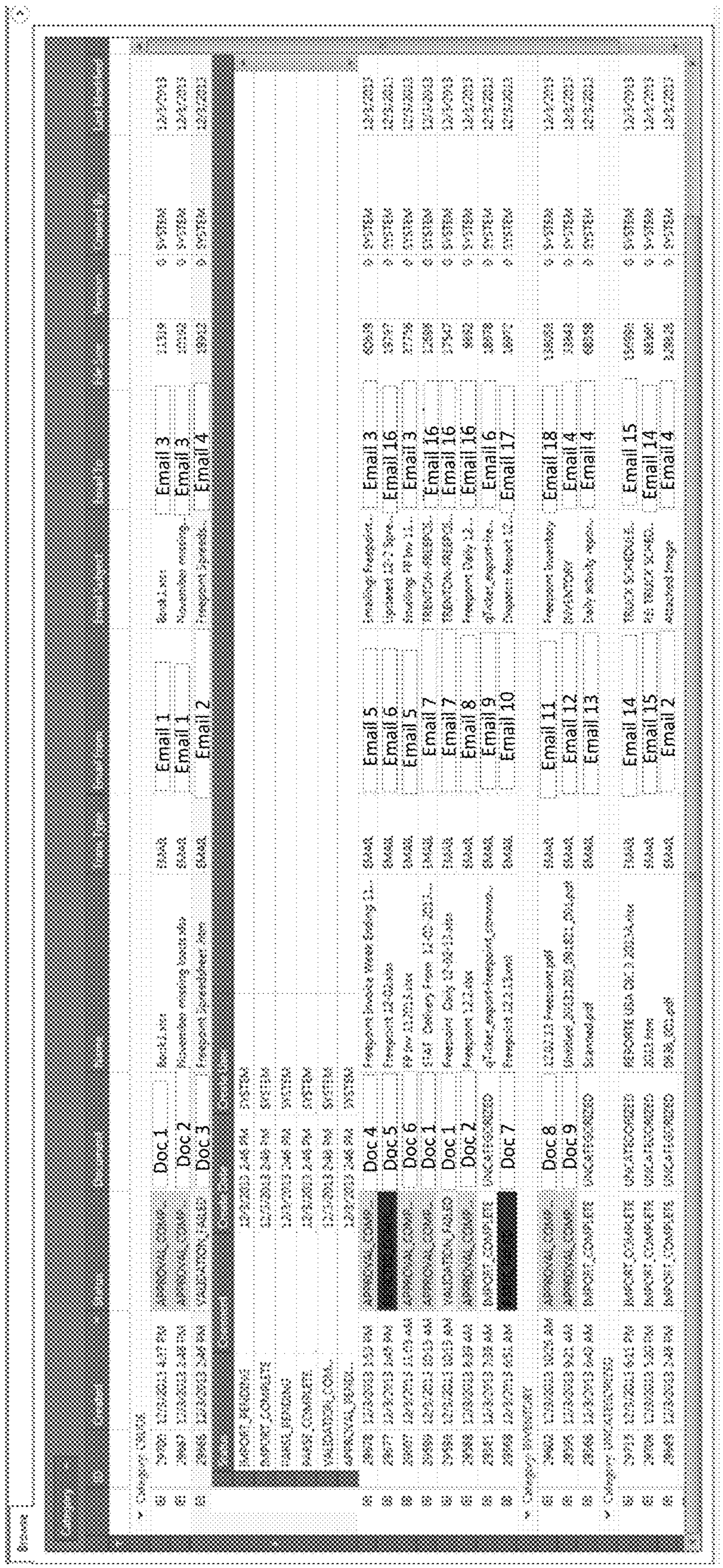
FIG. 3 illustrates an example display screen showing a document viewer panel, in accordance with an example implementation.

FIG. 3 illustrates an example display screen 300 showing a document viewer panel 204 in accordance with an example implementation. The document viewer panel 204 displays documents in their "native" formats (e.g., without requiring a conversion to a common file type), and enables editing of at least some document types directly in the viewer 204. For example, a viewer can view and edit files formatted as MS-Word documents, MS-Excel spreadsheets, PDF files, HTML files and text files.

Results panel 206 illustrates normalized records that are extracted from the imported documents. Records displayed in the results panel 206 can be edited and enriched by the user prior to approving the document for further processing.

In accordance with one or more implementations of the present application, documents that are processed are initially designated a document type. Each document type can have a corresponding schema that can be assigned to the data within the document. Moreover, each document type can have a custom parser that is capable of extracting the information from a respective document to be stored into the document type's corresponding schema. Document types are assigned to respective parsers to extract data from the particular document types. For example, the present application supports document in any format including CSV, MS-EXCEL, MS-WORD, XML, HTML, Image files (JPG, BMP, TIFF, PNG), PDF files and more. In one or more implementations, image-based documents use an optical character recognition (OCR) parser with custom algorithms to extract data. The parsers also can map the extracted data from a document into a predefined schema in the database. For example, a truck ticket document from a trucking company will be mapped into the truck deliveries schema.

In one or more implementation, schemas contain mapping rules to normalize data extracted from the documents. Schemas are usable for a data field (e.g., column in a spreadsheet) and can be provided via one or more ranked mapping tables. In an example involving daily truck tickets, each truck company sending data has its own internal names for oil wells and delivery locations where the oil is picked up and discharged. The present application uses mapping tables to assign a name for the wells and a name for the delivery locations for each respective document type and associate the names used by each truck company with normalized names for the wells and delivery locations.

Figure 4:
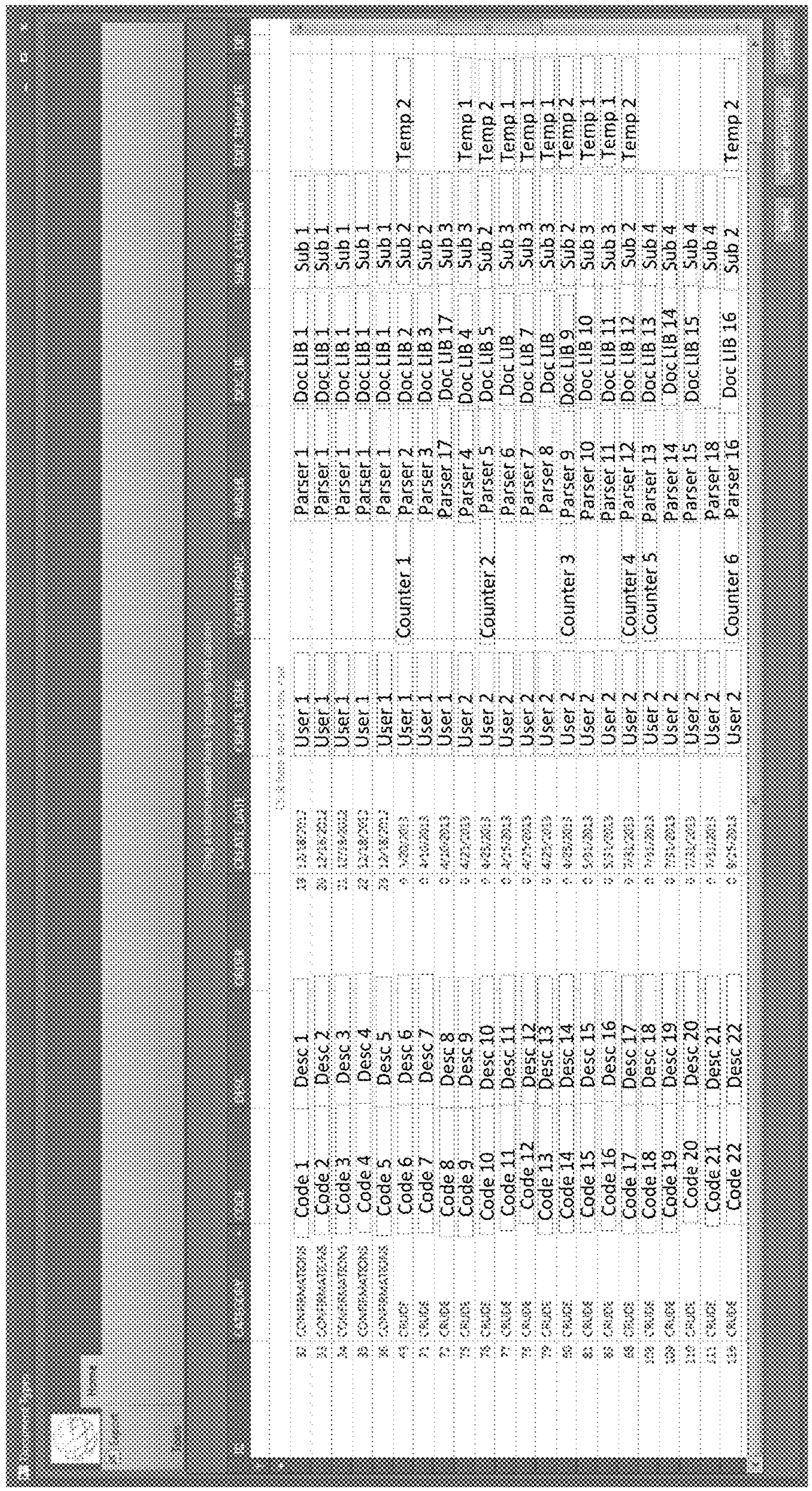
FIG. 4 illustrates an example document types display screen, in accordance with an example implementation of the present application.

In one or more implementations, documents are assigned into a respective category folder. FIG. 4 illustrates an example document types display screen 400. As shown in the display screen 400, column headings that correspond to respective data elements (e.g., category, code, description, creation date, etc.), can be reordered, such as by selecting and "dragging" a column to a new location, and can be "grouped," by selecting and "dragging" a column header to bar section. In the example shown in FIG. 4, data are sorted by the "Create_User" column.

A description regarding inbound document processing is now provided.

The present application supports processing files (referred to herein, generally as "documents") that are received from various sources (referred to herein, generally, as "inbound documents"). In one or more implementations, the process of recognizing and parsing incoming documents is provided in an automated and uniform workflow that allows users to interact with one or more features associated with the process. Steps associated with the automated processing of incoming documents can include, for example, validating and normalizing information set forth in the documents as a function of mapping tables that are defined for respective document types. The document viewer panel 204 that is provided with the user interface is usable for users to obtain state information associated with each document processed in accordance with the inbound document process workflow, and further for users to interact with the data through one or more respective steps of the process, such as "fix validation errors," "duplicates," or the like).

Figure 5:
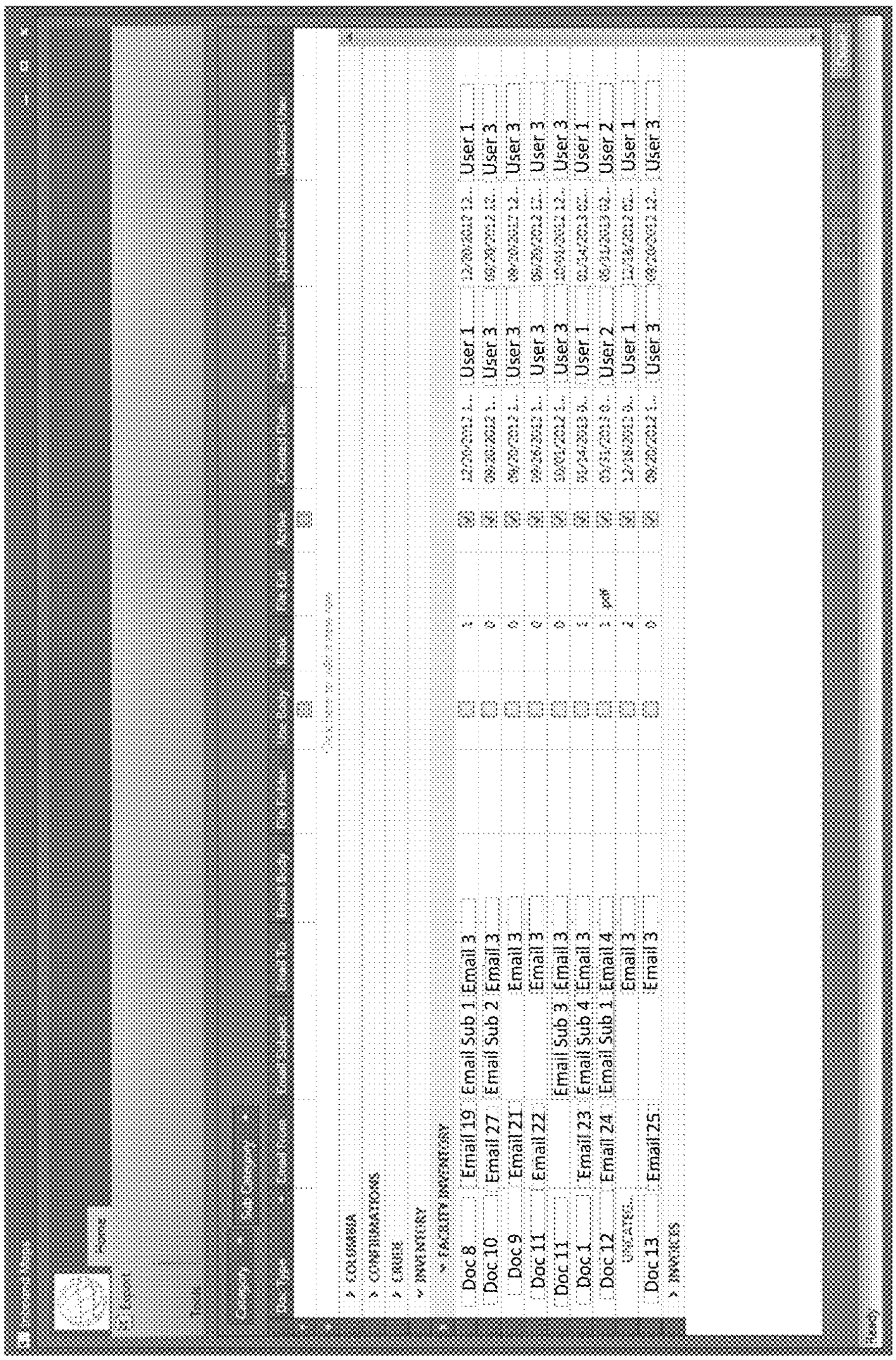
FIG. 5 illustrates an example data mapping rule display screen for inbound documents.

In one or more implementations, inbound rules can be defined and used to identify inbound documents and to map the inbound document to a correct document type. FIG. 5 illustrates an example data mapping rule display screen 500 for inbound documents. In the example display screen 500, columns are provided for document type, email categories (e.g., sender, receiver, subject, body), file folder, use body, rank, file extension, active, create date, create user, and update date. Also as illustrated in FIG. 5, the category "Inventory" has been selected and the subcategory facility inventory is shown. This example illustrates the flexibility and capacity of the present application to provide complex mapping rules in connection with inbound document processing.

Once the document type is determined, the document can be processed through the inbound workflow. In one or more implementations, this includes an automated process of recognizing documents, such as by using communication meta-information associated with the document. As noted herein, each document type in the system can be assigned to a custom parser. Once the document type is determined, the document can be then transitioned through the parsing step in an inbound document workflow. For example, a document that was emailed into the system contains a From Address, To Address, Subject line, File Name and File Type. This information can be used in a ranked mapping table to identify the document type of the received document. Moreover, information within the document can also be used to determine the document type, for example the title of an invoice document, or an inspection bill.

Turning now to steps associated with an example inbound document workflow in accordance with one or more implementations, steps are defined and used to parse, validate and normalize the data from an inbound document. The following discussion describes particular steps defined for an example workflow state.

In one or more implementations, six processing steps occur in connection with an inbound document workflow that includes: 1) import; 2) parse; 3) validate; 4) check for duplicates; 5) approve; and 6) reject. Each is described in greater detail, below.

In connection with an example 1) import process, an "import_pending" state is defined when a document initially enters an import process. In one or more implementations, when the document is successfully saved into a repository (e.g., a relational database or other data repository), an "import_complete" is assigned. In the event that the document failed to save into the repository, a state identifier of "import_failed" is assigned.

In connection with an example 2) parsing process, a document that enters the parsing process is defined as "parse_pending" once the document type has been recognized, such as through the inbound rules. The data in the document are then attempted to be parsed using the custom parser assigned to the document type. When the document has been successfully parsed and the data extracted, the document enters a "parse_complete" state. In the event that the document is not in a format expected by the parser and the data are not able to be extracted, the document is assigned a "parse_failed" state. This may occur, for example, if the document is assigned to an incorrect document type or the sender modified the format of the document.

Figure 6:
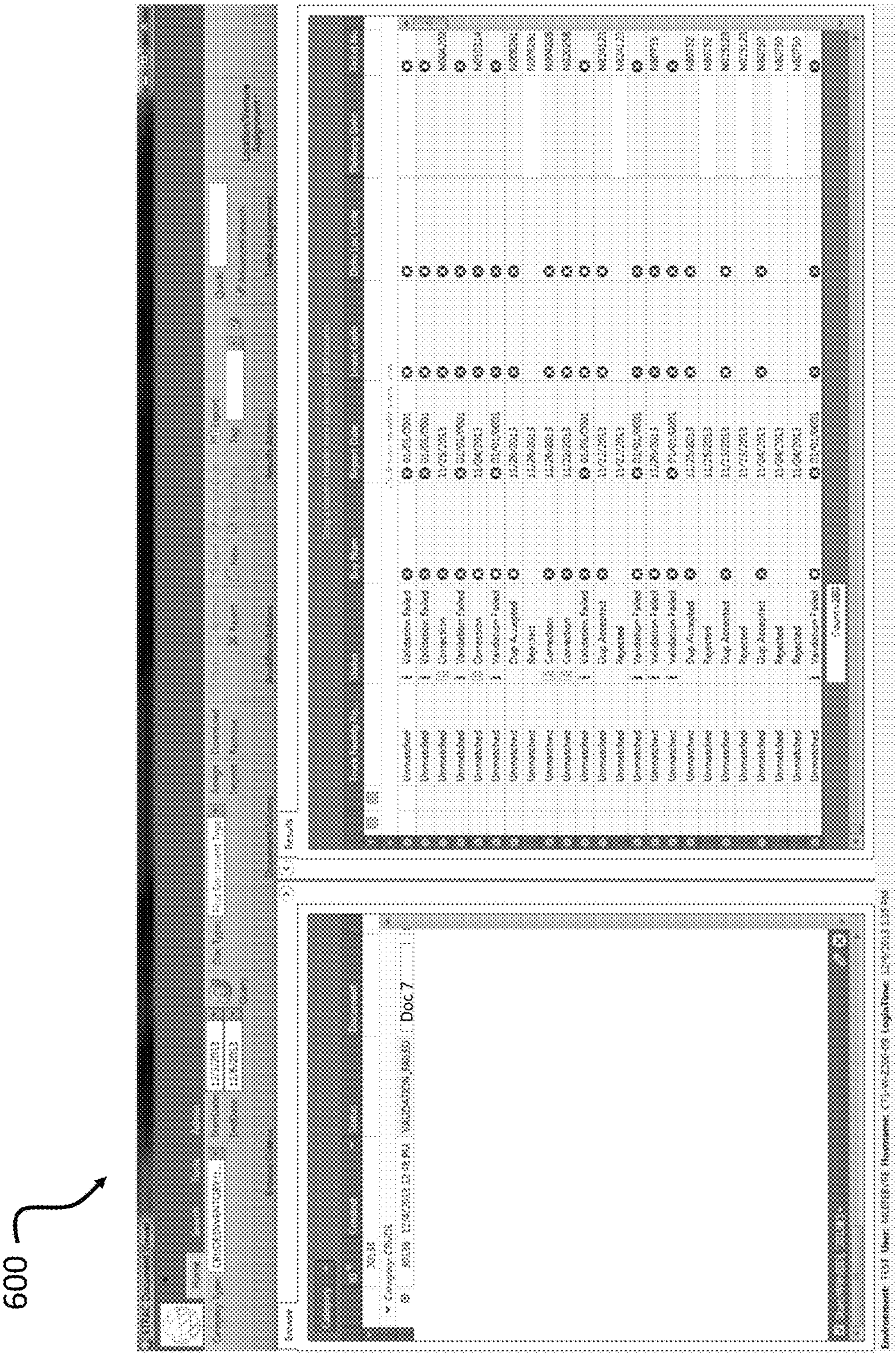
FIG. 6 illustrates an example display screen showing records with failed validation, in accordance with an example implementation of the present application.

In connection with an example 3) validation process, a document that enters the validation process is defined as entering the "validation_pending" state after the parser step successfully completes. This validation process validates the data being extracted and informs the user in case any data does not conform to one or more validation rules. Once complete the document can be assigned a "validation_complete" state, which indicates that the data in the document has been validated successfully. In the event that one or more data fields in the document did not pass validation, the document can be assigned a "validation_failed" state. Example causes of data fields not passing validation include missing fields, incorrect data types, and invalid data values. Records and cells that fail validation are indicated in the Results Panel 206. An example display screen 600 showing records with failed validation is shown in FIG. 6.

Figure 7:
FIG. 7 illustrates an example display screen showing duplicate records and prompts for corresponding user activity.

In connection with an example 4) check for duplicates process, a document that is identified as containing duplicates is defined as in the "duplicates_detected" state. Checking for duplicate data can involve looking for records that have data points that are the same as approved records already processed) or corrected records (i.e. records that have been seen before but some data points have changed). In order to determine a correction, each schema can define key columns that are used to determine if the record already exists. For example, a truck haul ticket number or invoice number can be used as keys to determine if these records have already been processed or updated. Documents that enter the "duplicates_detected" state have one of more records on the document has been identified as a duplicate record using the key field(s) in the document. In one or more implementations, the document enters into the "duplicates_detected" state in case one or more records in the document has been identified as a duplicate record in accordance with one or more key field(s) defined in the document. An example display screen 700 showing duplicate records and prompts for corresponding user activity is shown in FIG. 7. As illustrated in FIG. 7, one of the duplicate records can be placed into a correction status and the other (matching) record can be displayed underneath. Correction status includes taking some action in connection with the duplicate records, such as determining that the records as duplicates identifying the data values within the records that indicate the duplication, representing one record as a new record and one record as a matching duplicate record, proposing a course of action to take in connection with the duplicate, and prompting the user to take an action. In the example shown in FIG. 7, the user is prompted to take one of three actions: accept; reject; and clear. Accept represents that the correction is accepted and the matching duplicate record is rejected. Reject represents that the new record is rejected and the matching duplicate is left as is. Clear represents that the new record is not a duplicate and both records are left as is (i.e., rejects are accepted).

In connection with an example 5) approve process, a document that has passed validation steps and a user has not yet approved the document is defined as in the "approval_pending" state. After the document and all records extracted are approved and ready to be processed by respective downstream processes, the document can be defined as in the "approval_complete" state. Alternatively, a 6) reject process occurs, and the document is defined in the "rejected_complete" state, in which the document and all records stand as rejected.

Figure 8:
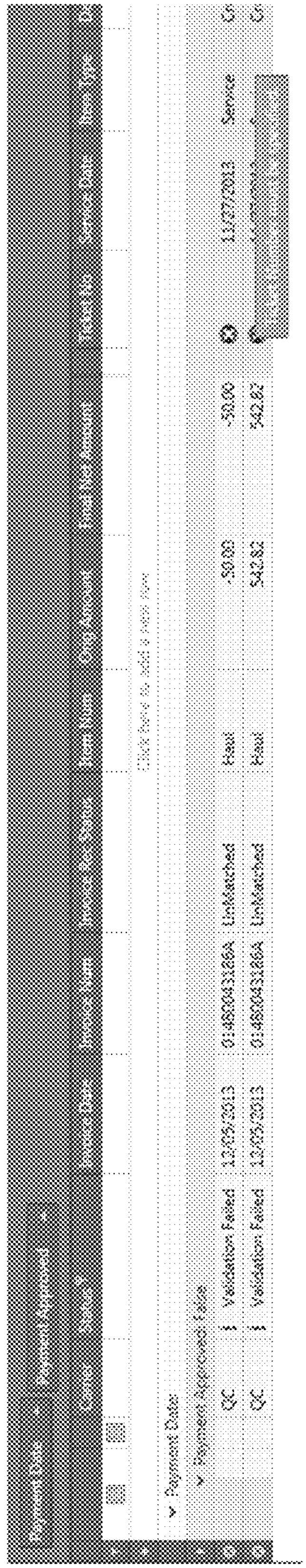
FIG. 8 illustrates an example display screen that indicates that a record failed validation, in accordance with an example implementation of the present application.

Upon completion of inbound document processing, various status indicators can be defined that represent various record states. In one or more implementations, the status indicators can include validation failed, which represents that the record failed validation. An example display screen 800 illustrating that a record failed validation is shown in FIG. 8. As shown in FIG. 8, the column that failed can be highlighted with an indicator and error message. In one or more implementations, the status indicators can include validation cleared, which indicates that a validated failed record has been manually cleared by the user, such as by right-clicking the record and selecting an option to clear validation errors.

In one or more implementations, the status indicators can include correction, which indicates that the record has already been processed by the system on another document and the data has changed. The record can be accepted, rejected or cleared, such as show and described herein (FIG. 7). Other record status indicators can include: duplicate cleared (a correction record has been cleared and the record (s) against which the correction record was matched has not been rejected). Another record status indicator can include duplicate accepted (a correction record has been accepted and the record(s) against which the correction record was matched has been rejected). Another record status indicator can include pending approval (no validation errors occurred on the record or duplicate records found, and the record is waiting to be approved). Other record status indicators can include approval (automatically entered into this status once the document has been approved) and rejected (automatically entered into this state if the document is rejected). Duplicate records can be rejected automatically if all relevant data columns match the prior processed record. Moreover, individual records can be rejected in response to a user selecting a function, for example to reject a row in a respective display screen.

In one or more implementations, the present application includes one or more enrichment processes that add information as a function of custom logic built into respective schema(s). For example, a truck deliveries schema uses data received from tickets associated with truck runs, to calculate the net standard volume of oil being delivered, as a function of an API calculator. Processes associated with enrichment can assign information to one or more records that are extracted from an inbound document, such as by enabling information to be assigned manually (e.g., by a user) or substantially automatically (e.g., via a mapping table) to assign additional data.

Examples of mapping tables that are usable to enrich information from inbound documents include: Location Maps (for normalizing information associated with delivery location (e.g., terminal, vessel, or the like)); Lease Maps (for normalizing information associated with a pickup location, (e.g., well head, terminal, or the like)); Trade Maps (for applying a combination of the normalized lease name and delivery location to assign a contract number to the delivery); and rates (for applying a combination of the normalized lease name and delivery location to assign a haul rate to the delivery).

Figure 9:
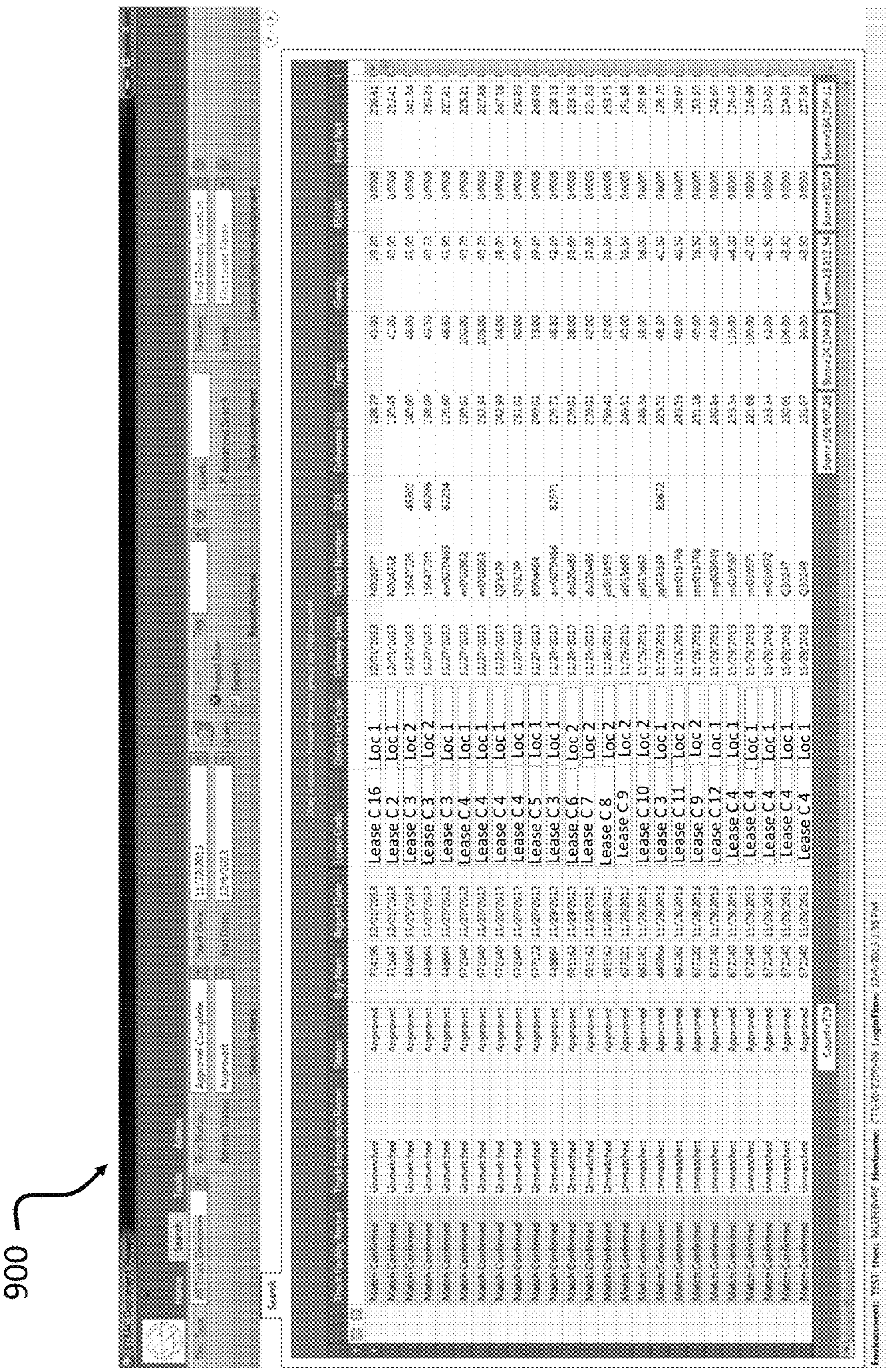
FIG. 9 illustrates an example search display screen that can be used to look up deliveries made within a specified date range and to search across multiple document types and schemas.

In addition to enrichment, the present application can provide a display screen for enabling users to search for information. For example and as shown in FIG. 9, a search display screen 900 can be used to look up deliveries made within a specified date range and to search across multiple document types and schemas.

Figure 10:
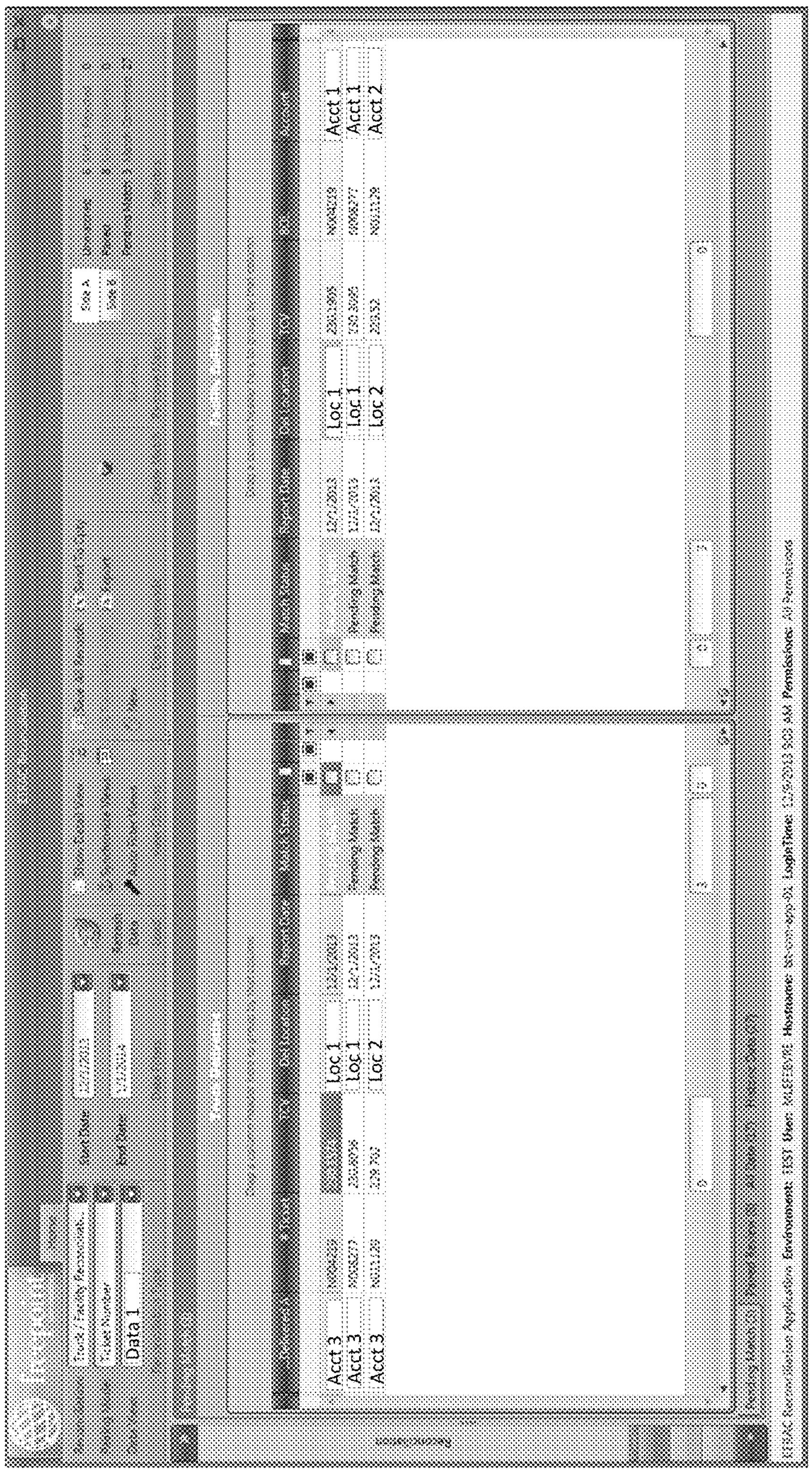
FIG. 10 illustrates an example reconciliation display screen in accordance with an example implementation of the present application.

The present application supports one or more configurable reconciliation processes to compare normalized and enriched data from one schema to any other schema in the system. Records that have been approved and are at the final state of the record workflow can be eligible for matching. FIG. 10 is an example reconciliation display screen 1000 in accordance with an example implementation of the present application.

In one or more implementations, reconciliation is configured without a requirement for additional development programming coding changes. Reconciliation in accordance with the present application can be defined in various ways. Reconciliation Type, for example, defines a respective instance of the reconciliation. Data source refers to two data sources that are used for a reconciliation type, (e.g., table name or schema). Data view refers to filters used in one or more data sources to return records. Pairings refer to the key columns used to find the matching record(s) in a data set (e.g., truck ticket number or invoice number). Match rules define columns and comparison logic between the two columns and used to determine whether data match. For example, if two truck ticket records are identified in the truck data and facility data, the records are held to match within a pre-defined tolerance (e.g., a discrepancy of only one barrel of oil).

In one or more implementations, the present application compares the same record to multiple records in different reconciliation processes. For example, a truck delivers oil from a well to a facility. Data are obtained from the well and the facility. The truck delivery data are compared separately against both data sets, and may match the facility data but not the well data, thereby triggering one or more reconciliation processes. Thus, in one or more implementations the reconciliation processes match records from two or more different data sources and manages discrepancies via a reconciliation workflow. Records can be matched on key columns (i.e. ticket number or bill of lading ("BOL")) and relevant columns can be checked to determine if the data on both sides match within the predefined tolerances, such as illustrated in FIG. 10.

In connection with a reconciliation process, each of a plurality of records can be placed into a reconciliation status, including, for example, unmatched, paired, pending match, match confirmed and match rejected. Records in unmatched state can indicate that no records were found that matched the key column(s) in another data set. Paired status can indicate that another record was found in the other data set with the same key but the data in the relevant columns did not match. If multiple records are found in each data set with data matching in the same key column, the records can be placed in paired status, even if all the relevant columns match. Pending match indicates that another record was found in the other data set with the same key and the data in the relevant columns matched. Match confirmed can indicate the final record state of the reconciliation and that the match has been confirmed. This indicates that one of the Match Confirmed records from either data set has been rejected. Match rejected can occur if a correction comes into the system and the match confirmed record gets rejected and replaced with the newer record. Match Rejected records can be rolled back through a process to remove matches and to be re-matched.

In accordance with one or more implementations and as illustrated in FIG. 10, a graphical user interface can be provided that includes selectable reconciliation tabs. The reconciliation tabs can provide data grids to display both sides of the data sets. The data grids can be filtered, grouped, sorted and/or have columns added and removed. One tab that can be provided, for example the pending match tab (FIG. 10), can display records in pending match status. Records in the pending match tab can be committed using a graphical screen control, such as a button, to confirm the match. Other tabs that can be provided include a paired review tab, which can display records in paired status. The records in a paired review tab can be reviewed to determine the cause of a discrepancy. Furthermore, a command can be associated with view options and used to filter and view the records. Other tabs can include an All Data tab, which can contain records that have not yet been confirmed, including pending match, paired and unmatched. The All Data tab can be used to enable a user to manually match records through a create matches button. Another tab can include the Historic Data tab, which can contain a history of all records that have been match confirmed. A user can select a graphical screen control, such as by selecting a plus sign ("+"), can be used to view the record in the other dataset each record was matched against. The Historic Data tab can also display records that have been matched. In case one of the records in the match group has been rejected, the match rejected records can be rolled back using a graphical screen control, such as a button to remove matches.

Figure 11:
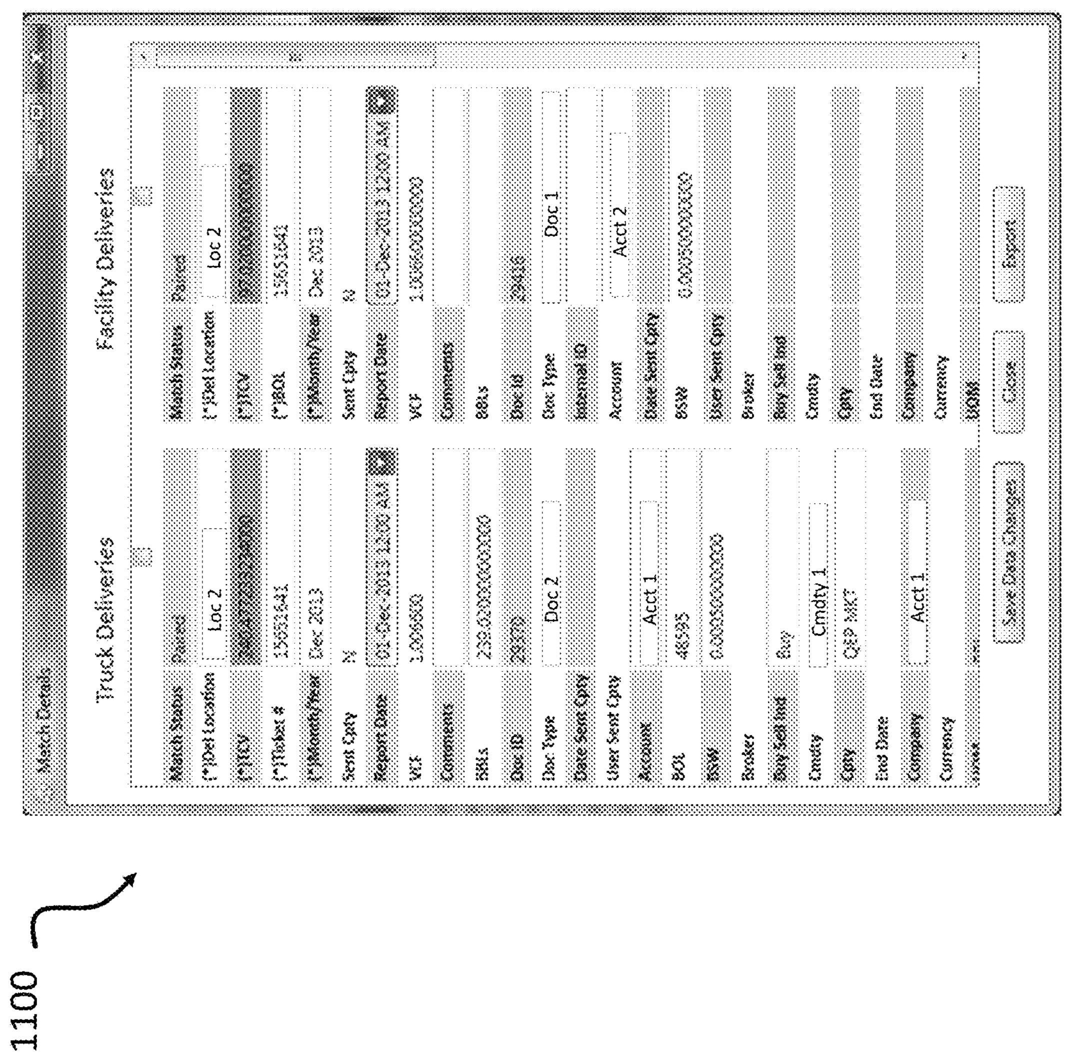
FIG. 11 illustrates an example detail display screen that is usable for a user to compare at least one records from each data set, in accordance with an example implementation.
Figure 12:
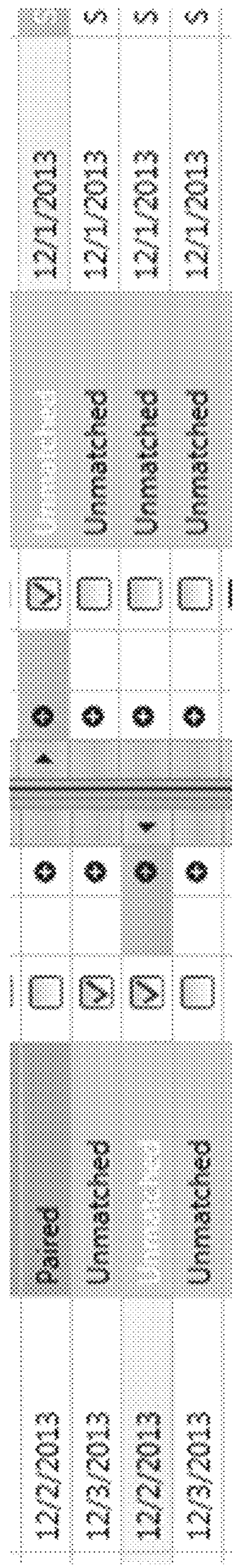
FIG. 12 illustrates an example detail view display screen, in accordance with an example implementation.

In accordance with one or more implementations, the present application provides a plurality of options to view information. View options can control various viewing modes in each of a plurality of tabs. These options can enable the user to quickly view and compare the records from each data set. FIG. 11 illustrates an example detail display screen 1100 that enables a user to compare one or more records from each data set in a side-by-side comparison and highlights columns that are different. Records can also be edited in this view. Selecting records for the Detail view can be done by highlighting the paired record to be viewed or in other ways, such as by explicitly selecting the records and then selecting a graphical screen control, such as a Show Detail View button. An example detail view display screen 1200 is shown in FIG. 12. In addition, an option to synchronize views can be provided to display a synchronized mode that results in both data sets to be scrolled in a synchronized way. Users can turn on and off synchronized views, for example, via one or more graphical screen controls.

Figure 13:
FIG. 13 illustrates an example display screen for filtering, in accordance with an example implementation.

In addition, the present application supports providing auto filtering in response to a user selection, and can be provided in a paired review tab and filters the other data set to the record(s) that match a currently selected record. In the example display screen 1300 shown in FIG. 13, once the record on the left side is selected, the records in the data set on the right side are filtered to the matched records. Other options include resetting filters on the grids, and resizing columns on the grids for fit the current screen size.

Moreover, data commands are supported, such as in connection with manipulating records within a respective dataset. Users who are provided with edit rights can make direct edits on records within the grids. Example commands can include save, reject, build a reconciliation report of selected record(s). Other options include report to indicate which records have been updated, adding new records to a dataset and exporting data records.

The present application further supports match functionality for enabling users to manually process records through the reconciliation workflow. Options include create match, to confirm a match between one or more selected record(s). One or more records can be selected on both sides of the data set. Selected records can be assigned to the match group and can be transitioned to the match confirmed status, once committed. Moreover, individual records on one side of the data sets can also be confirmed when there are no matching records on the other side. Users can also confirm matches, which can be applied to selected records on the pending match tab and usable to move pending match records to a match confirmed status. Users can also remove matches, which apply to records in the Historic Data tab and which removes the match between all records in the match group.

Figure 14:
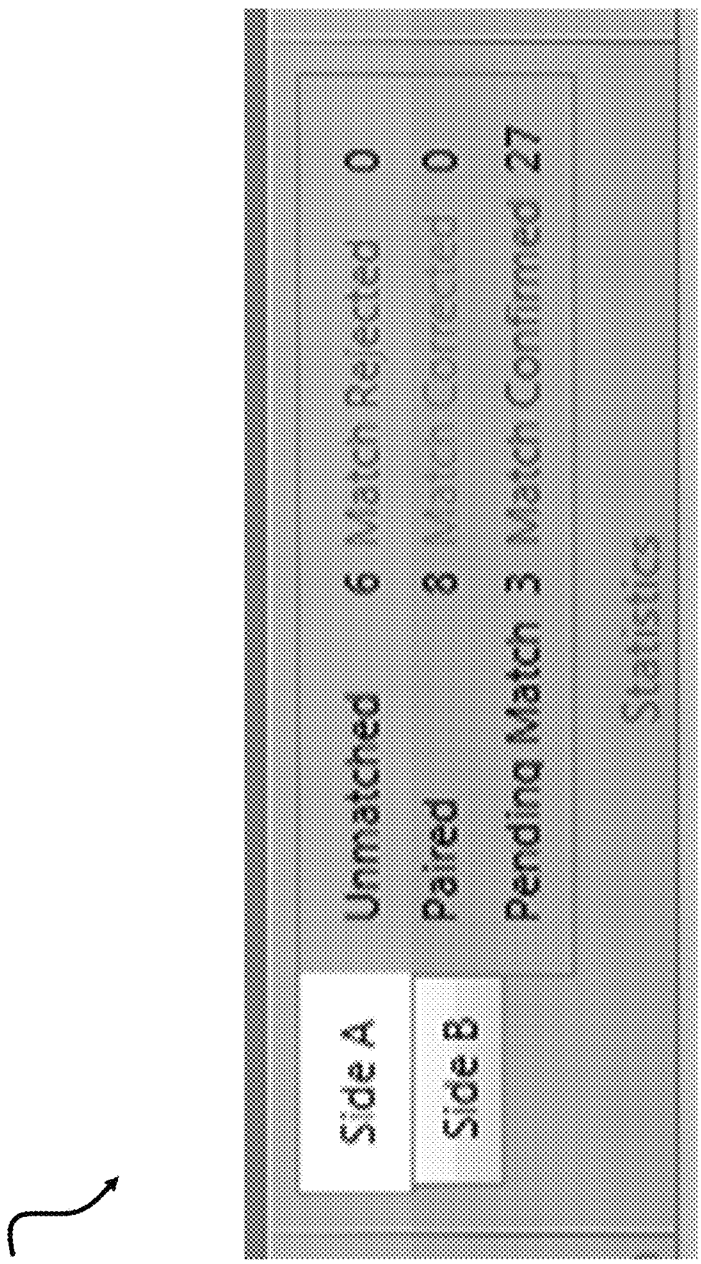
FIG. 14 illustrates an example screen display showing toggle buttons, in accordance with an example implementation.

In one or more implementations, the present application supports a statistics panel that shows the match status count for records returned in a specified date range. The statistics can be used to identify quickly any records having a match-rejected status. In one or more implementations, the statistics can be toggled to either side of the data set by selecting a graphical screen control, such as by clicking on the Side A/B toggle buttons. An example screen display 1400 showing toggle buttons is displayed in FIG. 14.

The present application further supports security, for example, in the reconciliation application and that is controlled through one or more data views. Each of one or more users can be assigned to a specific data view and authorized to execute an application associated with the view. Users can be also assigned to specific security roles that allow edit and/or view rights with the application.

Figure 15:
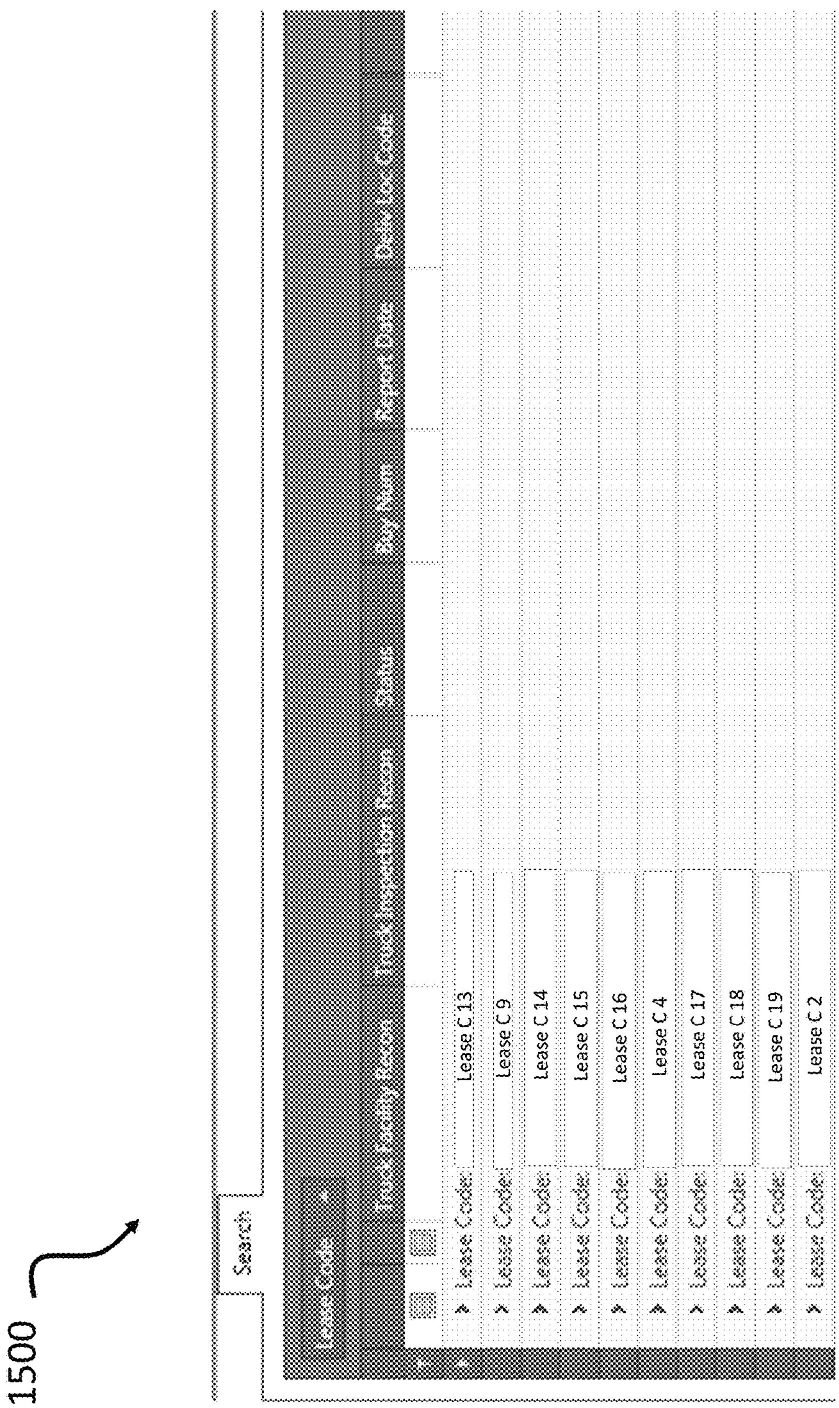
FIG. 15 illustrates an example display screen representing grouping functionality, in accordance with an example implementation.

As shown and described herein, the present application provides information in data grids to display record information. Grids are usable to group, filter, sort and add new rows. Furthermore, a grouping function allows records in a grid to be grouped together. To group a column in the grid, for example, a user can drag a column into the group panel on the top of the grid. FIG. 15 illustrates an example display screen 1500 in which a column associated with Lease Code has been dragged into the group panel, and the grid is grouped on the column.

Figure 16:
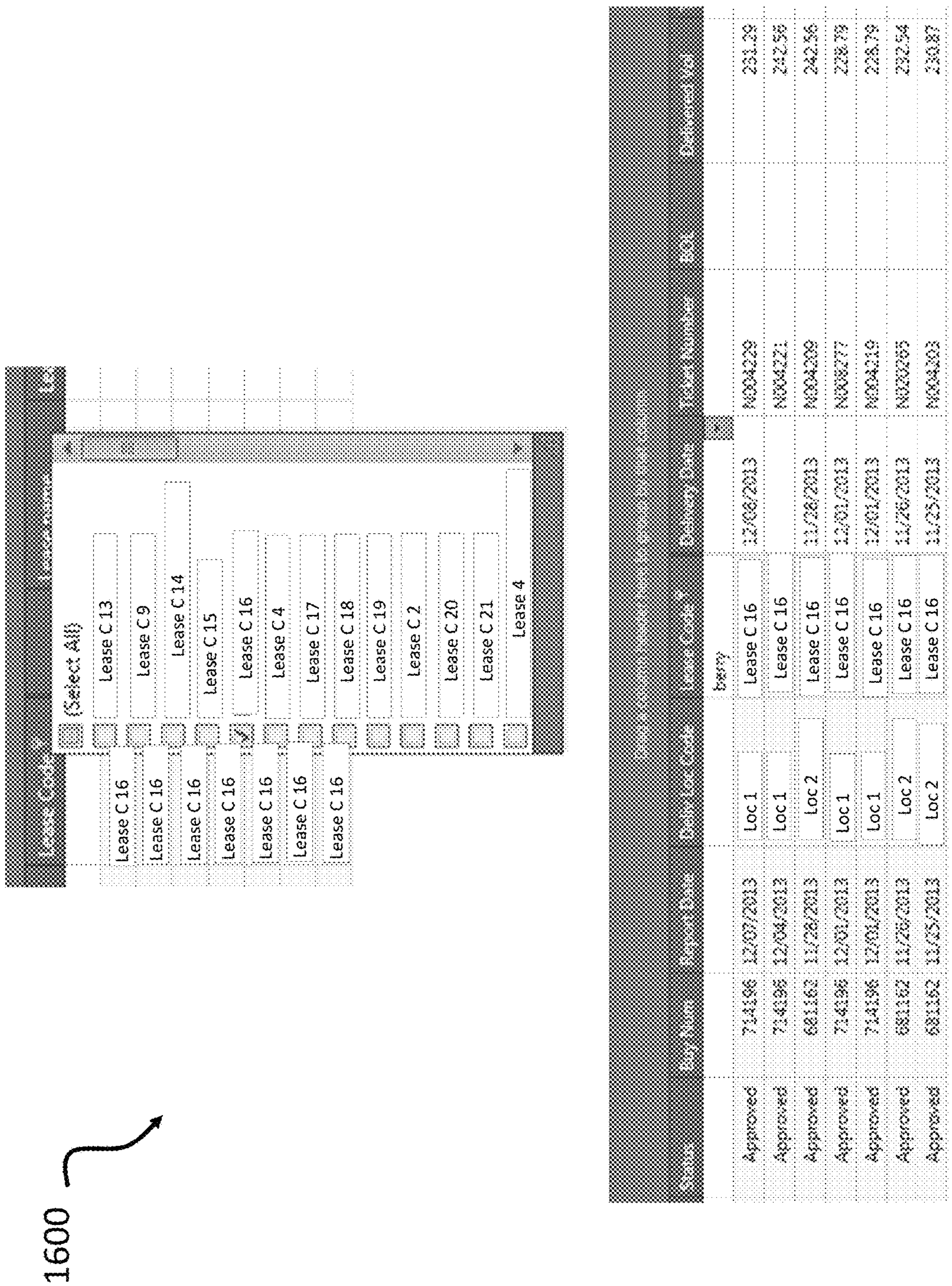
FIG. 16 illustrates an example display screen representing filtering functionality.

In addition, a data grid can be filtered in various ways, including through individual columns and/or a filter row. Individual columns can be grouped by selecting a graphical screen control, such as by clicking on a Filter icon in the middle of the row and selecting one or more data values. An example is shown in the example display screen 1600 in FIG. 16. Moreover, a grid can also be filtered by entering values in a filter row. In the example display screen 1600 shown in FIG. 16, Berry is entered into the filter row under the lease column. Thereafter, all records are filtered to Berry. Filtering can also be cleared, for example, by selecting a respective graphical screen control.

Other options can include sorting and adding rows. Sorting information can occur, for example, by selecting a column header. Once a column is sorted a sort indicator can be displayed on the column. With respect to adding a new row, some grids can have an "add row" column that allows new rows to be added directly to the grid.

Figure 17:
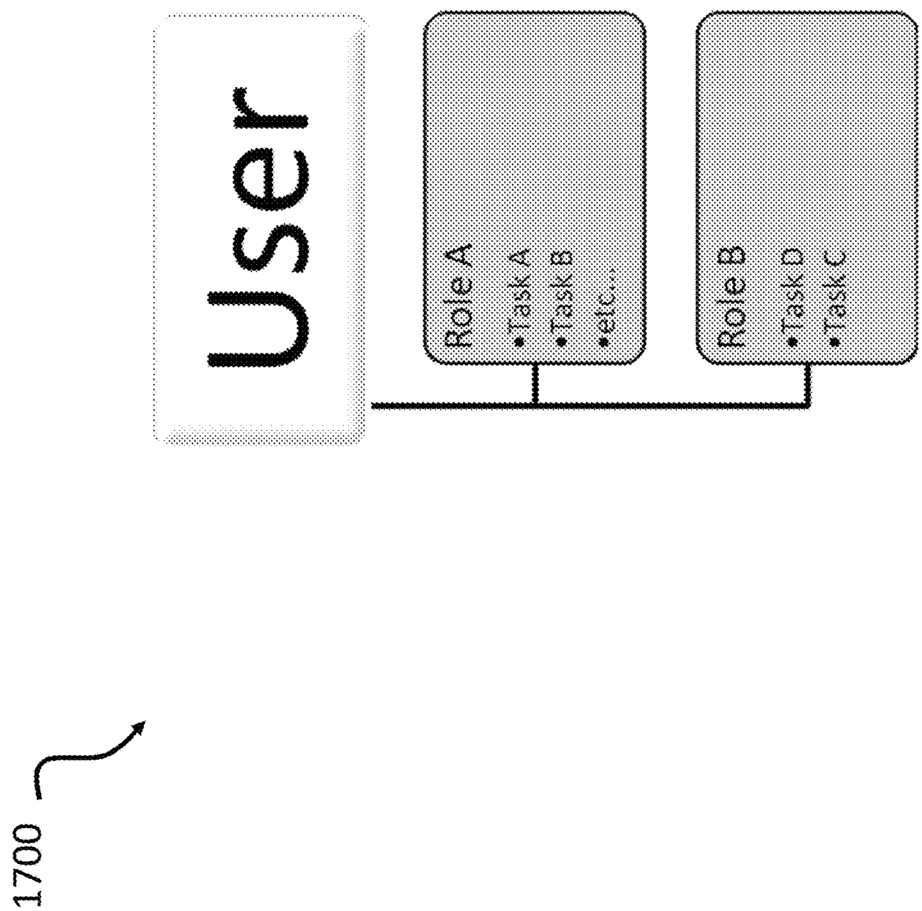
FIG. 17 is an example block diagram showing a relationship for users to roles and tasks, in accordance with an example implementation.

Furthermore, the present application supports various levels of security in connection with at least the document viewer and the reconciliation application. Task security determines particular actions a user is allowed to perform in the application. For example, a user can view a document and the records, but cannot make edits. In one or more implementations, task security is provided that can be driven by a set of one or more roles that are assigned to a user. Each role can be assigned one or more tasks, which determines the functions that the user is authorized to perform. FIG. 17 is an example block diagram showing a relationship for users to roles and tasks. Each user can be assigned one or more roles. The roles, which can be defined by a business process owner, can be made up of one or more tasks to accomplish a user workflow in accordance with an implementation of the present application. For increased flexibility, tasks may or may not map directly to business processes, thereby resulting in multiple tasks to complete a process. For example, a manager wants user A to be able to import a document and save the parsed data in the database. The business process owner wants to separate importing and parsing into two roles and two separate tasks, which allows the business process owner to determine how to combine various tasks to accomplish a business process workflow.

In the above-described workflow, the user can be assigned the Import, Parse, and Save tasks. If a role does not exist that is suitable, the present application supports defining a new role, for example, for this workflow and to be assigned to one or more users.

Table 1, below, identifies example tasks that are provided in accordance with one or more implementations of the present application.

TABLE 1

| ROLE CODE | DESCRIPTION |
|---|---|
| ACCEPT_DUP | Accept Duplicate Detail |
| ADMIN_DOC_TYPE | Administer Document Types |
| ADMIN_INBOUND_MAP | Administer Inbound Maps |
| ADMIN_LEASE_MAP | Administer Lease Name Maps |
| ADMIN_LOC_MAP | Administer Delivery Location Maps |
| ADMIN_RATES | Admin Haul Rates |
| ADMIN_TANK_MAP | Browse Tank Maps |
| ADMIN_TRADE_MAP | Administer Trade Maps |
| ADVANCED_EDIT | Advanced Editing and Creation |
| APPROVE_DOC | Approve/Reject Document |
| ASSIGN_DELIV_LOC | Assign Delivery Location Code |
| ASSIGN_DOC | Assign Document |
| ASSIGN_PAYMENT_DATE | Assign Payment Date |
| ASSIGN_TRADE | Assign Trade |
| ASSIGN_VENTURE | Assign Venture Code |
| BROWSE_DOC | Browse Document Queue and View Document Details |
| CLEAR_DUP | Clear Duplicate Detail |
| CLEAR_VALIDATION | Clear Row Validation Error Status |
| CREATE_COMMENT | Create Comment on Document Detail |
| CREATE_TAG | Create Tag Document Detail |
| DELETE_COMMENT | Edit Comment on Document Detail |
| DELETE_TAG | Delete Tags on Document Detail |
| DOWNLOAD_DOC | Download Document |
| ECM_APP | Access to the ECM App |
| EDIT_COMMENT | Edit Comment on Document Detail |
| EDIT_DOC_DETAILS | Edit Document Details |
| EDIT_SOURCE_DOC | Edit source document |
| EXPORT_DOC_DETAILS | Export Document |
| IMPORT_DOC | Import Document |
| OCR_DOC | OCR Document |
| PARSE_DOC | Parse Document |
| QC_EDIT_COMMENTS | Edit QC Truck Deliveries Comments |
| REFRESH_RECON_CACH | Refresh Reconciliation Cache |
| REJECT_DOC_DETAILS | Reject Document Detail |
| REJECT_DUP | Reject Duplicate Detail |
| REMOVE_DOC | Remove Document |
| SAVE_DOC_DETAILS | Save Document Details |
| SEARCH_DOC_DETAILS | Search Document Details |
| VIEW_COMMENT | Edit Comment on Document Detail |
| VIEW_RATES | Admin Haul Rates |
| VIEW_TAG | View Tags on Document Detail |

Table 2, below, shows a list of default role and task assignments that can be used and customized to fit the business process owner's needs, in accordance with one or more implementations of the present application.

TABLE 2

| READ DATA ROLE | DESCRIPTION |
|---|---|
| BROWSE_DOC | Browse Document Queue and View Document Details |
| DOWNLOAD_DOC | Download Document |
| ECM_APP | Access to the ECM App |
| EXPORT_DOC_DETAILS | Export Document |
| SEARCH_DOC_DETAILS | Search Document Details |
| VIEW_COMMENT | Edit Comment on Document Detail |
| VIEW_TAG | View Tags on Document Detail |
| CREATE AND EDIT DATA | |
| ACCEPT_DUP | Accept Duplicate Detail |
| APPROVE_DOC | Approve/Reject Document |
| ASSIGN_DELIV_LOC | Assign Delivery Location Code |
| ASSIGN_DOC | Assign Document |
| ASSIGN_PAYMENT_DATE | Assign Payment Date |
| ASSIGN_TRADE | Assign Trade |
| ASSIGN_VENTURE | Assign Venture Code |
| BROWSE_DOC | Browse Document Queue and View Document Details |
| CLEAR_DUP | Clear Duplicate Detail |
| CLEAR_VALIDATION | Clear Row Validation Error Status |
| CREATE_COMMENT | Create Comment on Document Detail |
| CREATE_TAG | Create Tag Document Detail |
| DELETE_COMMENT | Edit Comment on Document Detail |
| DELETE_TAG | Delete Tags on Document Detail |
| ECM_APP | Access to the ECM App |
| EDIT_COMMENT | Edit Comment on Document Detail |
| EDIT_DOC_DETAILS | Edit Document Details |
| EDIT_SOURCE_DOC | Edit source document |
| EXPORT_DOC_DETAILS | Export Document |
| IMPORT_DOC | Import Document |
| OCR_DOC | OCR Document |
| PARSE_DOC | Parse Document |
| QC_EDIT_COMMENTS | Edit QC Truck Deliveries Comments |
| REFRESH_RECON_CACH | Refresh Reconciliation Cache |
| REJECT_DOC_DETAILS | Reject Document Detail |
| REJECT_DUP | Reject Duplicate Detail |
| REMOVE_DOC | Remove Document |
| SAVE_DOC_DETAILS | Save Document Details |
| SEARCH_DOC_DETAILS | Search Document Details |
| VIEW_COMMENT | Edit Comment on Document Detail |
| VIEW_RATES | Admin Haul Rates |
| VIEW_TAG | View Tags on Document Detail |
| Power User | |
| ADMIN_DOC_TYPE | Administer Document Types |
| ADMIN_INBOUND_MAP | Administer Inbound Maps |
| ADMIN_LEASE_MAP | Administer Lease Name Maps |
| ADMIN_LOC_MAP | Administer Delivery Location Maps |
| ADMIN_TANK_MAP | Browse Tank Maps |
| ADMIN_TRADE_MAP | Administer Trade Maps |
| ECM_APP | Access to the ECM App |
| Advanced Create and Edit | |
| ACCEPT_DUP | Accept Duplicate Detail |
| ADVANCED_EDIT | Advanced Editing and Creation |
| APPROVE_DOC | Approve/Reject Document |
| ASSIGN_DELIV_LOC | Assign Delivery Location Code |
| ASSIGN_DOC | Assign Document |
| ASSIGN_TRADE | Assign Trade |
| ASSIGN_VENTURE | Assign Venture Code |
| BROWSE_DOC | Browse Document Queue and View Document Details |
| CLEAR_DUP | Clear Duplicate Detail |
| CLEAR_VALIDATION | Clear Row Validation Error Status |
| CREATE_COMMENT | Create Comment on Document Detail |
| CREATE_TAG | Create Tag Document Detail |
| DELETE_COMMENT | Edit Comment on Document Detail |
| DELETE_TAG | Delete Tags on Document Detail |
| ECM_APP | Access to the ECM App |
| EDIT_COMMENT | Edit Comment on Document Detail |
| EDIT_DOC_DETAILS | Edit Document Details |
| EDIT_SOURCE_DOC | Edit source document |
| EXPORT_DOC_DETAILS | Export Document |
| IMPORT_DOC | Import Document |
| OCR_DOC | OCR Document |
| PARSE_DOC | Parse Document |
| QC_EDIT_COMMENTS | Edit QC Truck Deliveries Comments |

TABLE 2-continued

| READ DATA ROLE | DESCRIPTION |
|---|---|
| REFRESH_RECON_CACH | Refresh Reconciliation Cache |
| REJECT_DOC_DETAILS | Reject Document Detail |
| REJECT_DUP | Reject Duplicate Detail |
| REMOVE_DOC | Remove Document |
| SAVE_DOC_DETAILS | Save Document Details |
| SEARCH_DOC_DETAILS | Search Document Details |
| VIEW_COMMENT | Edit Comment on Document Detail |
| VIEW_RATES | Admin Haul Rates |
| VIEW_TAG | View Tags on Document Detail |

Figure 18:
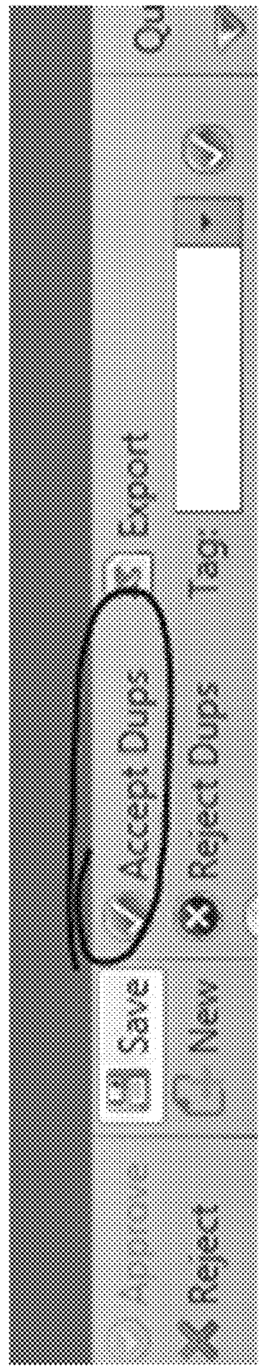
FIG. 18 illustrates an example display screen representing options for viewing duplicate records, in accordance with an example implementation.

In one or more implementations, multiple role assignments can be handled by adding together two or more roles that a user has been assigned to. Duplicate tasks may not be factored because all tasks are treated as grant only, which refers to a user not being assigned a role that has conflicting grant and deny permissions for the same task. Further, situations may arise in which a specific task needs to be assigned or removed from only one user. In such circumstances, the present application enables a user to create a new role with one task and assign additional role(s). If a user does not wish to create a new role, a single role from a list of tasks can be optionally included or excluded. In addition, a task can be included, such that if a user is not assigned a task through any of his/her assigned roles, the task can be added and the user will be granted authorization for this task only. For example, a user can import, parse and save a document, but cannot accept duplicate records. Adding the present application's feature of including ACCEPT_DUP task enables the user to accept duplicate records. In an example implementation, a graphical screen control, such as a button, in the Document Viewer user interface becomes enabled when a duplicate row is highlighted. An example is illustrated in FIG. 18.

Alternatively, excluding a task is an option that can be provided. If a user is not assigned a task by one of his/her assigned roles, that role will be denied authorization for that task only. For example, a user is assigned the Advanced Create and Edit role (Table 2). If the business process owner does not wish that user to be authorized to approve documents, but still be able to do other tasks, the user can be denied access to just the ADVANCED_EDIT task. In an implementation of the present application, the Document Viewer and Reconciliation user interface disables buttons associated with advanced editing.

In an implementation and to preclude a conflict, a user cannot be assigned grant and deny privileges on the same record. Moreover, business process owners can define roles based on a reflective business workflow. For example, roles can include Approver, Reviewer and Data Entry. Each of these roles can be assigned tasks that enable the user to complete that discrete set of tasks. To accomplish multiple tasks, the user can be assigned to multiple roles, such as Approver, Reviewer and Data Entry. Modeling roles in accordance with a business process enables the roles to be re-useable and allows for flexibility when modeling a respective business workflow.

Figure 19:
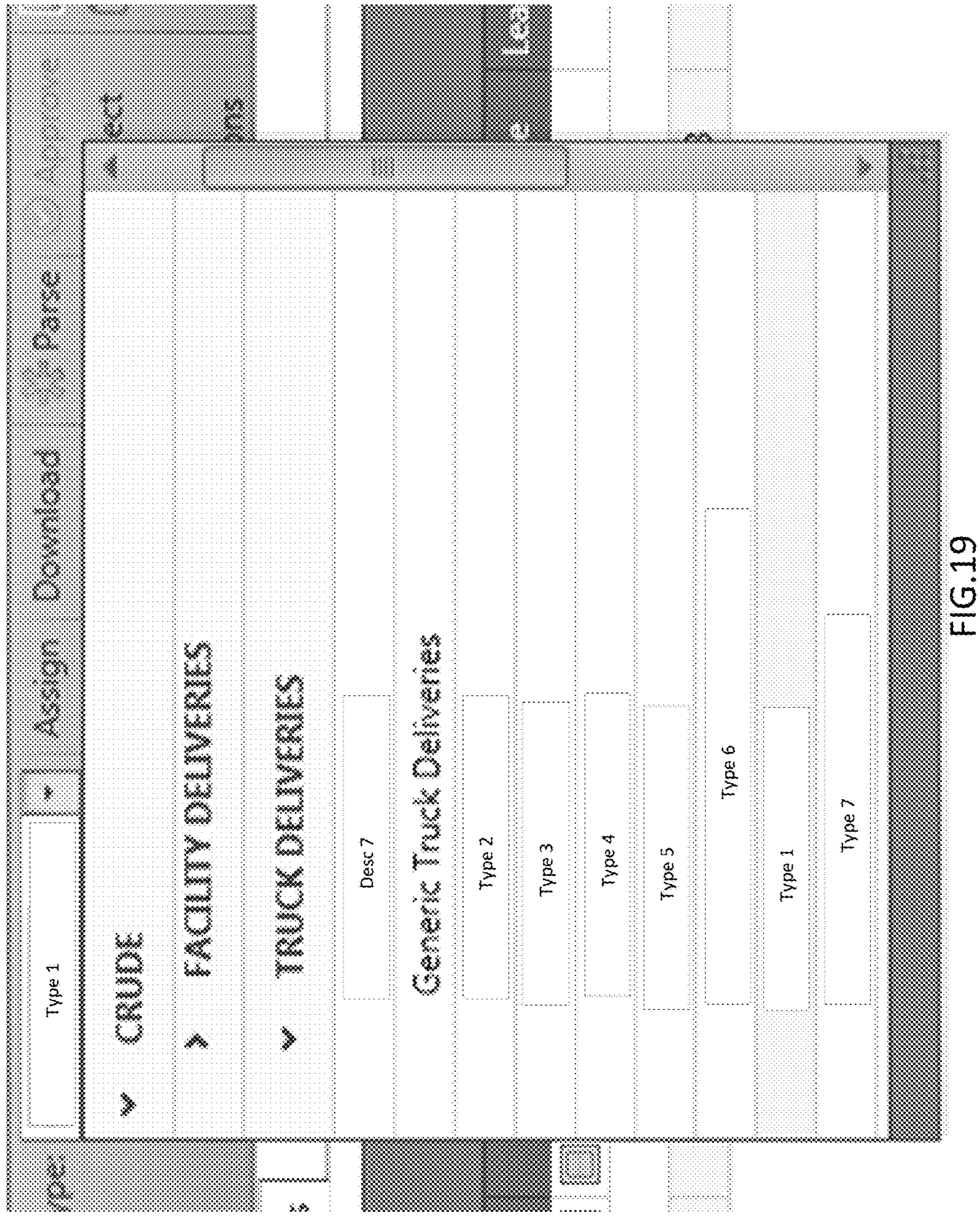
FIG. 19 illustrates an example display screen representing example data security, in accordance with an example implementation.
Figure 20:
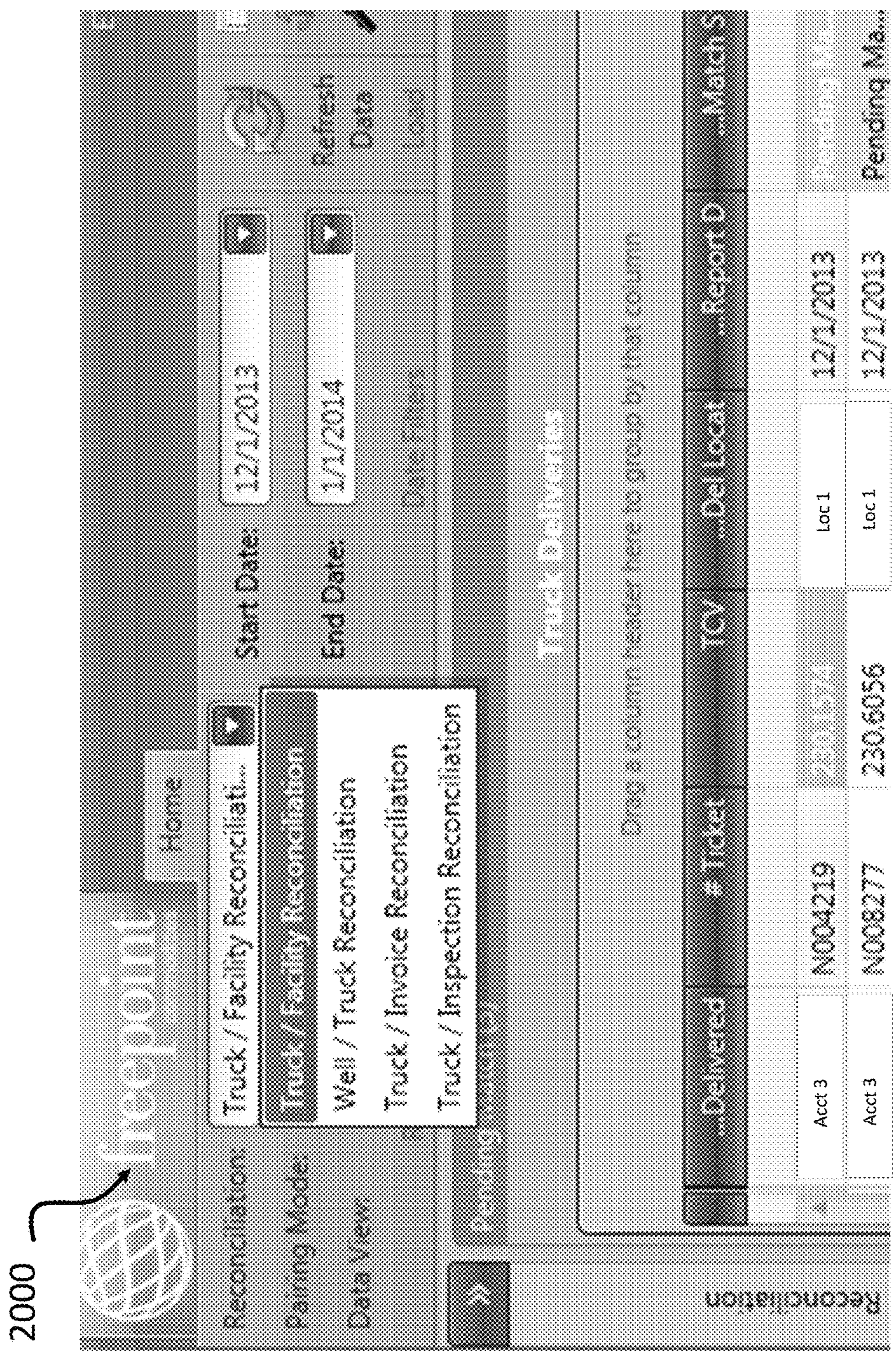
FIG. 20 illustrates an example assigned reconciliation security, in accordance with an example implementation.
Figure 21:
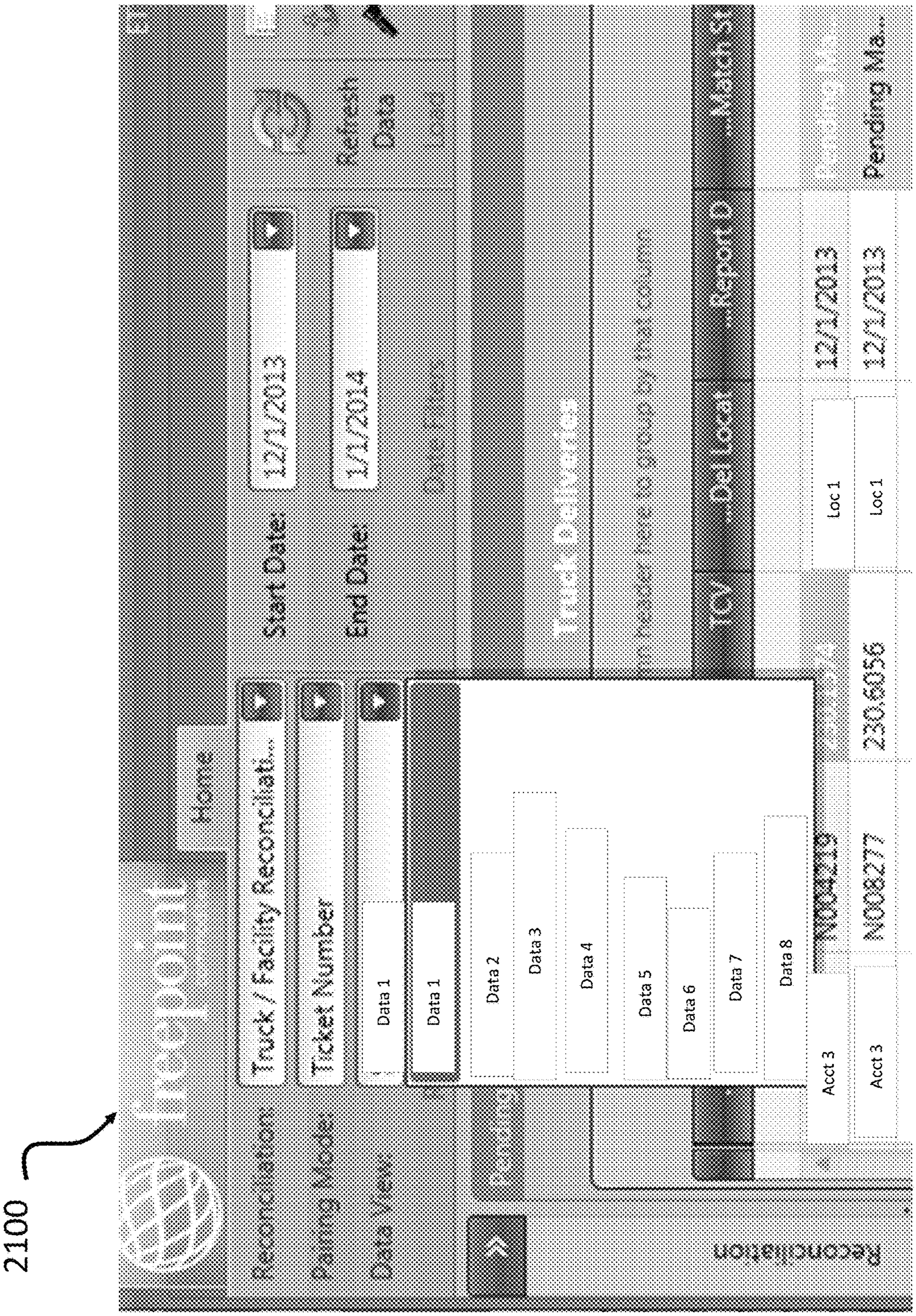
FIG. 21 illustrates an example of assigned data security, in accordance with an example implementation.
Figure 22:
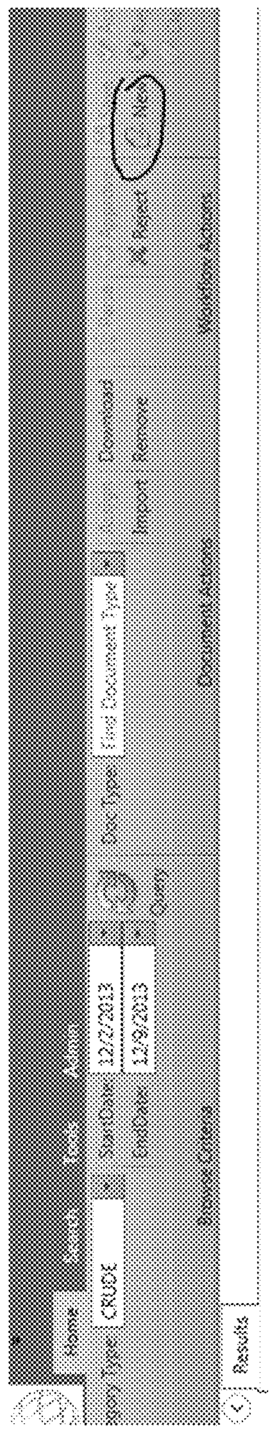
FIGS. 22-26 illustrate example display screens relating to options for new data entry, in accordance with one or more example implementations.

In addition to task security, the present application includes a level of data (or row level) security. Data security can determine particular data that a user is able to access. For example, a user is assigned to the Read Data Role but only to see certain document type in the Document Viewer. In one or more implementations, the Read Data Role controls respective application functions the user is able to perform, not the data that can be accessed. An example of ROLES SECURITY is shown in FIG. 19. An example of assigned reconciliation security is shown is FIG. 20. An example of assigned data security is shown is FIG. 21.

In one or more implementations, the Document Viewer and Reconciliation Application support advanced record creation and edit functionality that is specific per document type. The advanced create and edit functionality provides for convenient data entry and rich client validation as entering data subject to business rules specific to the type of data being entered.

Figure 23:
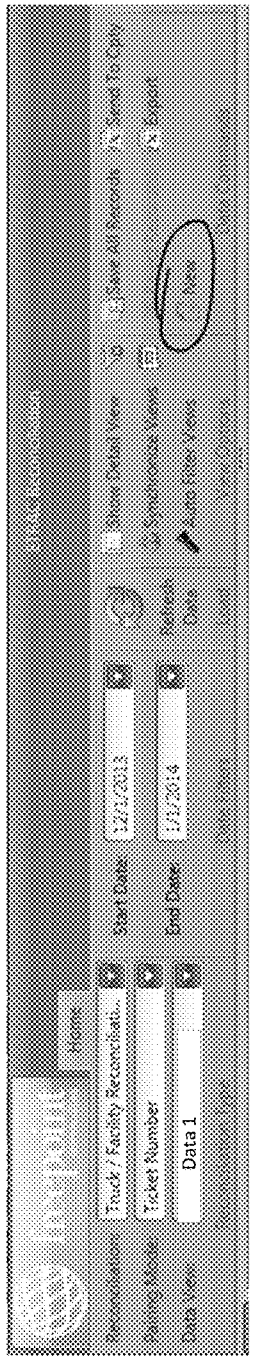
Figure 24:
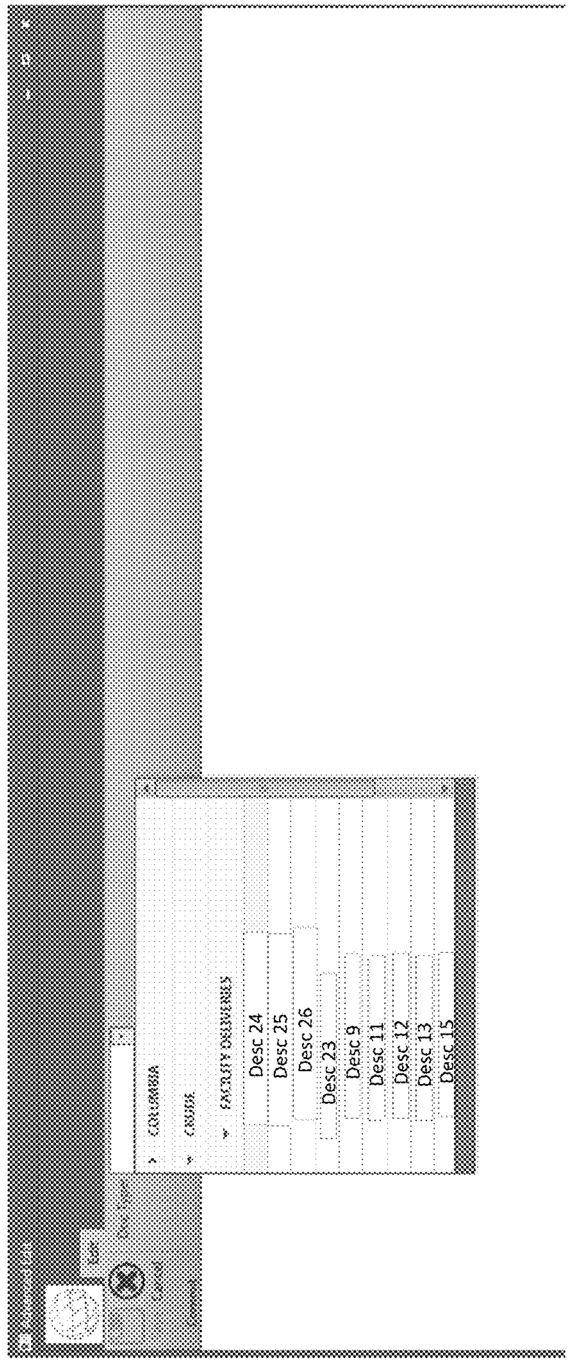
Figure 25:
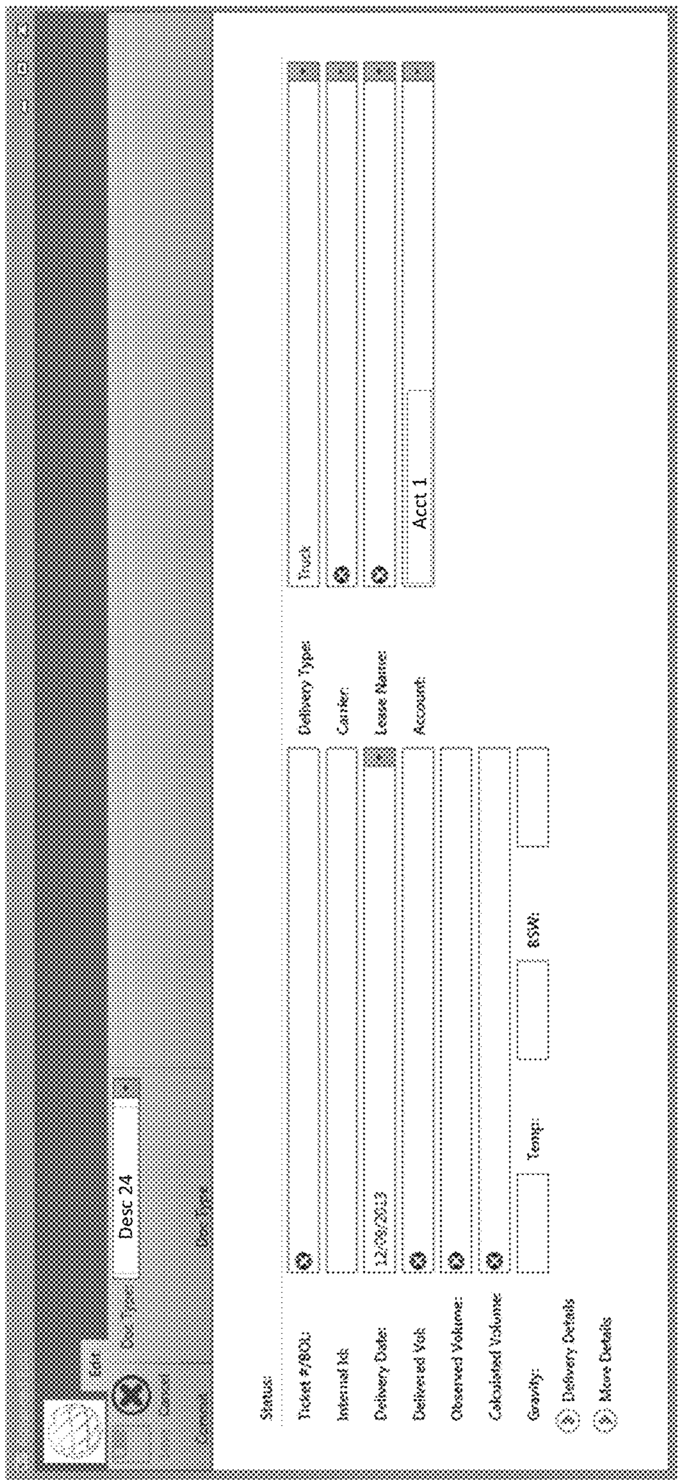
Figure 26:
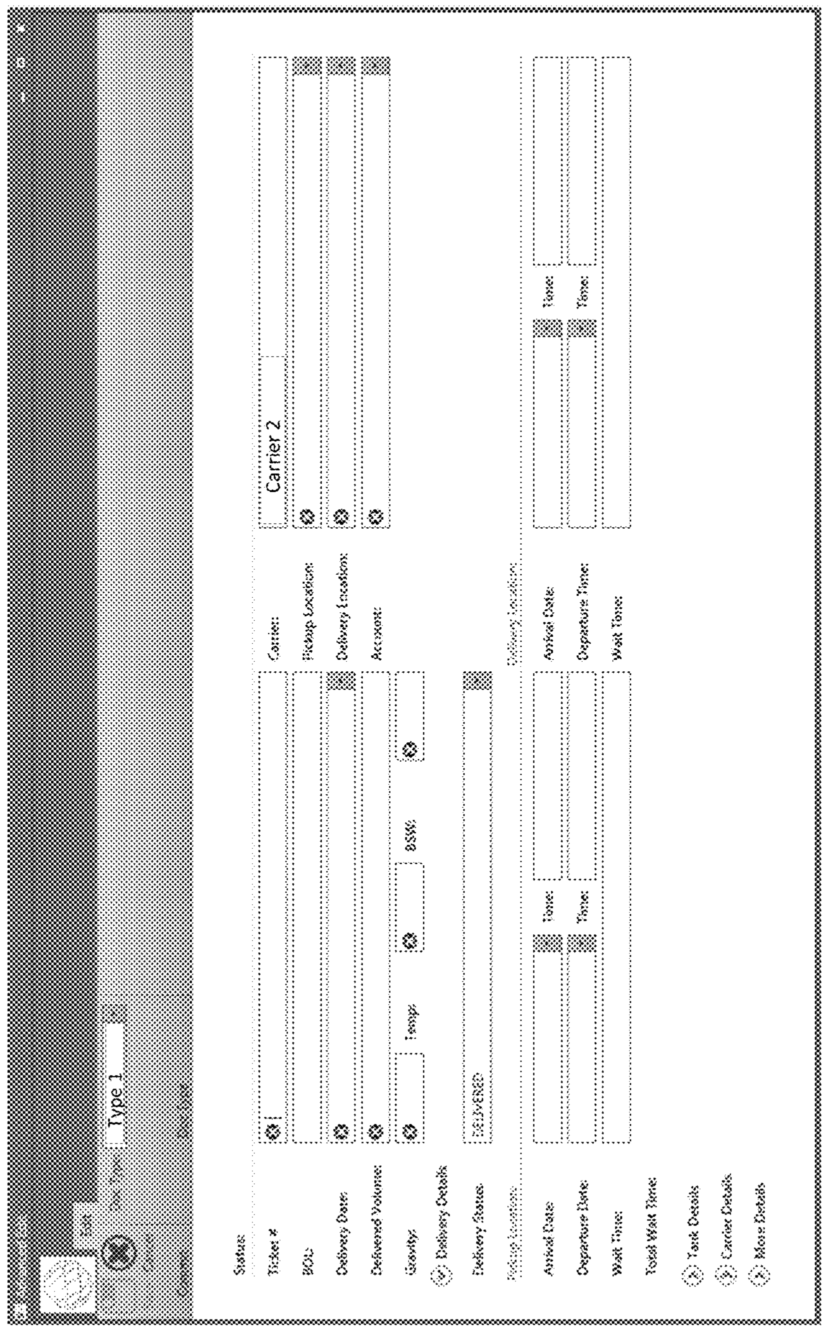

The present application supports enabling a user to create a new a new record, though the user may not have a document. In one or more implementations, options are provided to select from the Document Viewer or Reconciliation App. In an example implementation, options from the document viewer can include: Document Viewer→Home tab→Results Actions group→New. An example implementation is shown in FIGS. 22-26. With reference to the example display screen 2200 shown in FIG. 22 and that is associated with an example Reconciliation Application, selectable options can include Reconciliation Application→Home tab→Data Commands group→New. An example display screen 2300 illustrating this functionality is shown in FIG. 23. In response to these selections, and the user selections an option to create a new record (e.g., by selecting the new button in example display screen 2300), a blank editing surface can be provided and the user is prompted to select a respective document type to create. FIG. 24 illustrates an example display screen 2400 that includes a selectable drop down list of options associated with available document types. In the example shown in FIG. 24, facility deliveries document types are provided for respective companies. Continuing with the example implementation and shown in display screen 2500 in FIG. 25, after a user selects a respective document type (e.g., Inbound Trucking, which is a facility record), a custom editor can be provided that is configured for the selected document type. In one or more implementations of the present application, a plurality of custom editors, each that can correspond to one or more document types. For example, a user selects a Truck Delivery document instead of a Facility Record, a template editor for that respective document type can be provided. FIG. 26 illustrates an example display screen 2600 associated with an editor template for a document associated with truck deliveries.

Figure 27:
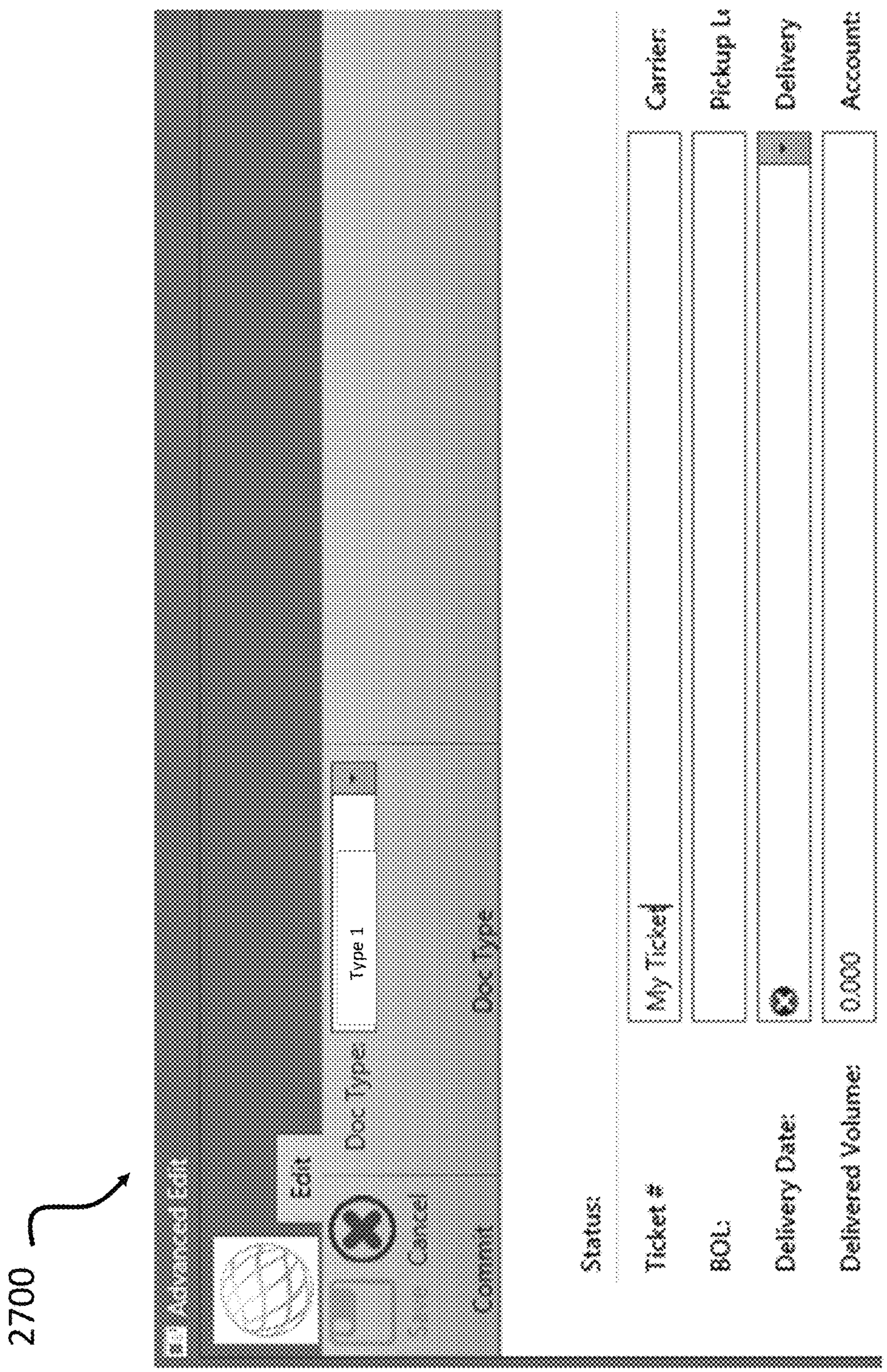
FIG. 27 illustrates an example display screen for data entry, in accordance with an example implementation.

Continuing with reference to an example workflow associated with entering new records, after a user has selected a respective document type (FIG. 24), the user is prompted to enter data for the record. Some data fields can be defined as required for the record, and can be designated as such, such as being with a red x and/or can otherwise differ, for example depending on the selected document type. For example and with reference to FIG. 26, a truck delivery requires that the user specify a delivery location. This particular data field may not appear in a data form associated on facility deliveries (e.g., FIG. 25). In one or more implementations, after a user has provided a value that satisfies one or more validation rules, an indicator (such as indicating a validation error) can disappear. An example data entry display screen is illustrated in the example display screen 2700 shown in FIG. 27.

Figure 28:
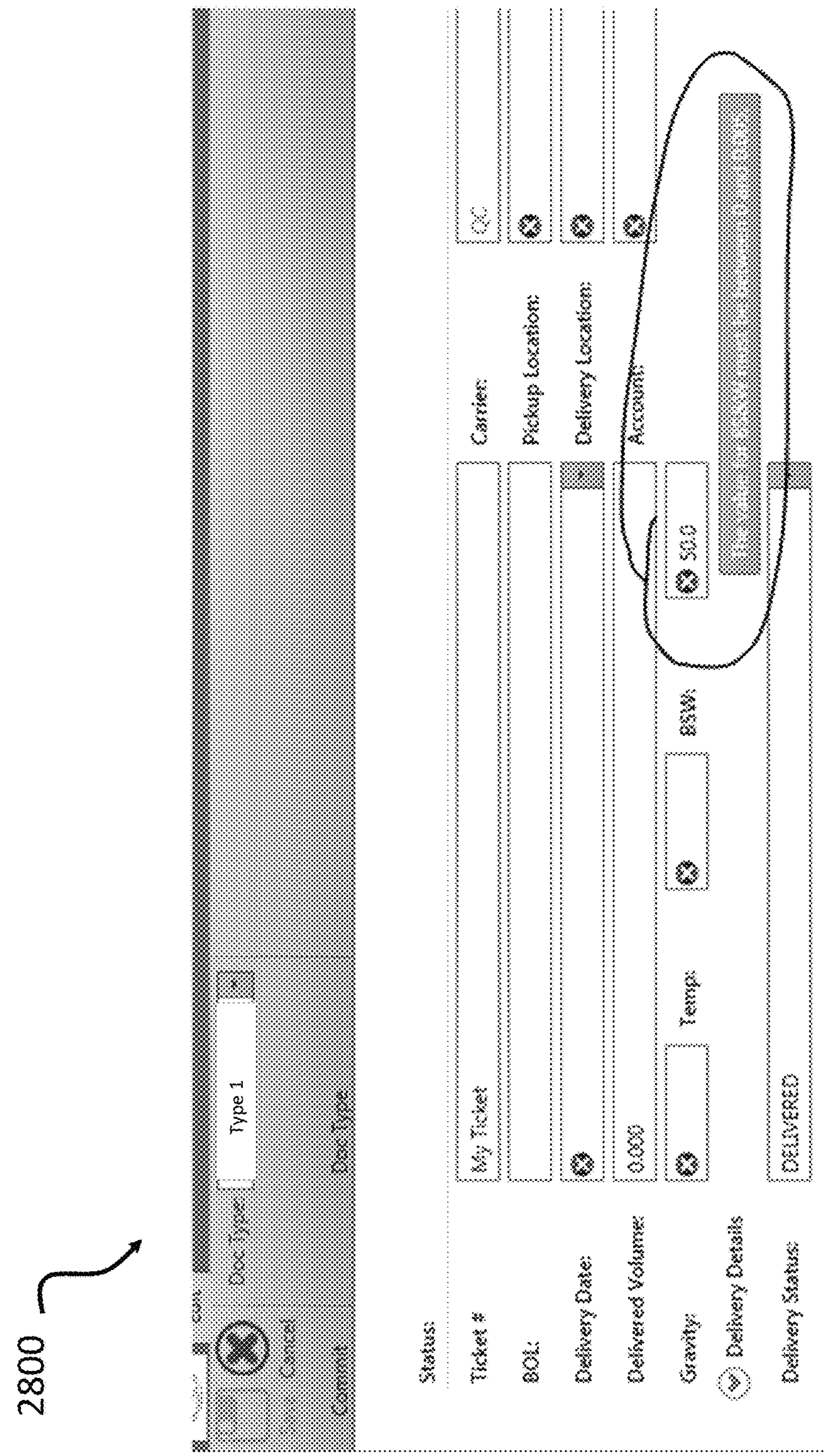
FIG. 28 illustrates example data validation, in accordance with an example implementation.
Figure 29:
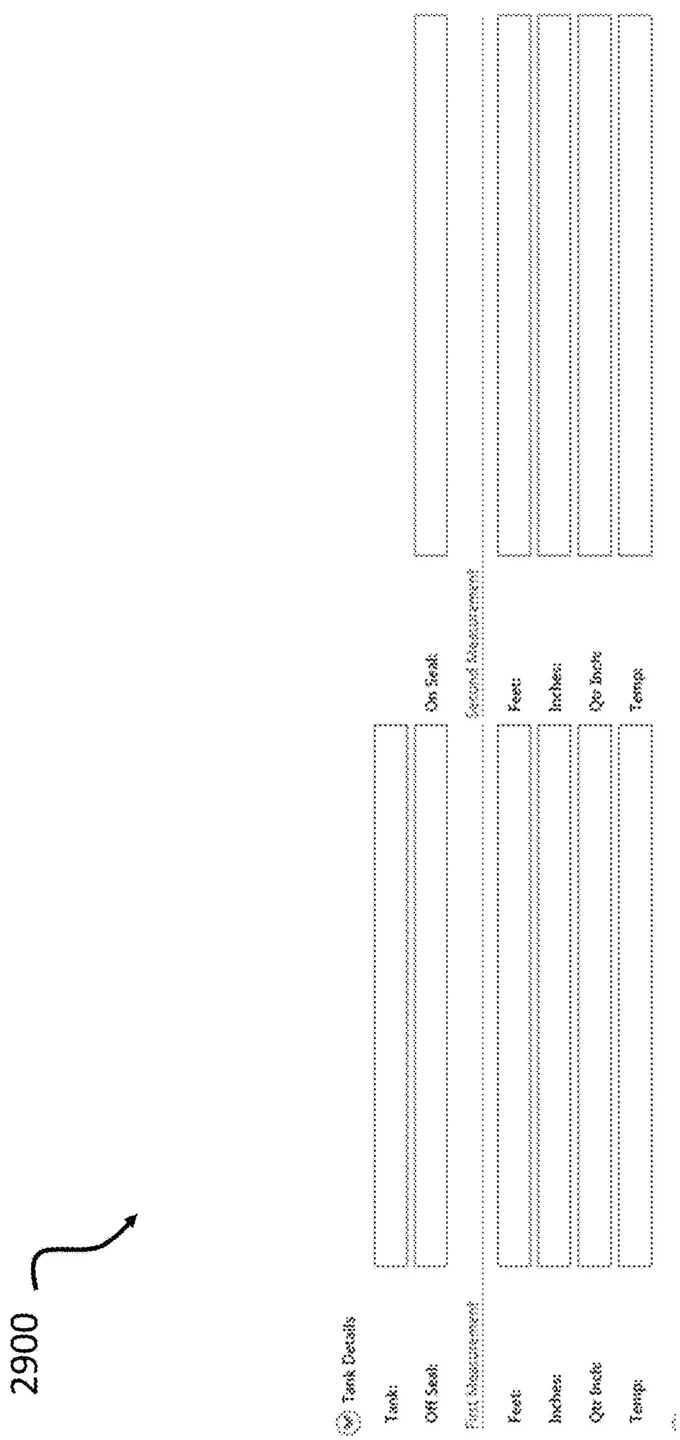
FIGS. 29-31 illustrate example display screens with expanded data entry view and graphical screen controls, in accordance with one or more example implementations.
Figure 30:
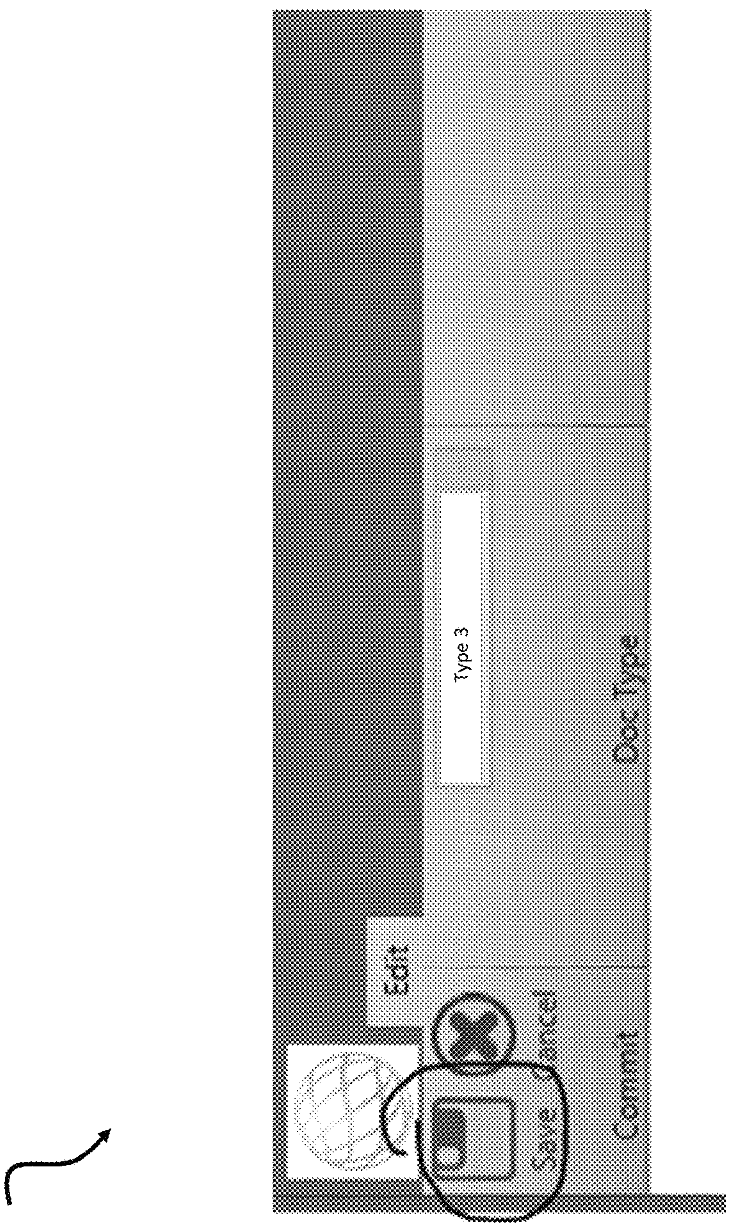
Figure 31:
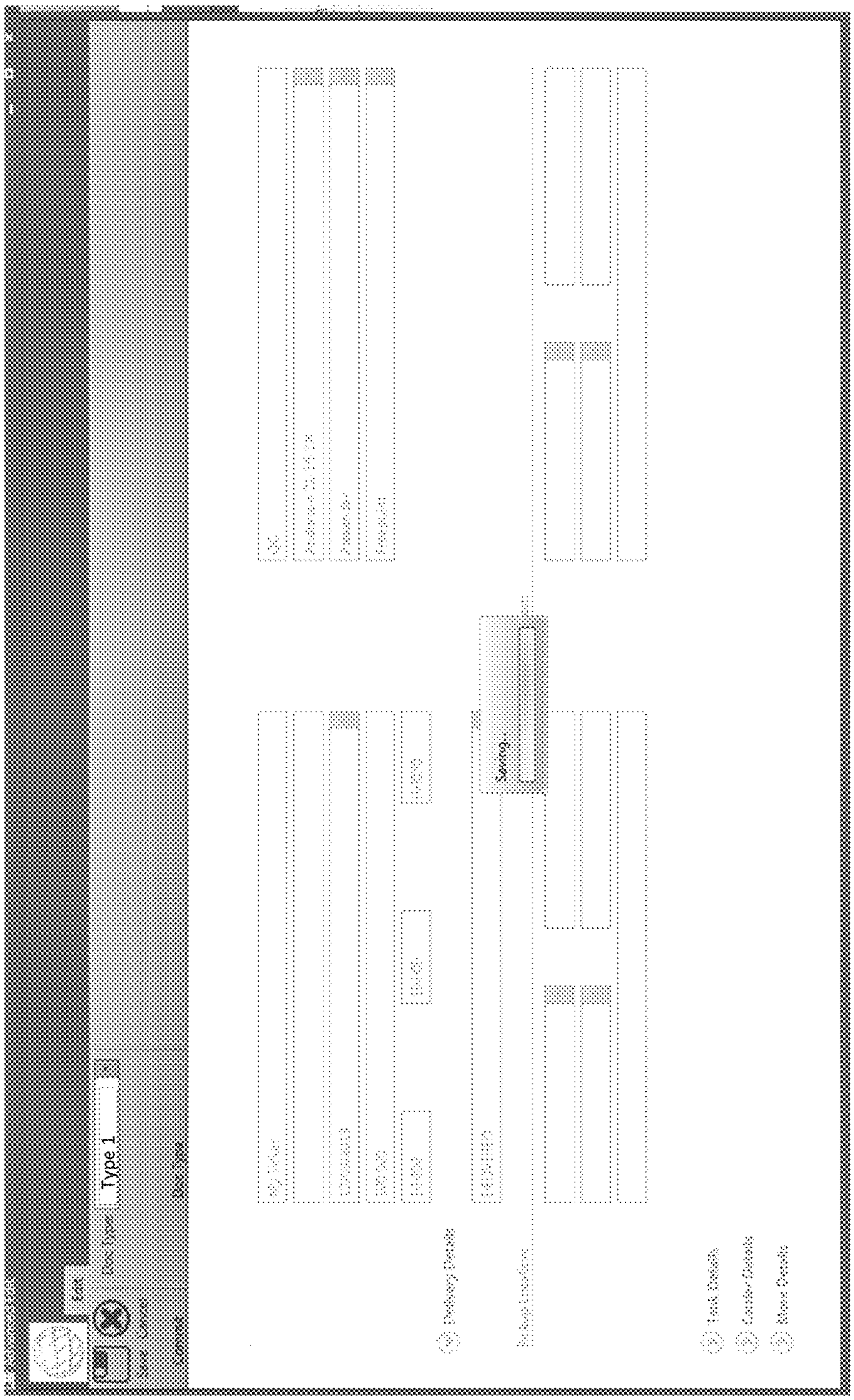

The present application further supports multiple rules that can be applied to a single data entry field. For example and as illustrated in the example Truck Delivery editor shown in the display screen 2800 (FIG. 28), BSW is required and must be between 0 and 0.005. If a user has entered a value into a field, but the validation indicator does not disappear, the user can see that the rule has been broken by placing the mouse pointer over the field. For example and as shown in FIG. 28, if a user enters a value of 50.0 into the BSW field, the value does not pass the validation rules and a tooltip can appear. Moreover, frequently used and required fields can be formatted in an "expanded" view in an editor. In addition, one or more collapsed sections can be provided that contain data fields for receiving additional information. For example, entering information associated with tank details, carrier details or other details can be affected by selecting a graphical control. Once selected, a corresponding collapsed section can expand for the user to enter additional details. An example expanded data entry view associated with truck details is illustrated in the example display screen 2900 set forth in FIG. 29. After a user has completed entering data and that satisfy validation rules for a document type, the user can be prompted to select a graphical screen control, such as a Save button and as illustrated in the example display screen 3000, shown in FIG. 30. In one or more implementations, the save button can be enabled in the Advanced Edit→Edit tab→Commit group. Once the save button is selected, the record can be processed and a new document created and stored. An example is shown in display screen 3100 in FIG. 31. In one or more implementations of the present application, the newly created document can automatically appear in the Home tab→Browse grid associated with the Document Viewer. Alternatively, the user can view the newly created document in the Reconciliation App, for example, by selecting a Query button in the Document Viewer→Home tab→Browse Criteria group.

Figure 32A:
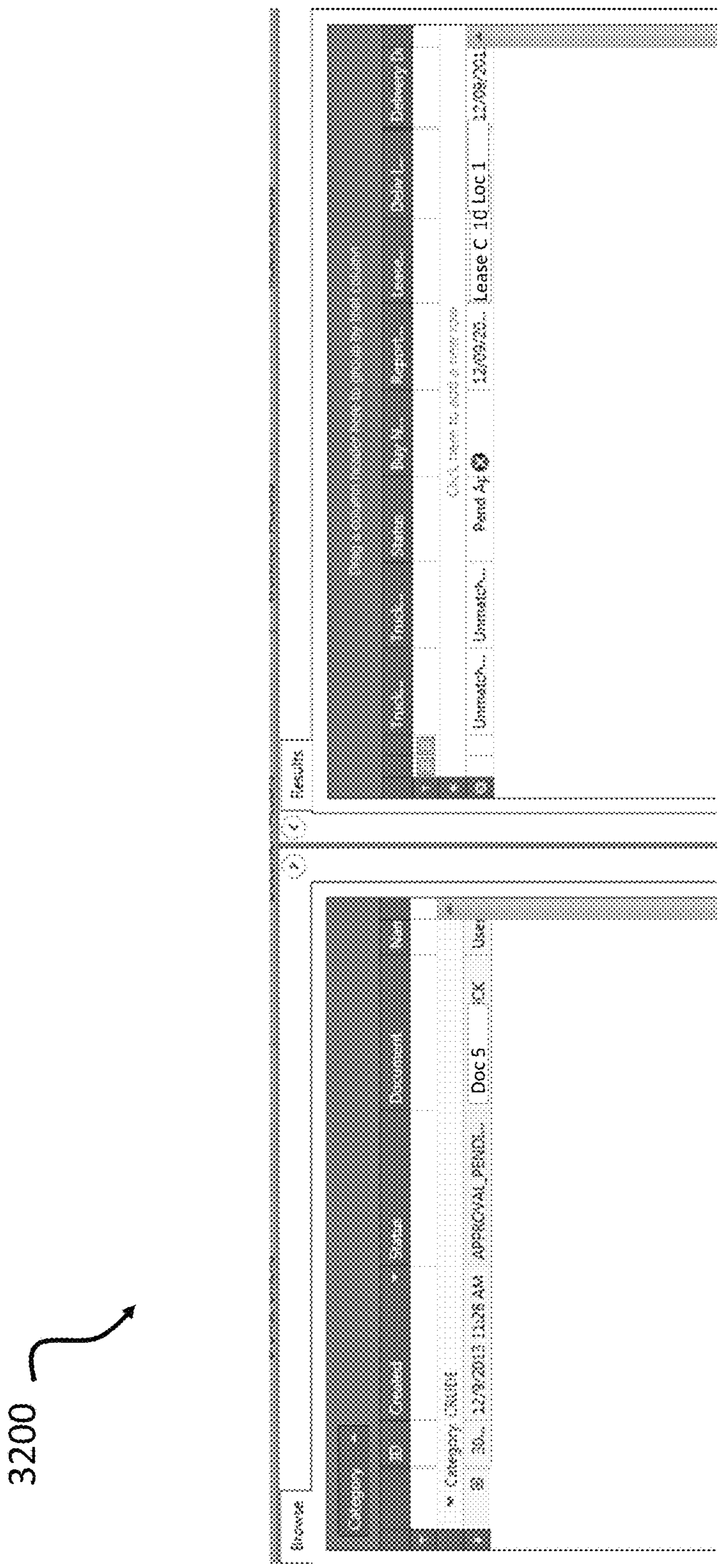
FIGS. 32A-33 illustrate example display screens for document and record approval, rejection, commenting and tagging, in accordance with one or more example implementations.

As a newly created document appears in the Document Viewer, the document can be reviewed and approved before it is processed in accordance with one or more reconciliation processes, such as shown and described herein. As with other documents, the user can be provided information to determine a particular stage of a workflow that the document is currently in. The document and the record can be approved, rejected, commented, tagged, or the like. An example is shown in the display screen 3200 in FIG. 32A.

Figure 32B:
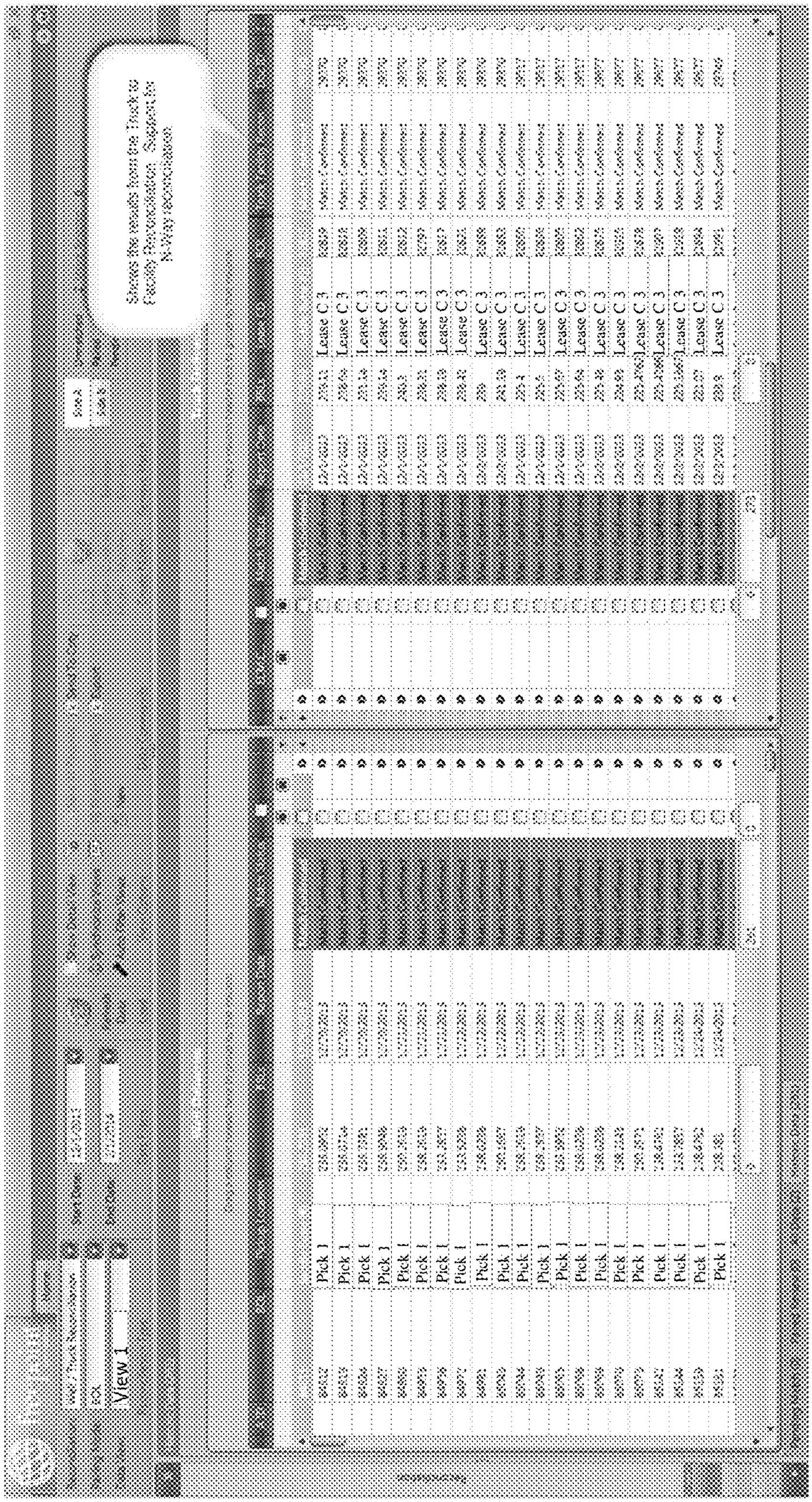

The present application provides significant flexibility in connection with reconciliation processes, such as for information received from a plurality of sources, and processed in accordance with the teachings herein. For example, information received from a producer and from a transport provider representing a single transaction may be reconciled, however information from the transport provider and a facility representing the same transaction may not be reconciled. The present application supports N-way reconciliation processes, such as for reconciliation between producer data and transporter data and illustrated in the example display screen 3230, shown in FIG. 32B. In the example display screen 3230, reconciliation is provided and the results are shown for reconciliation of data received from the transporter (the truck) to the facility. Also as shown in example display screen 3230, for any one of the respective enriched data points, a respective reconciliation status of a particular record associated with, for example, truck delivery information is also shown in connection with the facility data.

Figure 32C:
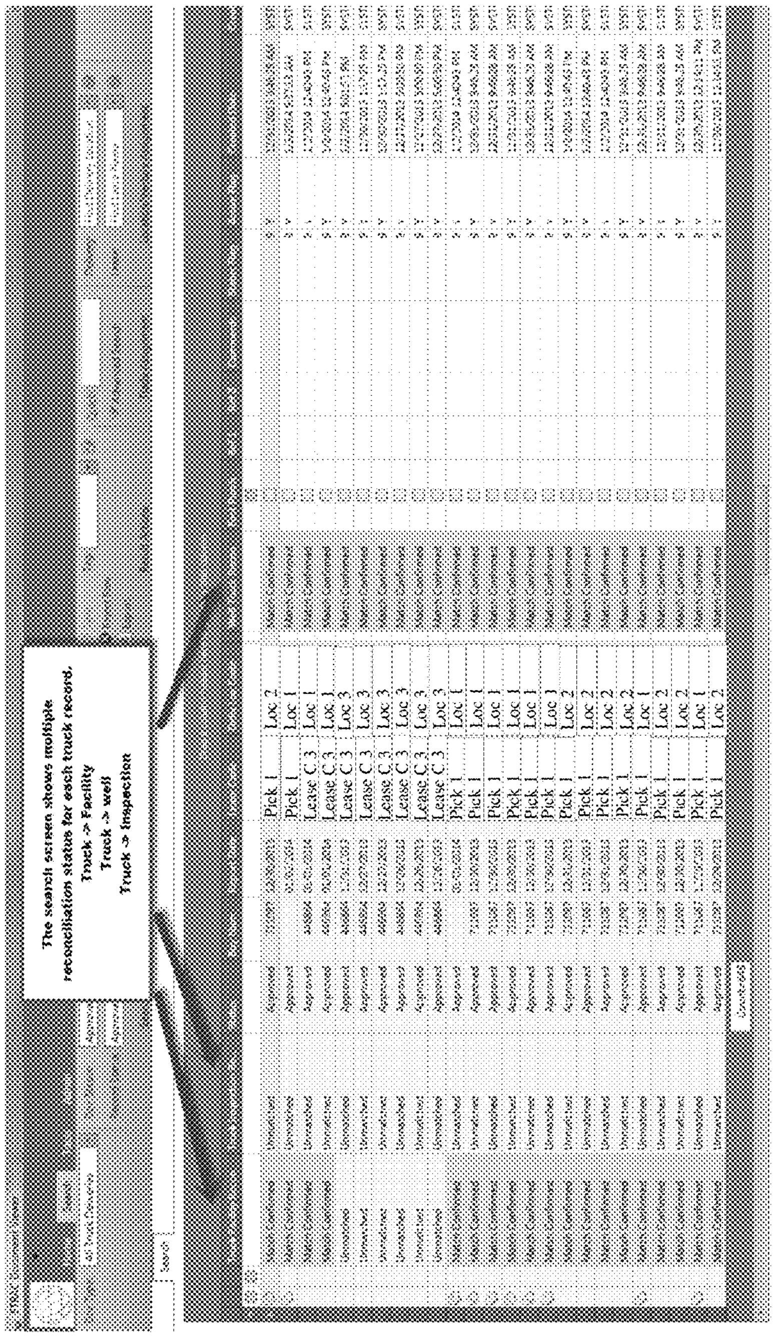

Any particular record may have reconciliation status information associated with a plurality of data records received from various sources. FIG. 32C illustrates an example search screen 3250 that illustrates multiple reconciliation statuses for each respective record. For example, the display screen 3250 shows multiple reconciliation statuses for each truck record: i.e., truck to facility; truck to well; and truck to barge.

Figure 33:
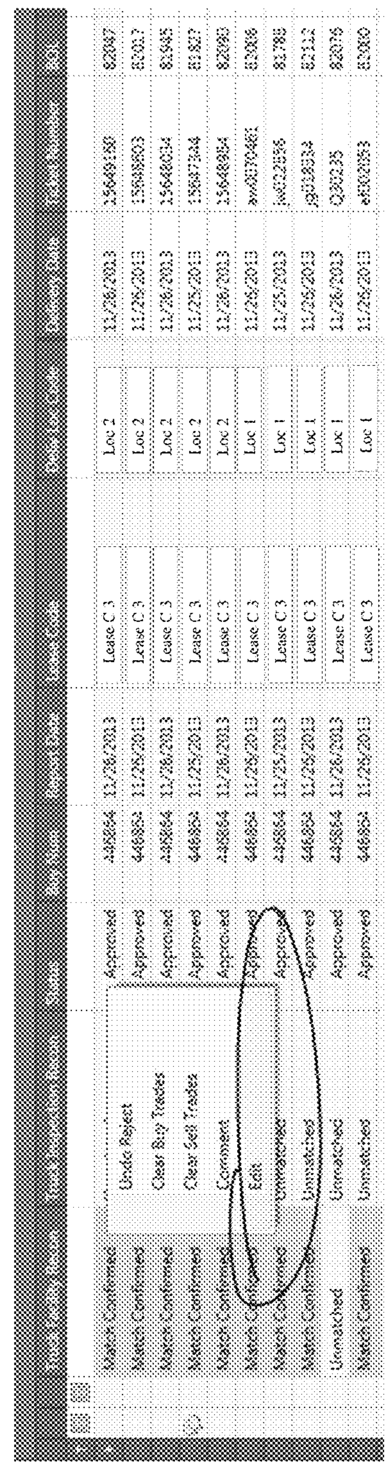
Figure 34:
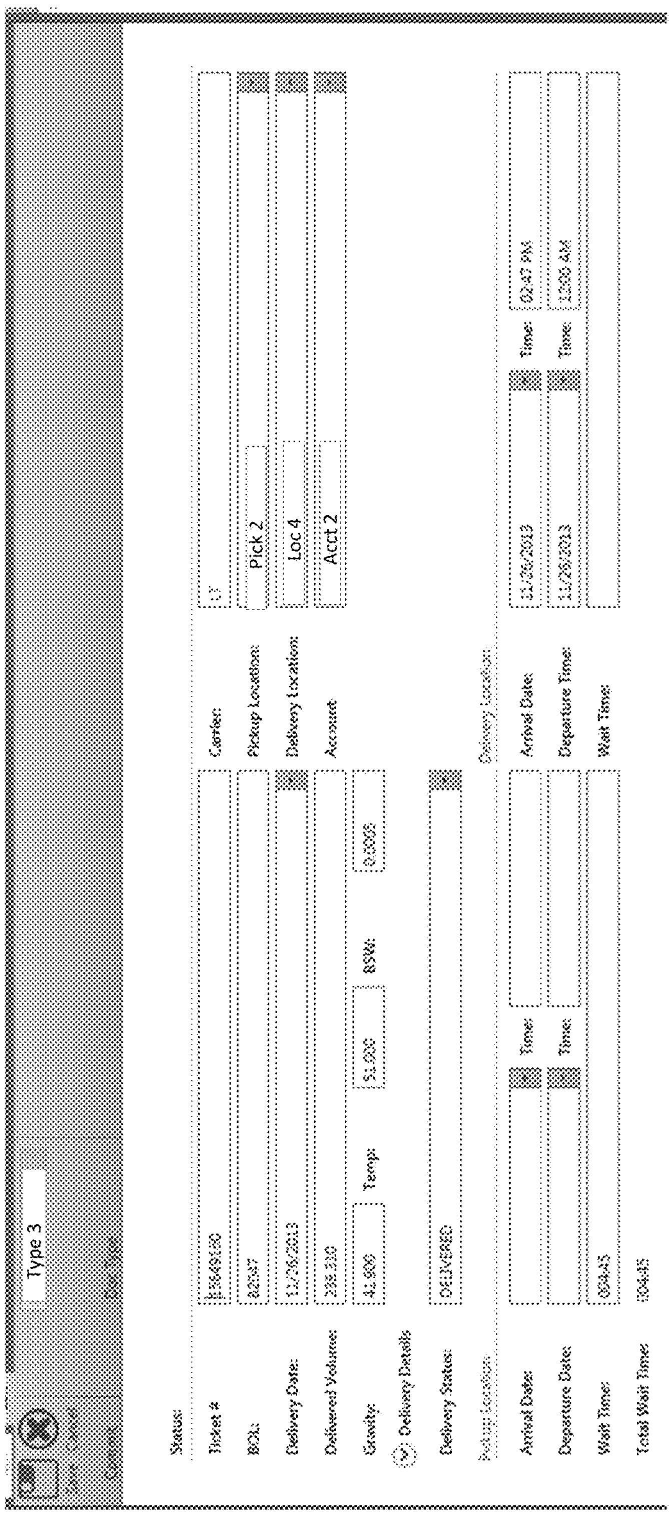
FIG. 34 illustrates example data entry and editing functionality, in accordance with an example implementation.
Figure 35:
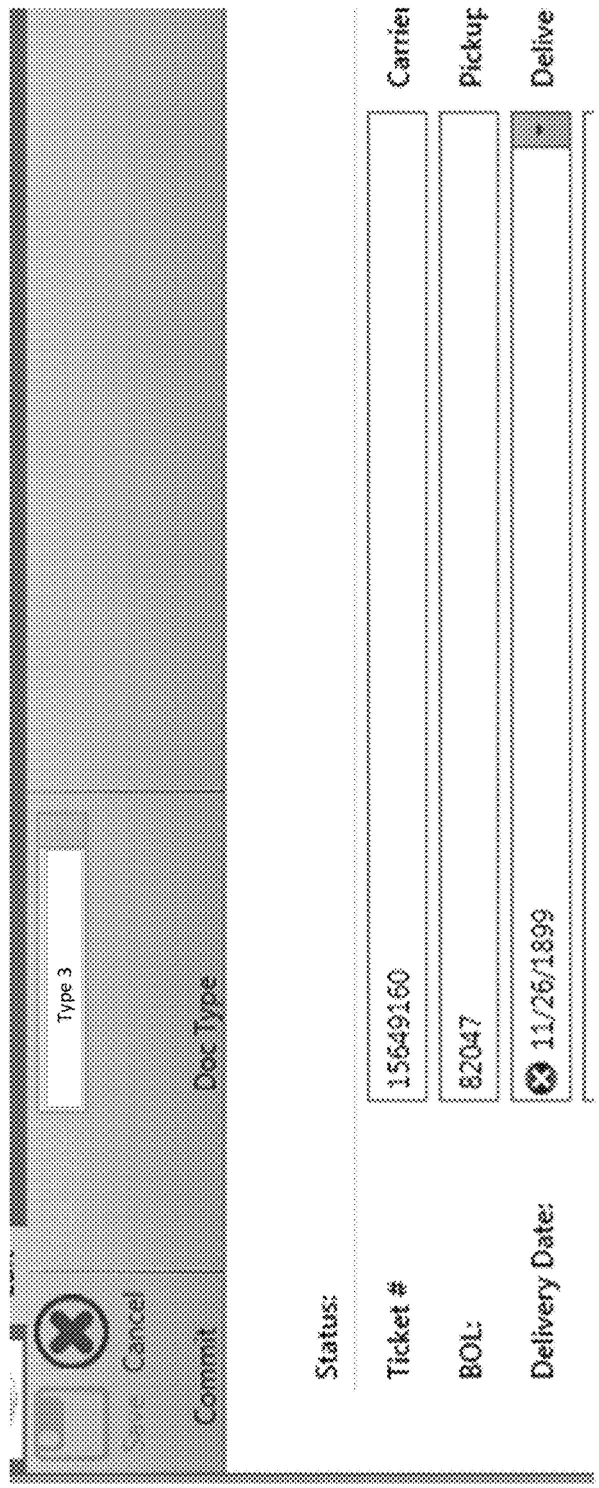
FIGS. 35-38 illustrate additional functionality associated with data validation and management, in accordance with one or more example implementations.
Figure 36:
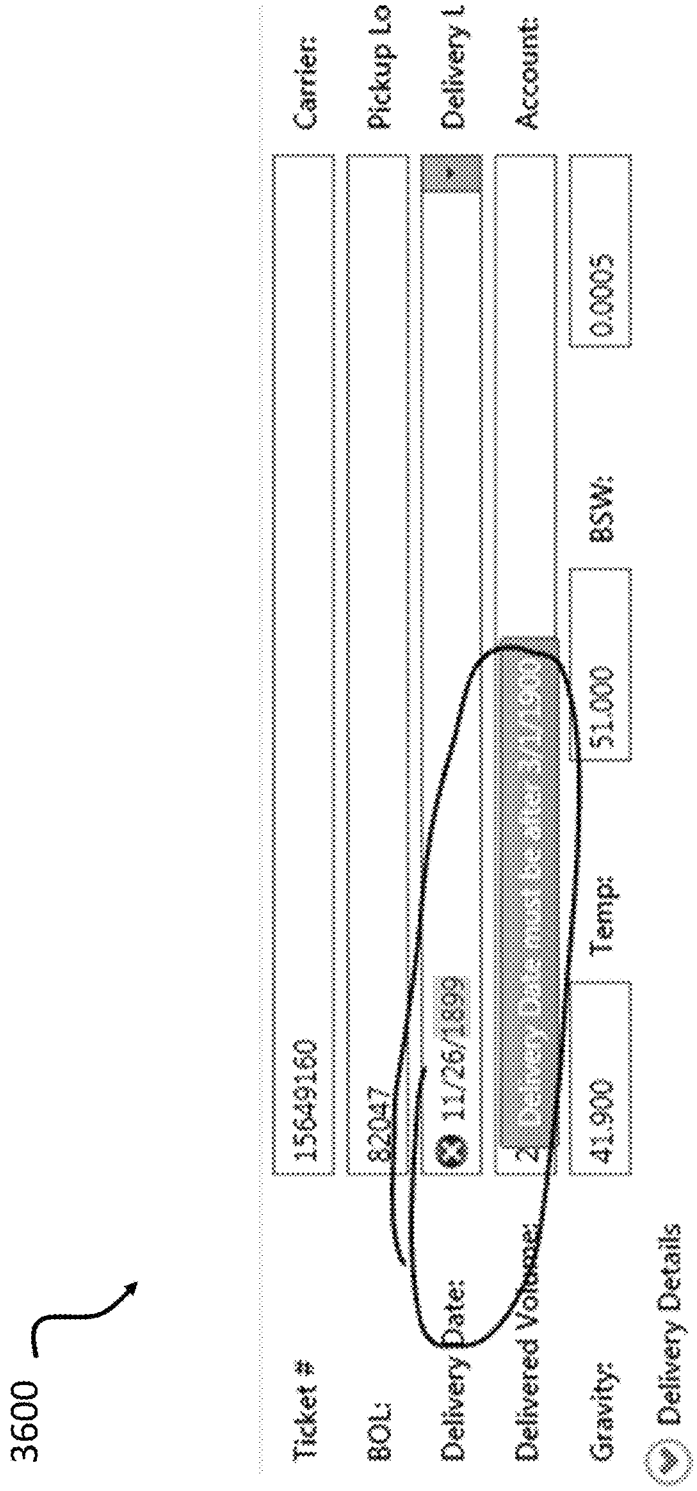
Figure 37:
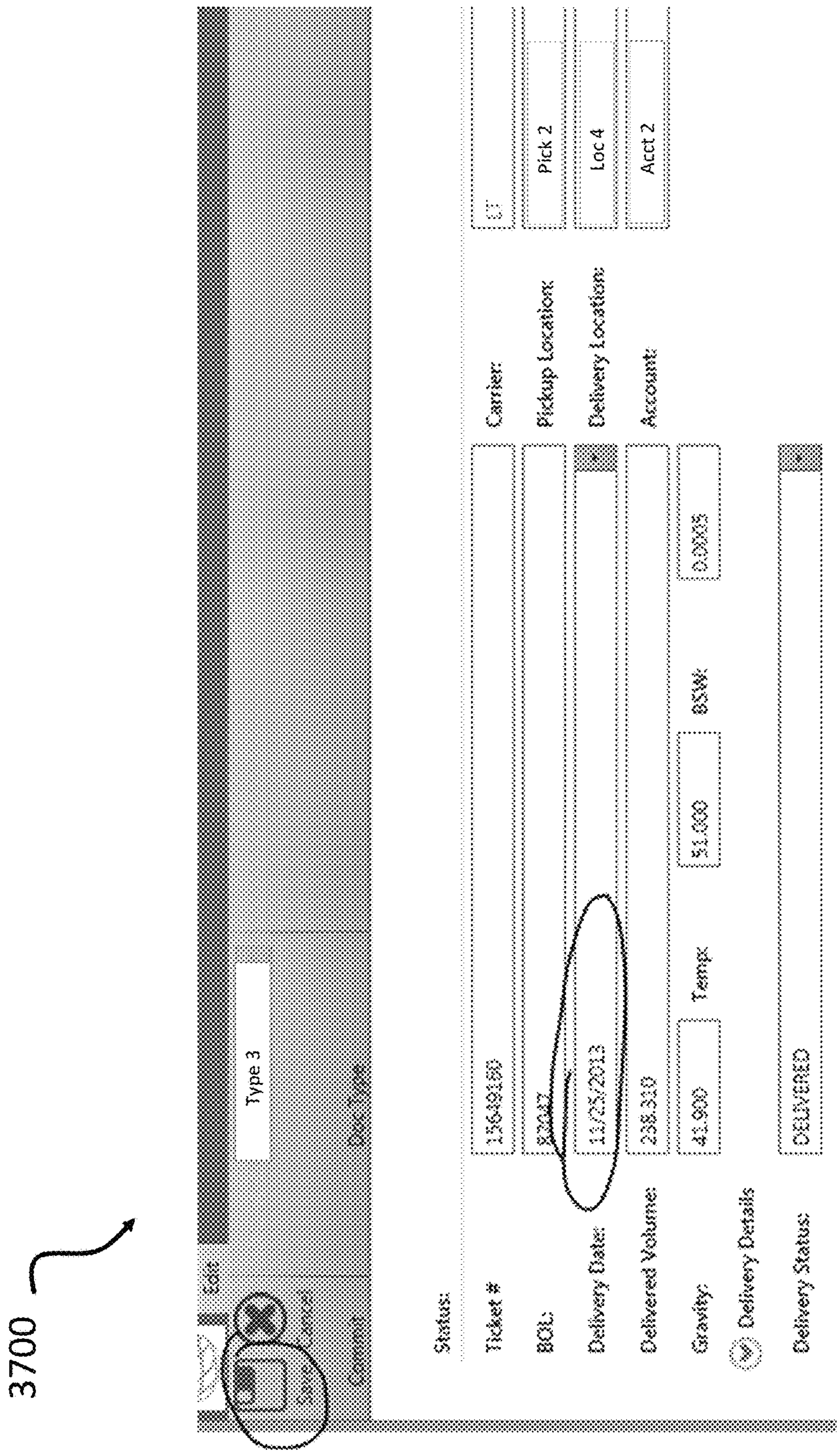

In addition to adding new records with an editor, such as shown and described herein, the present application supports editing existing records. In one or more implementations, after an existing record is edited and saved, a new document can be created that is processed in accordance with an approval process. Accordingly, edit does not require that an existing record is modified. Instead, a correction record can be created that is based on the record that has been selected. For example and with reference to the example display screen 3300 shown in FIG. 33, a user wishes to modify the Delivery Date from Nov. 26, 2013 to Nov. 25, 2013 for the highlighted ticket. The user can highlight the row, invoke a popup menu (e.g., by right clicking on the row) and select an option for Edit. Thereafter, an advanced editor appears, such as illustrated in the example display screen 3400 shown in FIG. 34. The user can be permitted to modify any data field, provided, for example, that the field is not restricted (such as designated read-only). In the event that the user modifies a data field in such as a way as to fail validation rules, the user can be prompted with the respective validation error indicator and a tooltip indicating the rule that was broken. An example is illustrated in display screen 3500 set forth in FIG. 35. Moreover, and as set forth with providing new records, the user can be prompted to resolve validation errors prior to successfully saving a record, such as illustrated in the example display screens 3600 and 3700 set forth in FIGS. 36 and 37, respectively.

Figure 38:
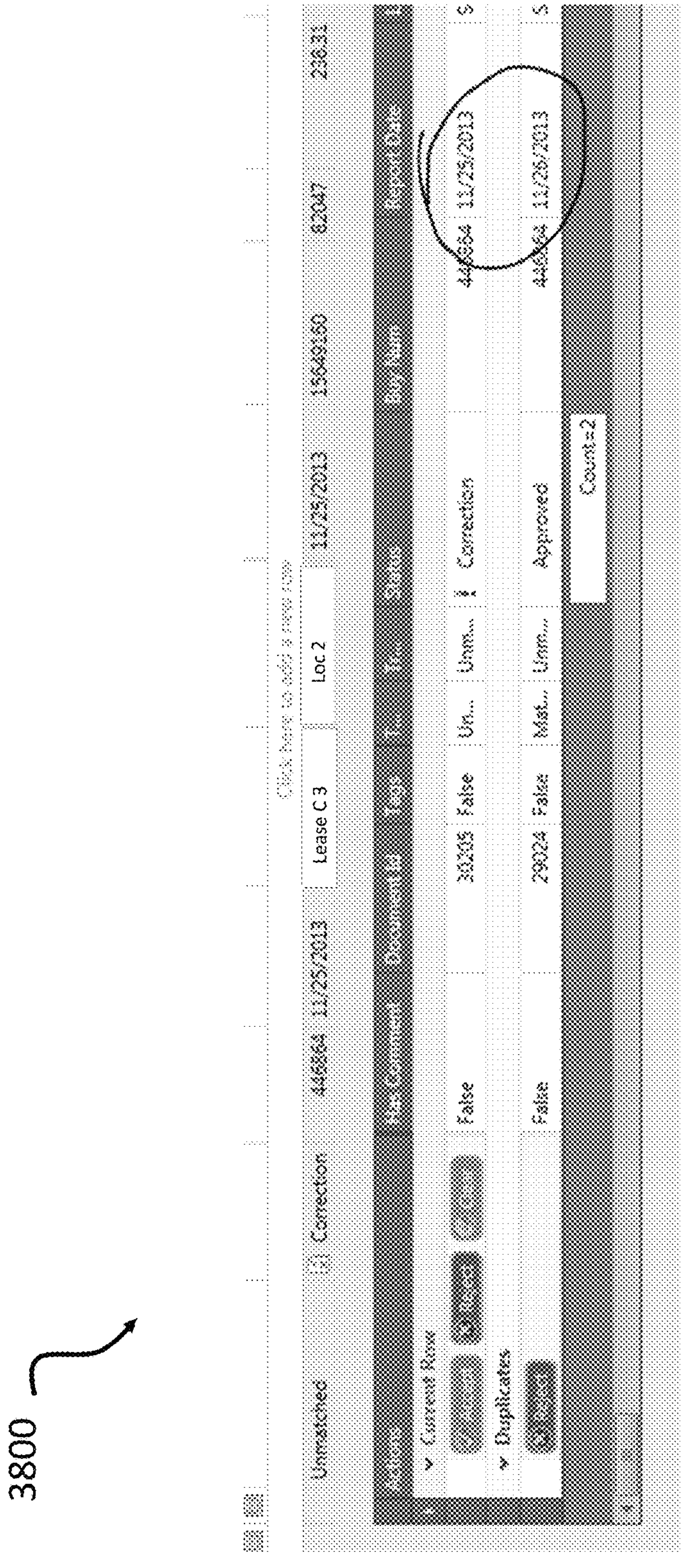

In accordance with one or more implementations of the present application, a new document (e.g., modified document) can be set forth with a duplicates detected status. Continuing with reference to the example set forth in FIGS. 33-37, this can occur, for example, because the user effectively created a copy of the ticket with all of the same information, except for the modified delivery date. The user who is responsible for approving documents can be provided access to the ticket that is being corrected and, accordingly, can choose to accept or reject this change. An example is illustrated in the display screen 3800 set forth in FIG. 38. In accordance with one or more implementations and in the event that the user started in the Document Viewer, the Home tab can automatically display the newly created document that is currently in Duplicates Detected status. Alternatively, if the user started editing in the Reconciliation Application, the user may be prompted to select (e.g., click) a Query button to see the document appear in the Document Viewer Browser. If the change is accepted, then in accordance with one or more implementations, the original ticket no longer appears in the Reconciliation Application and the match appear as Rejected, or the matching side is placed back into the pool for reconciliation. The remaining workflow can be identical for documents that originated from email or were imported manually and once the document is approved, the record can be available to be reconciled.

In addition, the present application supports comments. In accordance with one or more implementations shown and described herein, comments are supported for Truck Deliveries, Facility Deliveries and Broker Confirmations. When a comment is created or updated, a user subscribed to a respective communications (e.g., a "thread") as well as a user subscribed to all comments for a specified document type, receives an email notification containing the text of the created or updated comment. Additionally, user(s) can receive attachments that are/were provided with a comment, and/or remaining text of comments that were provided for a record. As used herein, a trail of comments on a record are referred to, generally, as a comment thread.

Figure 39:
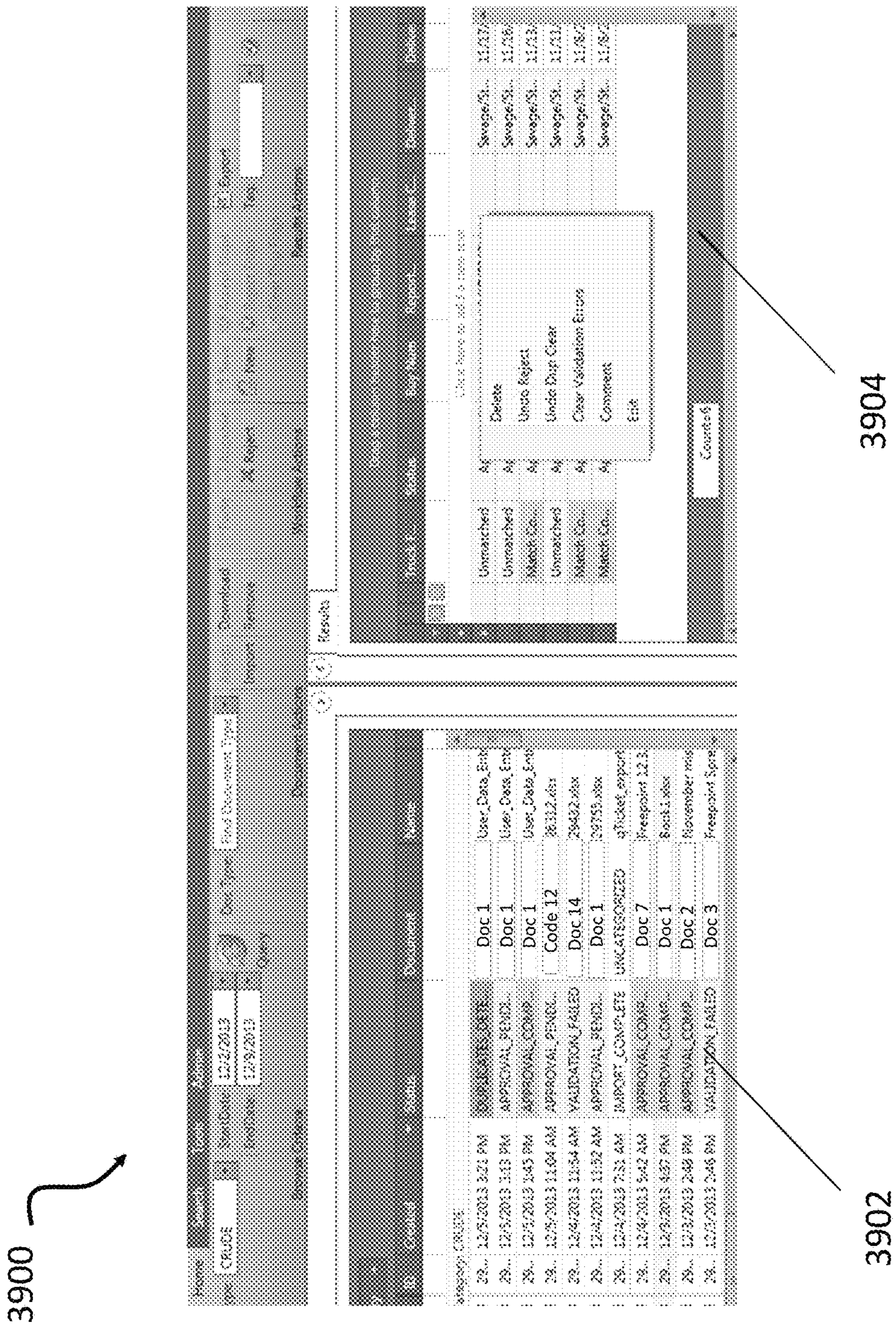
FIG. 39 illustrates an example the Document Viewer and table the Results table, in accordance with an example implementation, and includes additional functionality such as relating to commenting.
Figure 40:
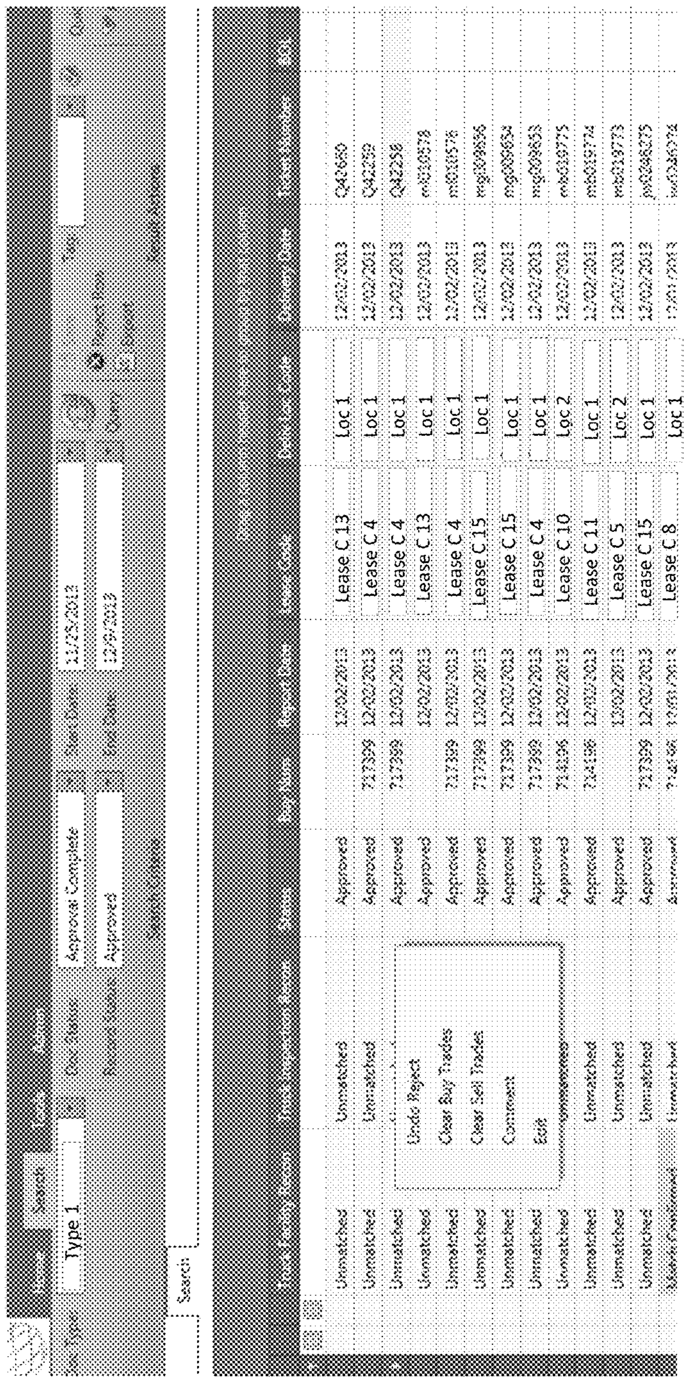
FIG. 40 illustrates an example display screen including searching and filtering criteria, in accordance with an example implementation.
Figure 41:
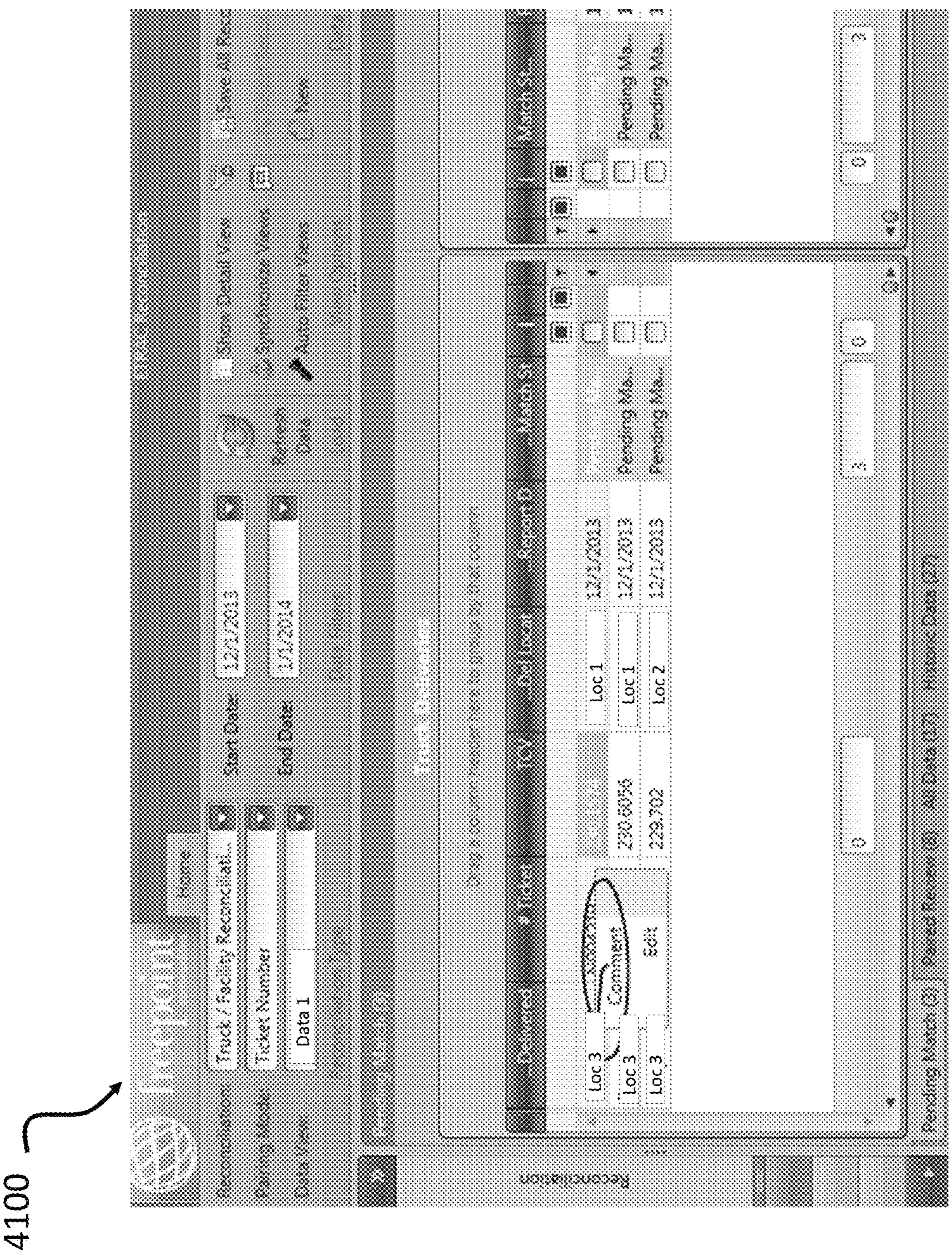
FIGS. 41-43 illustrate example display screens including commenting functionality, in accordance with one or more example implementations.

In one or more implementations, a comment can be created using the Document Viewer from either the Home tab or the Search tab. In the Reconciliation Application, a comment can be created from the Pending Match, Paired Review or All Data tabs. For example and as illustrated in the example display screen 3900 shown in FIG. 39, in the Document Viewer (3902) a user selects a document, and in the Results table (3904), the user can right click on a record and select Comment from the context menu. Alternatively and in one or more implementations, a user selects the Search tab, queries the records to create a comment on, right clicks on a record in the Search table and selects Comment. An example is illustrated in display screen 4000 shown in FIG. 40. In yet another alternative, comments can be provided using the Reconciliation Application, and can be created from the Pending Match, Paired Review and All Data tabs. In the example display screen 4100 shown in FIG. 41, in the Reconciliation Application a user can right click on a record and select Comment from the context menu.

Figure 42:
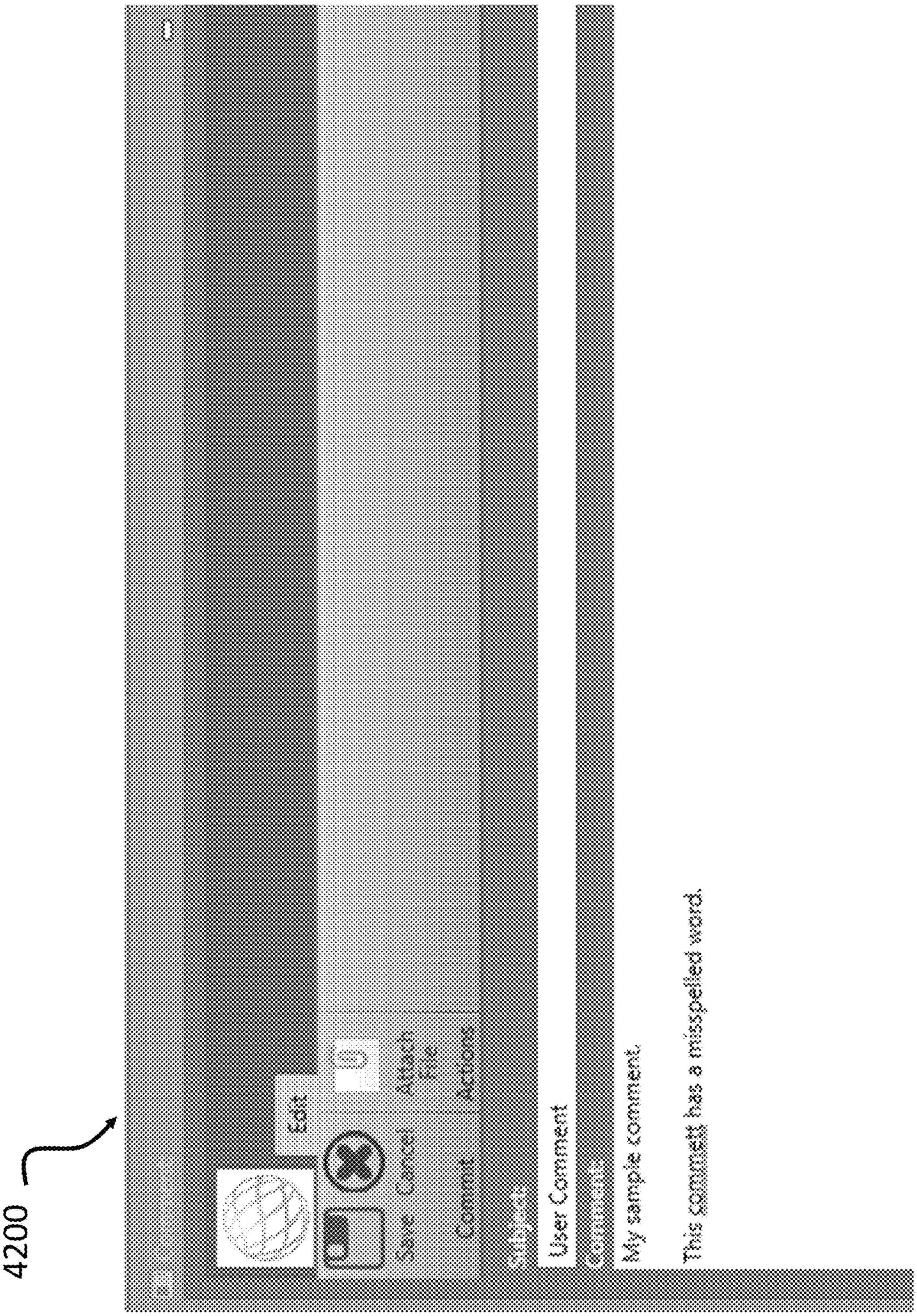
Figure 43:
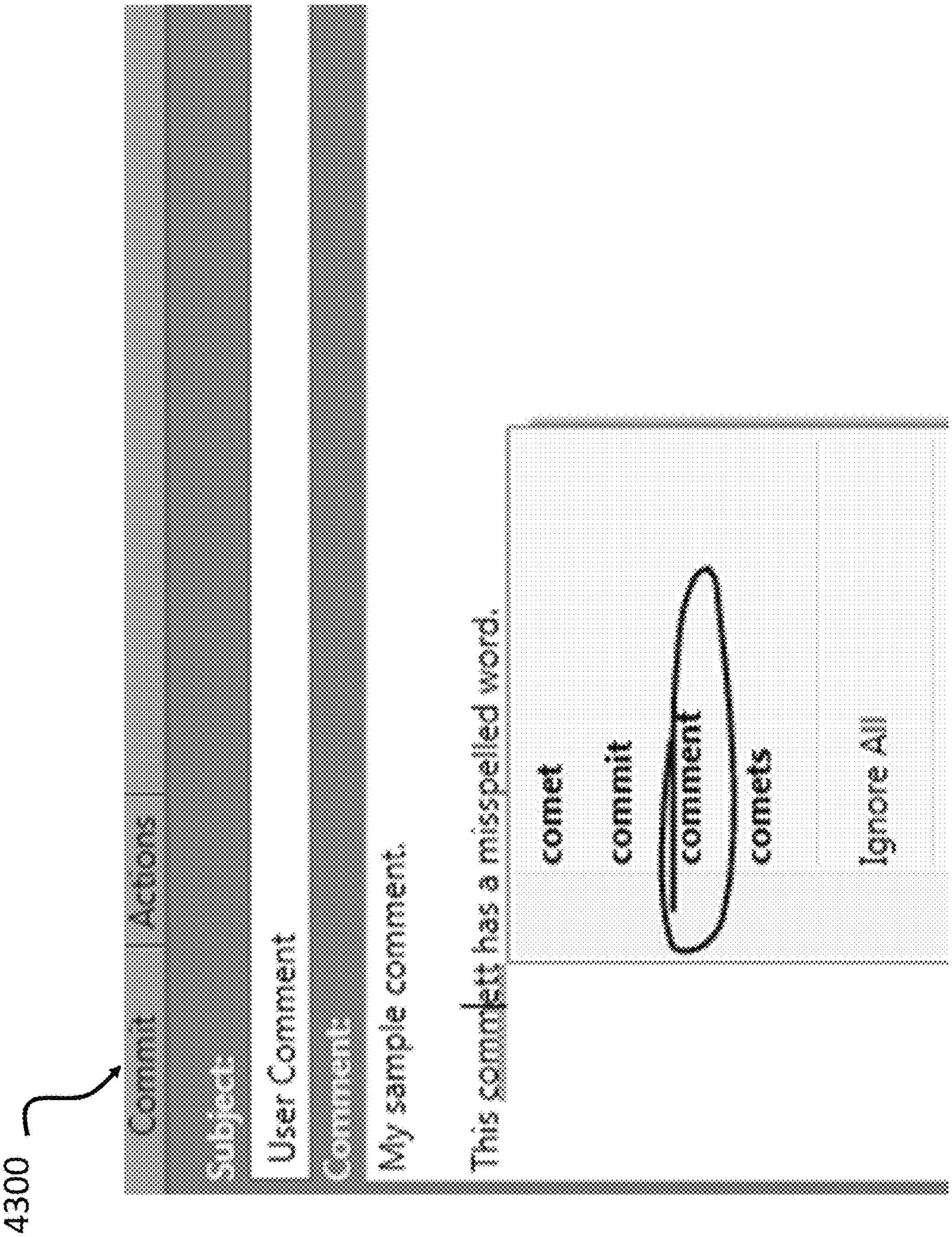

In accordance with one or more implementations of the present application, after a comment window appears, the user can enter a Subject and Comment body. The comment body can include spell check functionality as a user types and notify the user, such as with a red underline, of misspelled words. An example is illustrated in display screen 4200 shown in FIG. 42. The user can be provided spelling suggestions and/or automatic auto correction, for example by right clicking on the misspelled word and selecting one of the suggested spellings. An example is illustrated in the display screen 4300 in FIG. 43.

Figure 44:
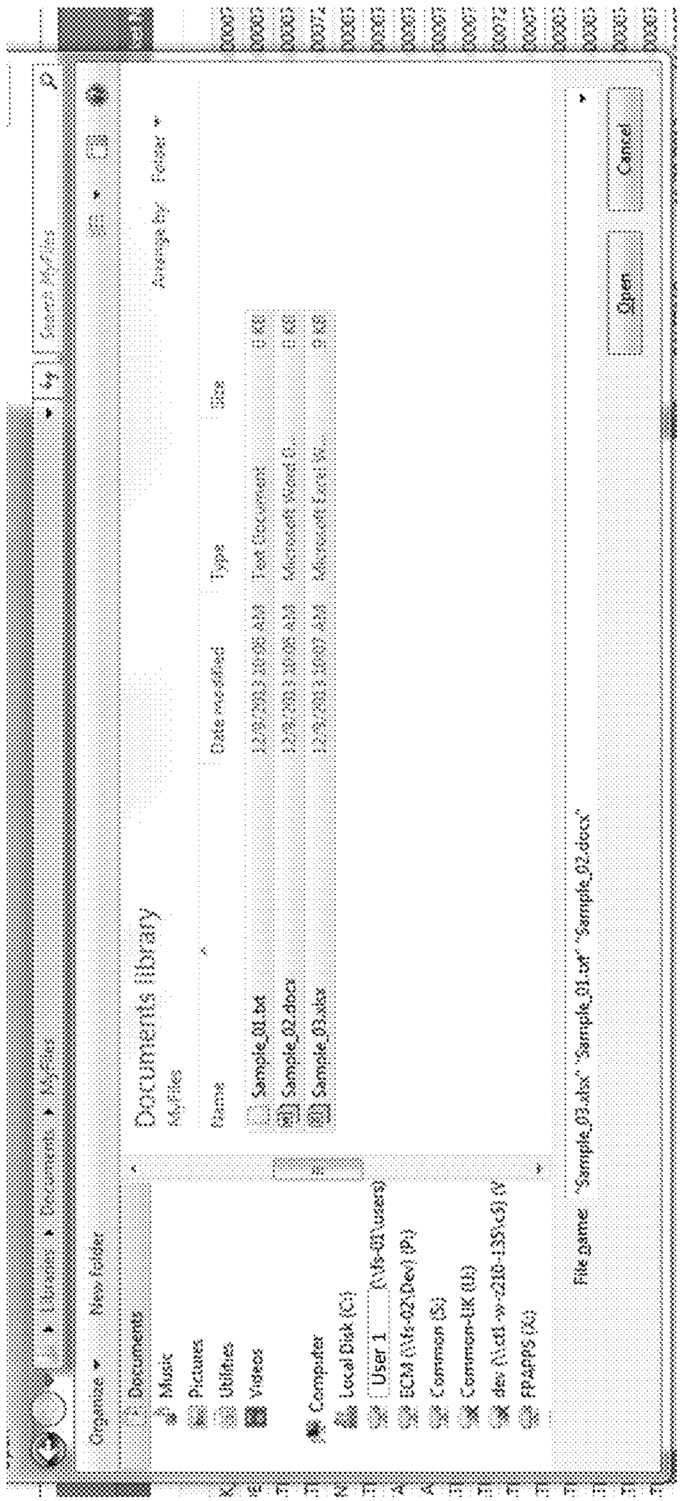
FIGS. 44-60 illustrate example display screens providing commenting, file management, attachment and communication functionality, in accordance with one or more example implementations.
Figure 45:
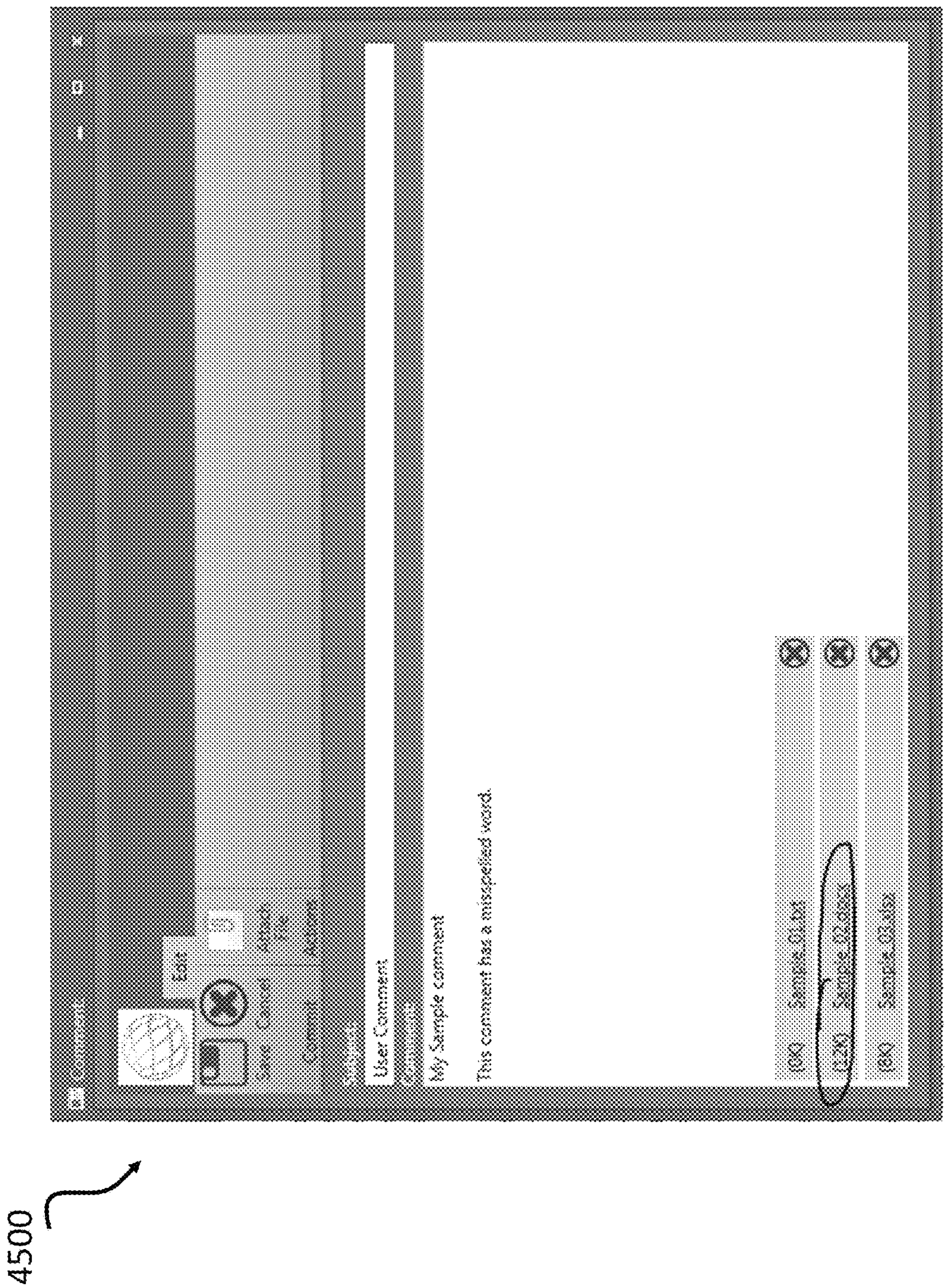
Figure 46:
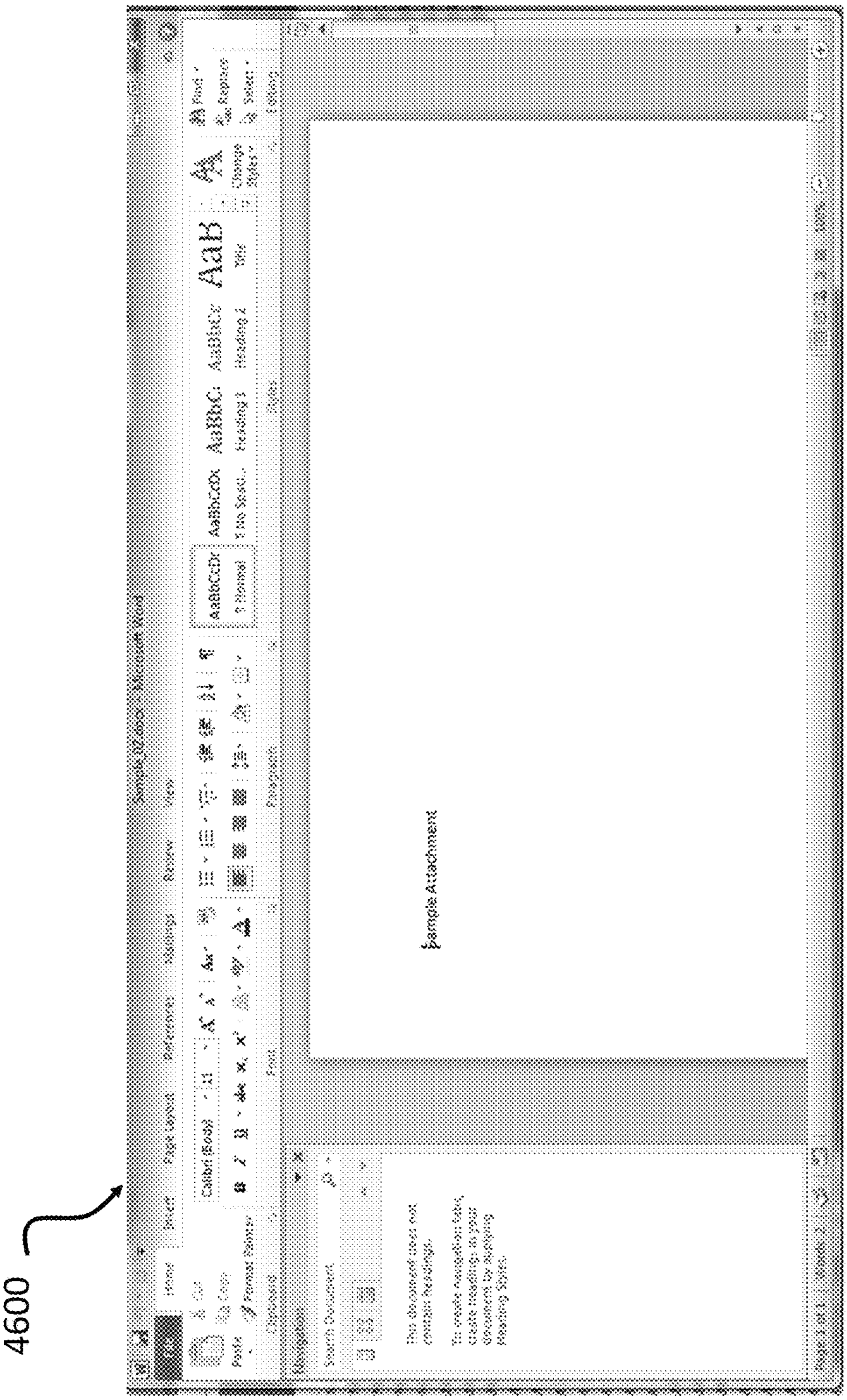
Figure 47:
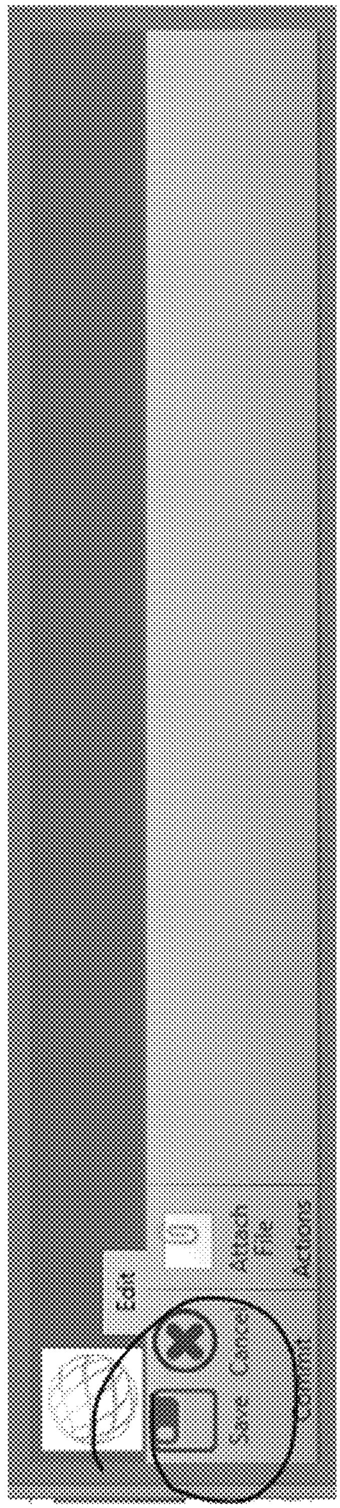

As noted herein, the present application supports attachments to be added to comments. A user can add an attachment, for example, by clicking on the Attach File button and selecting one more files to attach. An example is illustrated in the display screen 4400 in FIG. 44. Files that are being attached can appear at the bottom of the Comment; and can be available for preview the file prior to the user saving the comment, for example, by selecting a hyperlink associated with the attachment. An example is illustrated in the display screen 4500 in FIG. 45. When selected, the file can open in a default software application, such as may be configured on a respective computing device and associated with the respective file type. An example is illustrated in the display screen 4600 in FIG. 46. When a user is done creating a comment and attaching file(s), the user is prompted to select an option, Save, for example, in the Comment Ribbon→Edit tab-Commit Group, as illustrated in the example display screen 4700 in FIG. 47. When the comment has completed saving, a comment icon can be provided next to the record that was previously selected, and the comment can be associated to the record. An example is illustrated in the display screen 4800 in FIG. 48.

Figure 48:
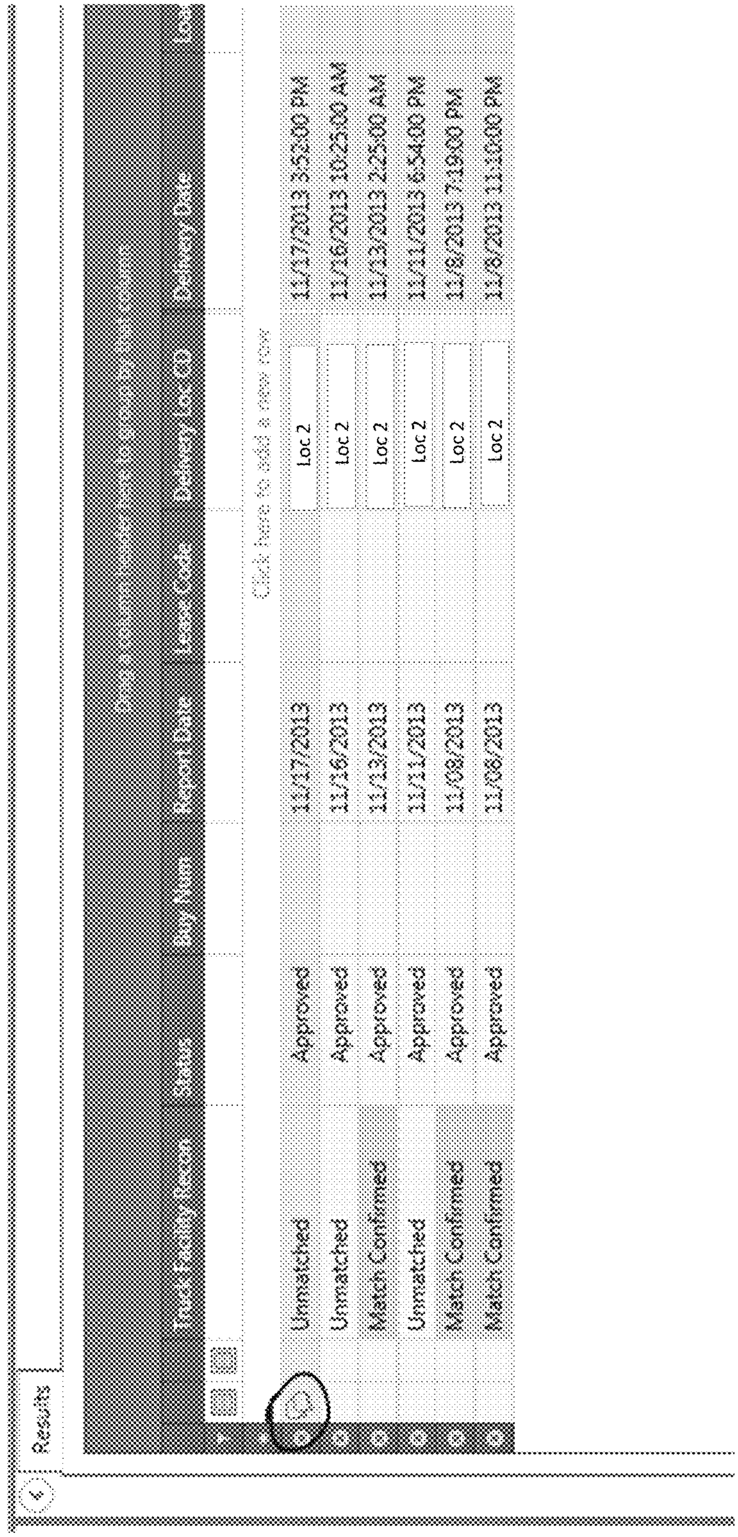
Figure 49:
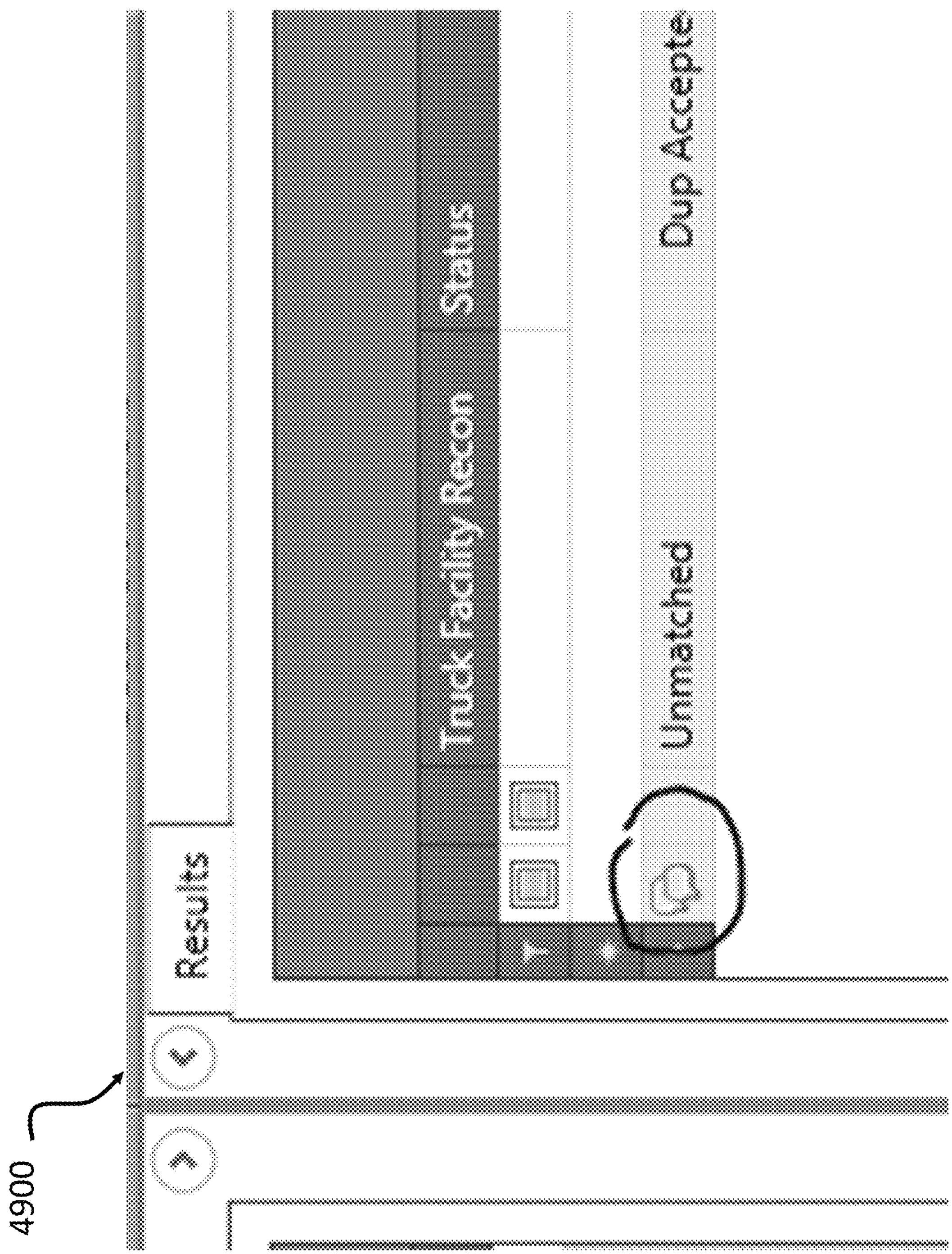
Figure 50:
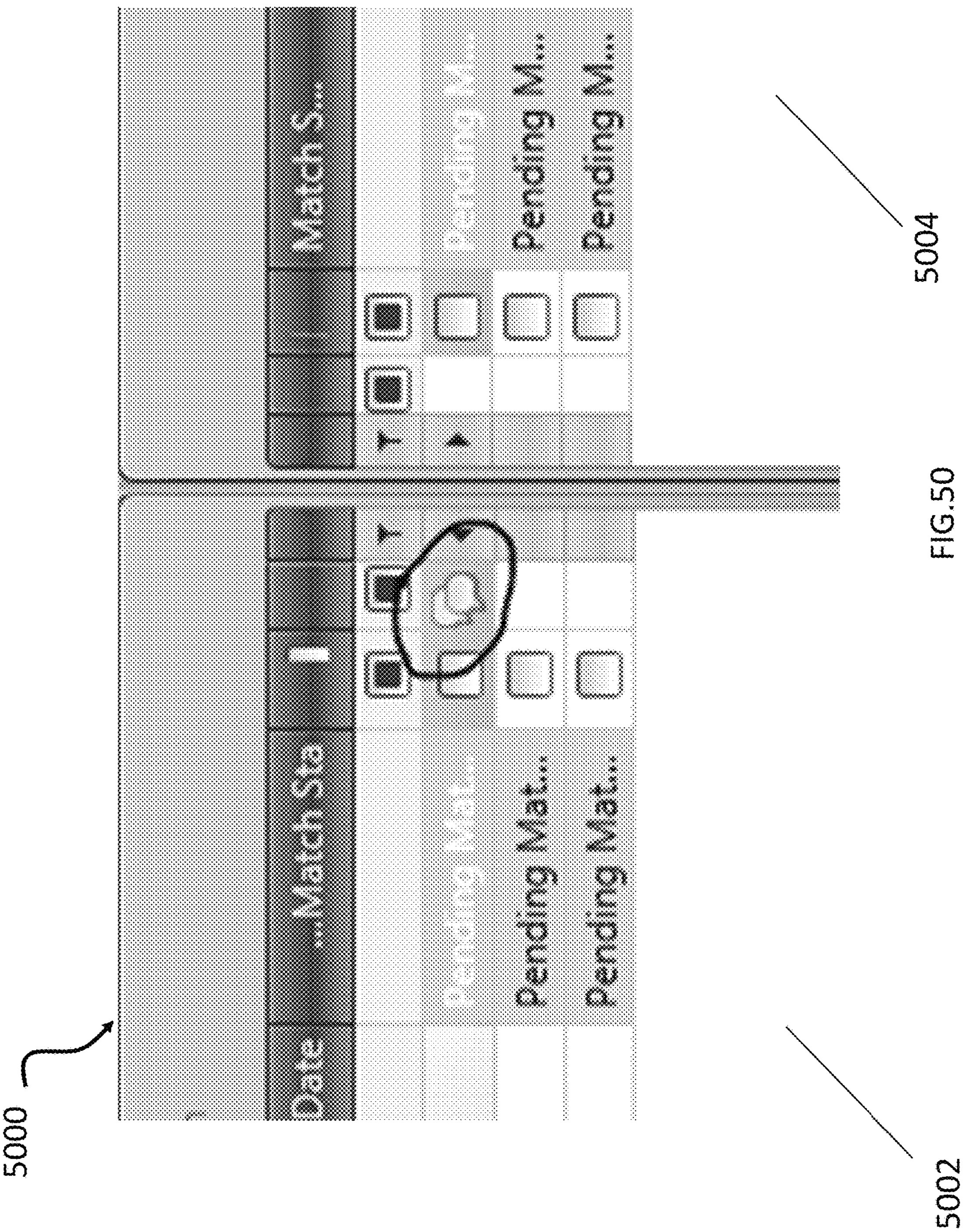
Figure 51:
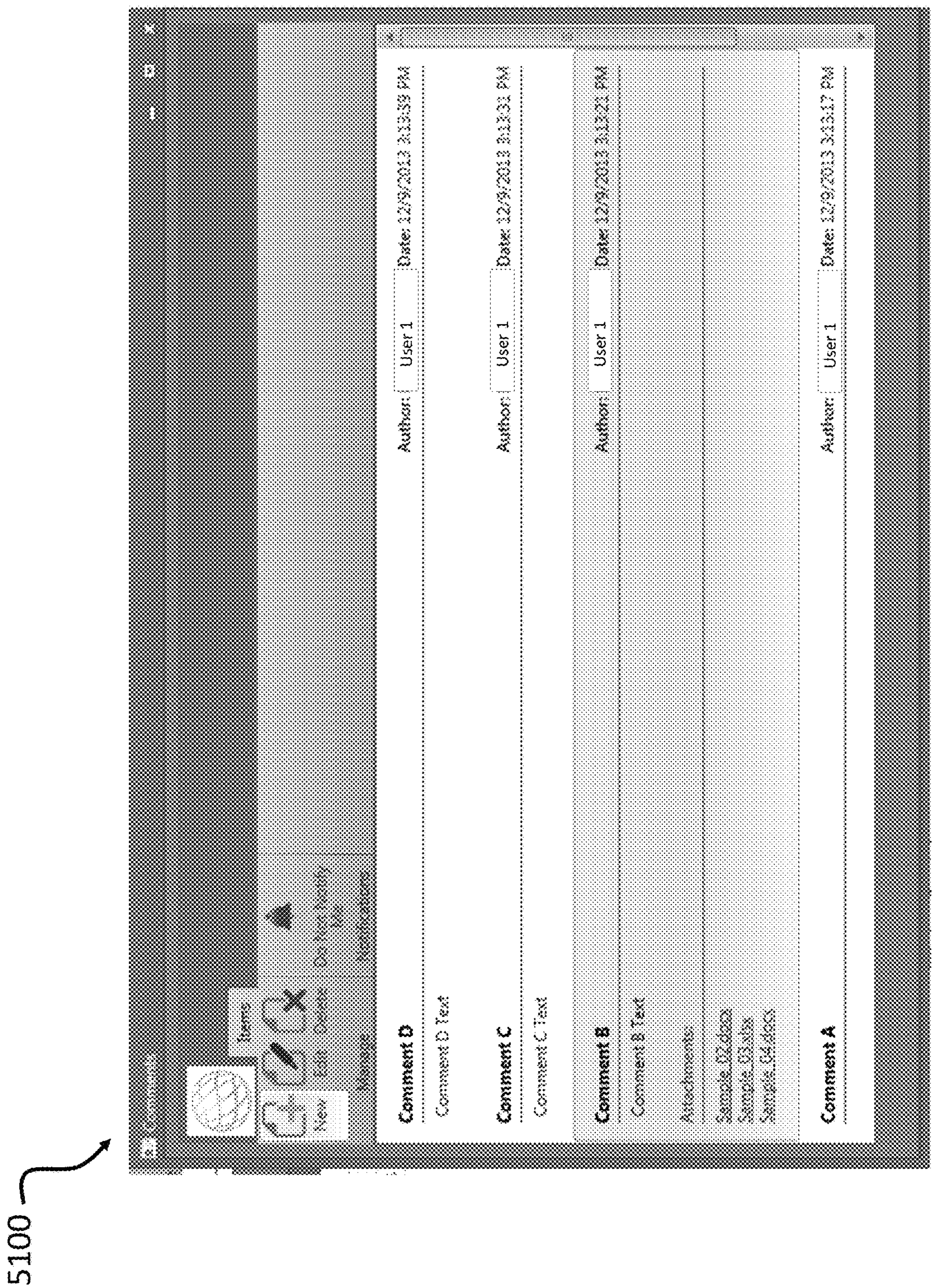
Figure 52:
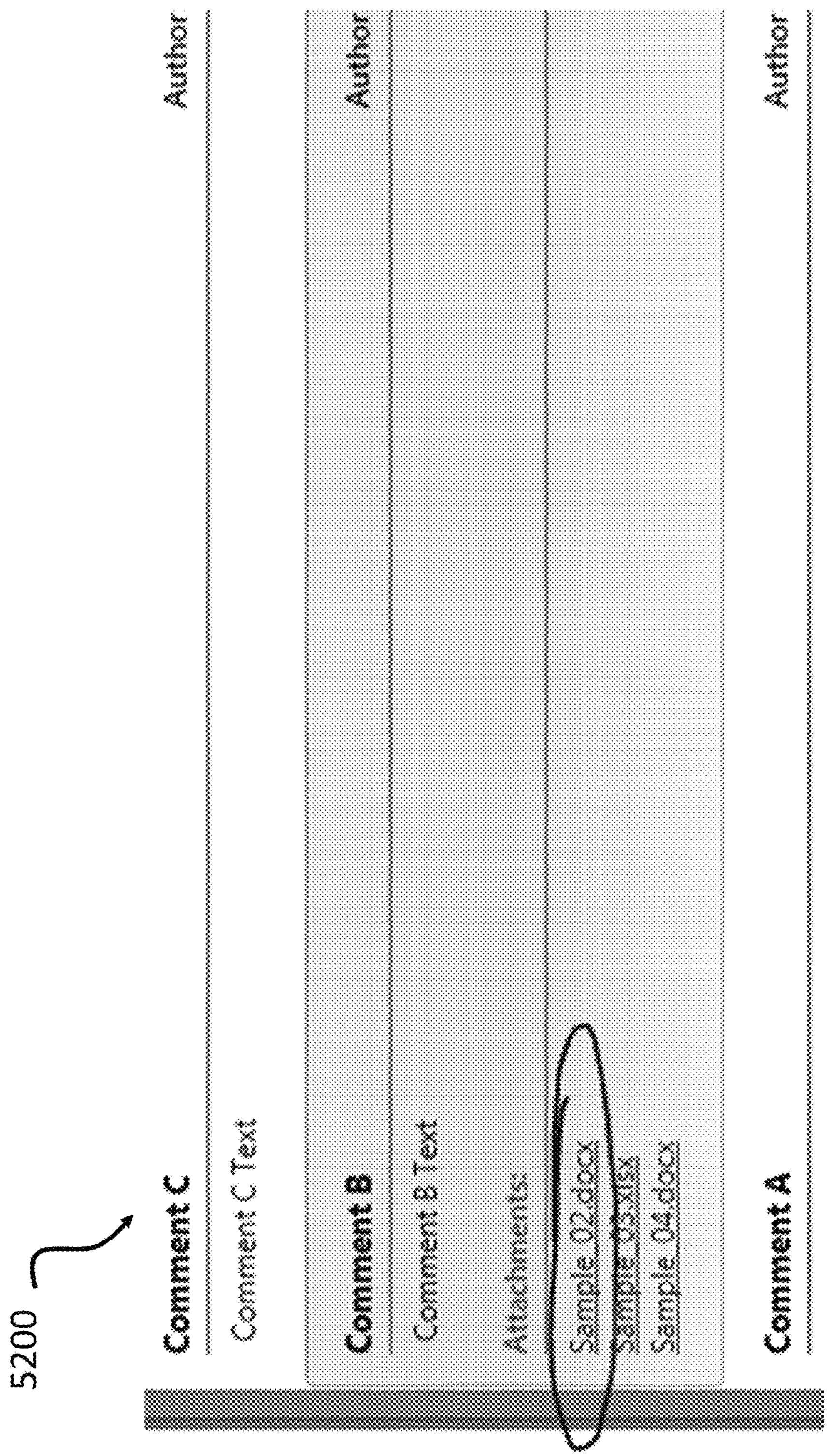
Figure 53:
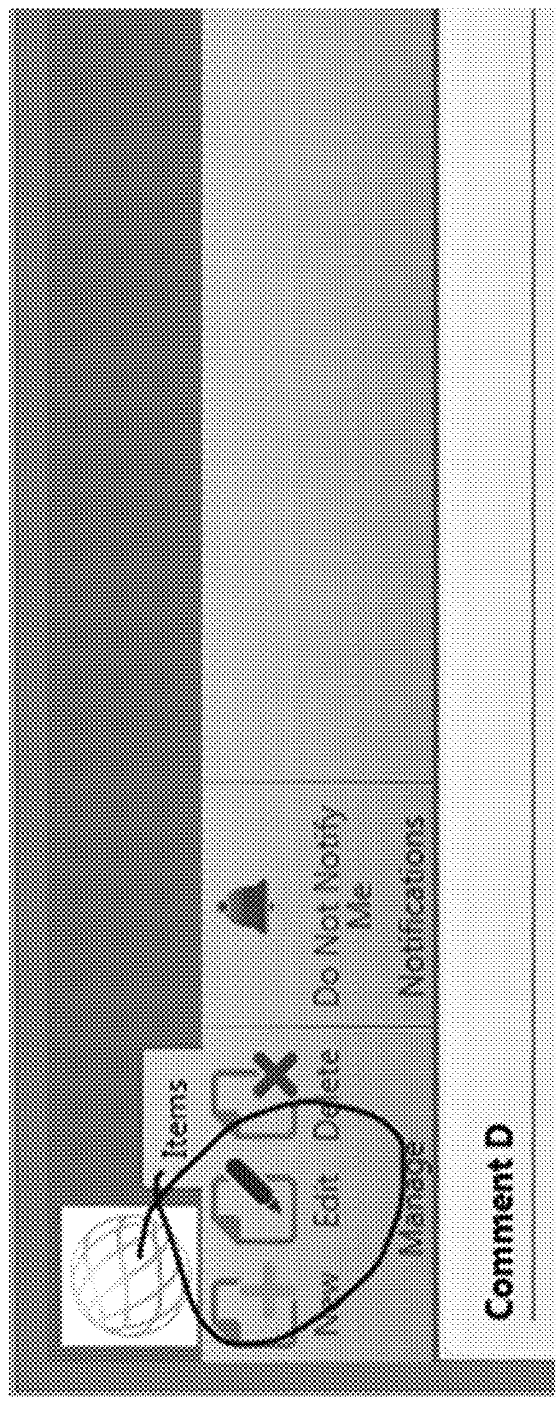
Figure 54:
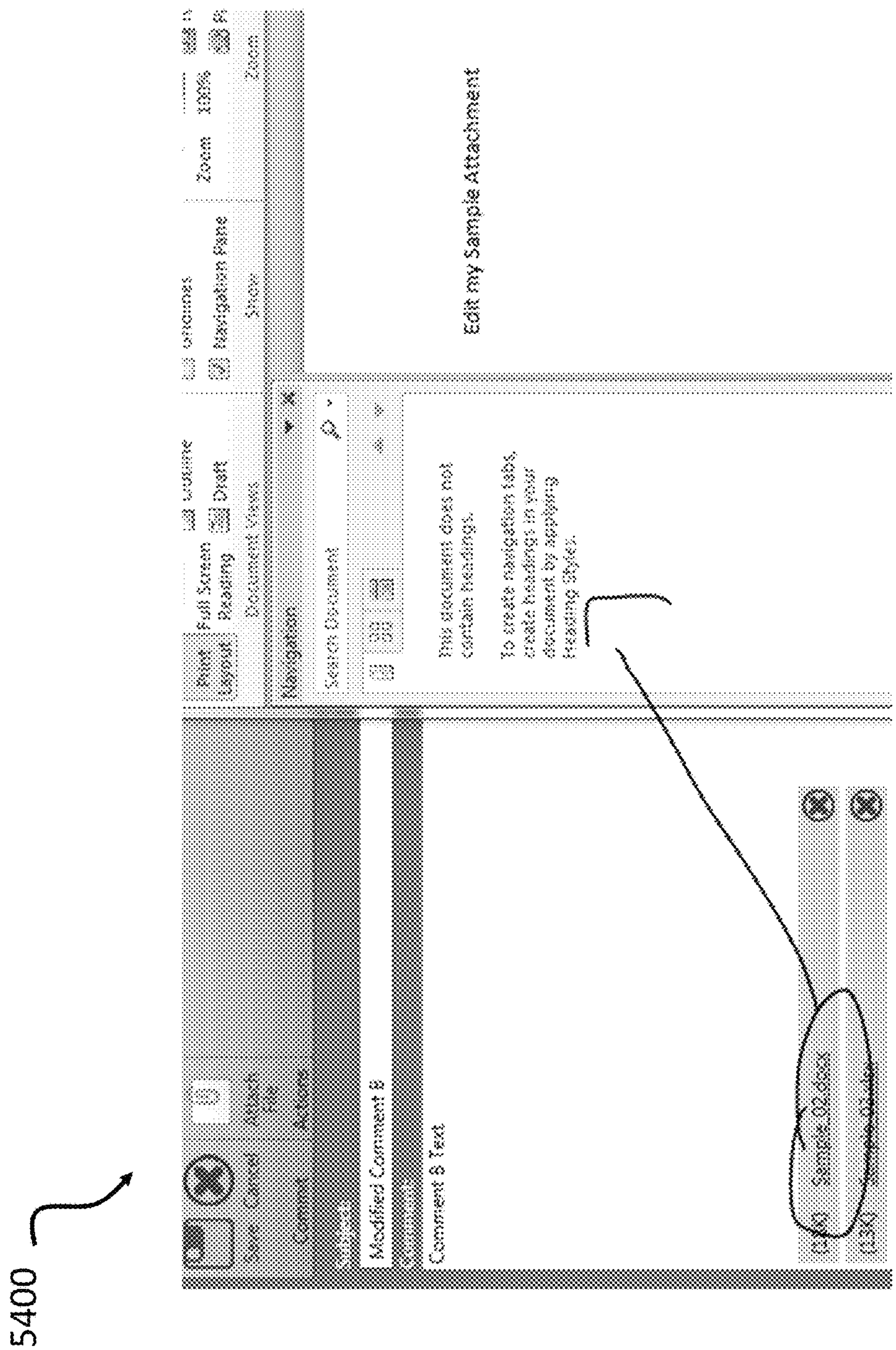
Figure 55:
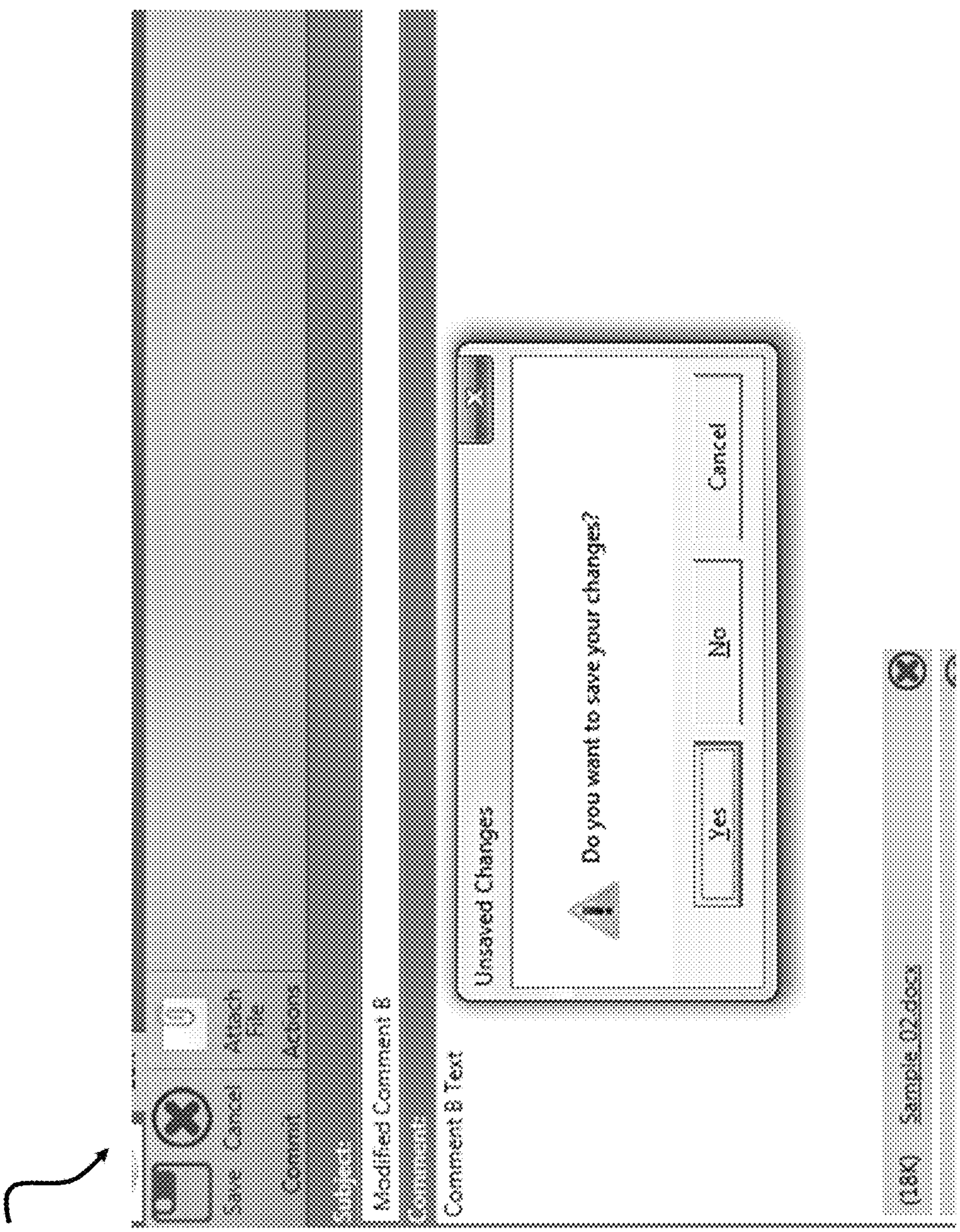
Figure 56:
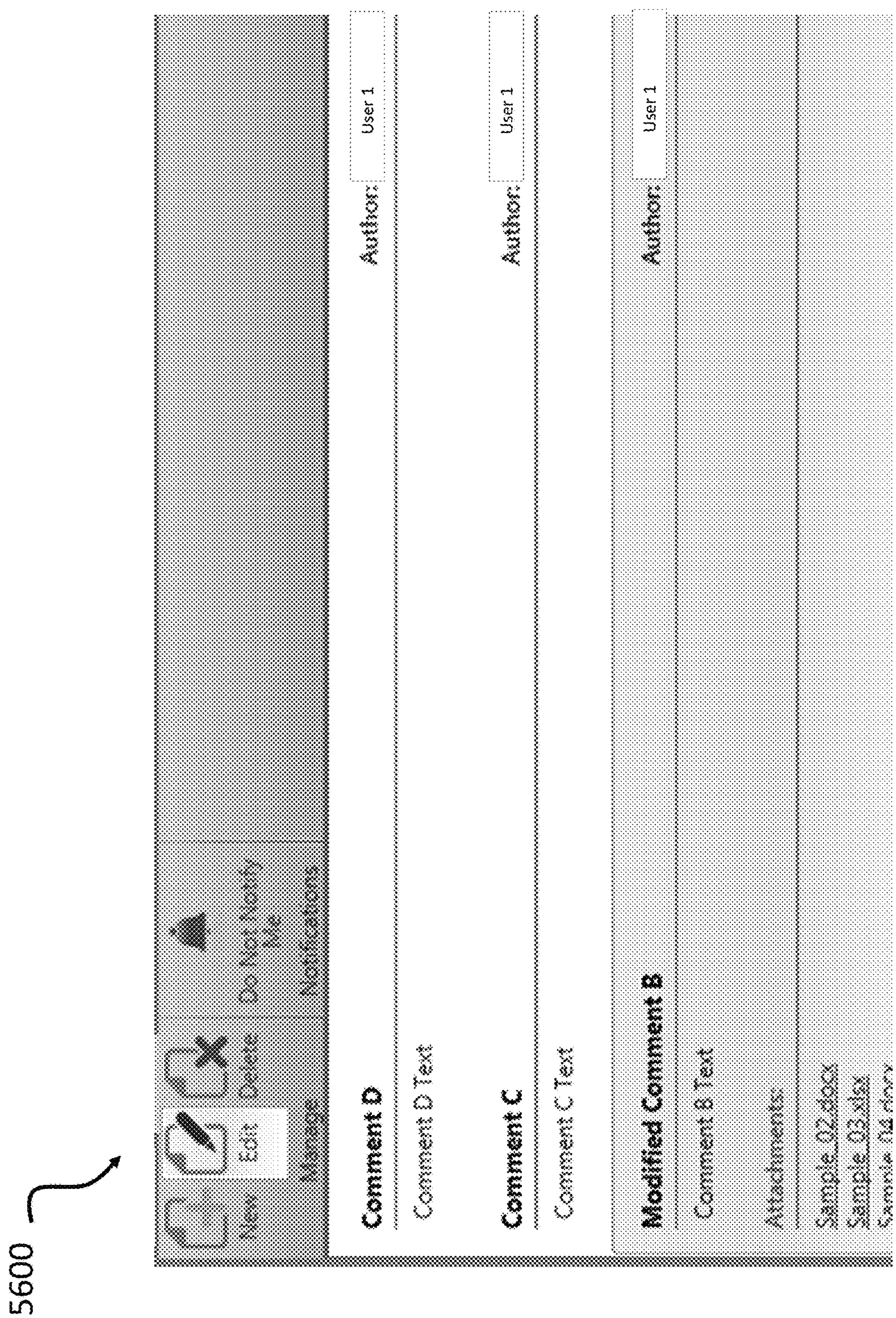

In addition to adding comments, the present application supports editing comments. As shown and described herein, a record that has been associated with a comment have a comment indicator (FIG. 48.) By selecting the comment indicator (display screen 4900, shown in FIG. 49), all of the comments that are associated with the respective record are provided. In one or more implementations and in addition to the Document Viewer, the comment indicator can also appear on one or more records in the Reconciliation application that have associated comments. An example is shown in display screen 5000 and set forth in FIG. 50. Selecting the comment indicator can display Comment Summary display with all the comments associated with a respective record that have been created. An example is shown in display screen 5100 and set forth in FIG. 51. From the Comments Summary display, a user can access the comments and can open attachments, such as by selecting a respective hyperlink. An example is shown in display screen 5200 and set forth in FIG. 52. In one or more implementations, a user can be authorized to edit comments authored by that user. For example, and as illustrated in the example display screen 5300 and set forth in FIG. 53, from the Comments Summary window, a user selects the comment and selects the Edit button in the Comments Summary→Items tab→Manage group. With reference to the example implementation shown in FIG. 54 (display screen 5400), when the Comment window appears, the user can make changes, such as to the title, text, and as well as to add or remove attachments. The user can also edit the contents of attachment documents, for example, via the respective application associated with the attachment and the user has sufficient permissions. For example, clicking on a MS-WORD document link in a comment results in Microsoft Office Word launching. When the user has finished editing a comment, the user can select a graphical screen control, such as a Save button and changes are reflected in the Comment Summary View. An example is illustrated in display screen 5500 set forth in FIG. 55. Alternatively the user can cancel the process if the user does not wish to save his/her changes, for example, by selecting Cancel in the Comment View→Edit tab→Commit group. In one or more implementations, a user is prompted to save changes, as shown in example display screen 5500 set forth in FIG. 55. Depending on whether a user has saved changes, the Comments Summary window can be updated to reflect latest modifications, as shown in example display screen 5600 set forth in FIG. 56.

Figure 57:
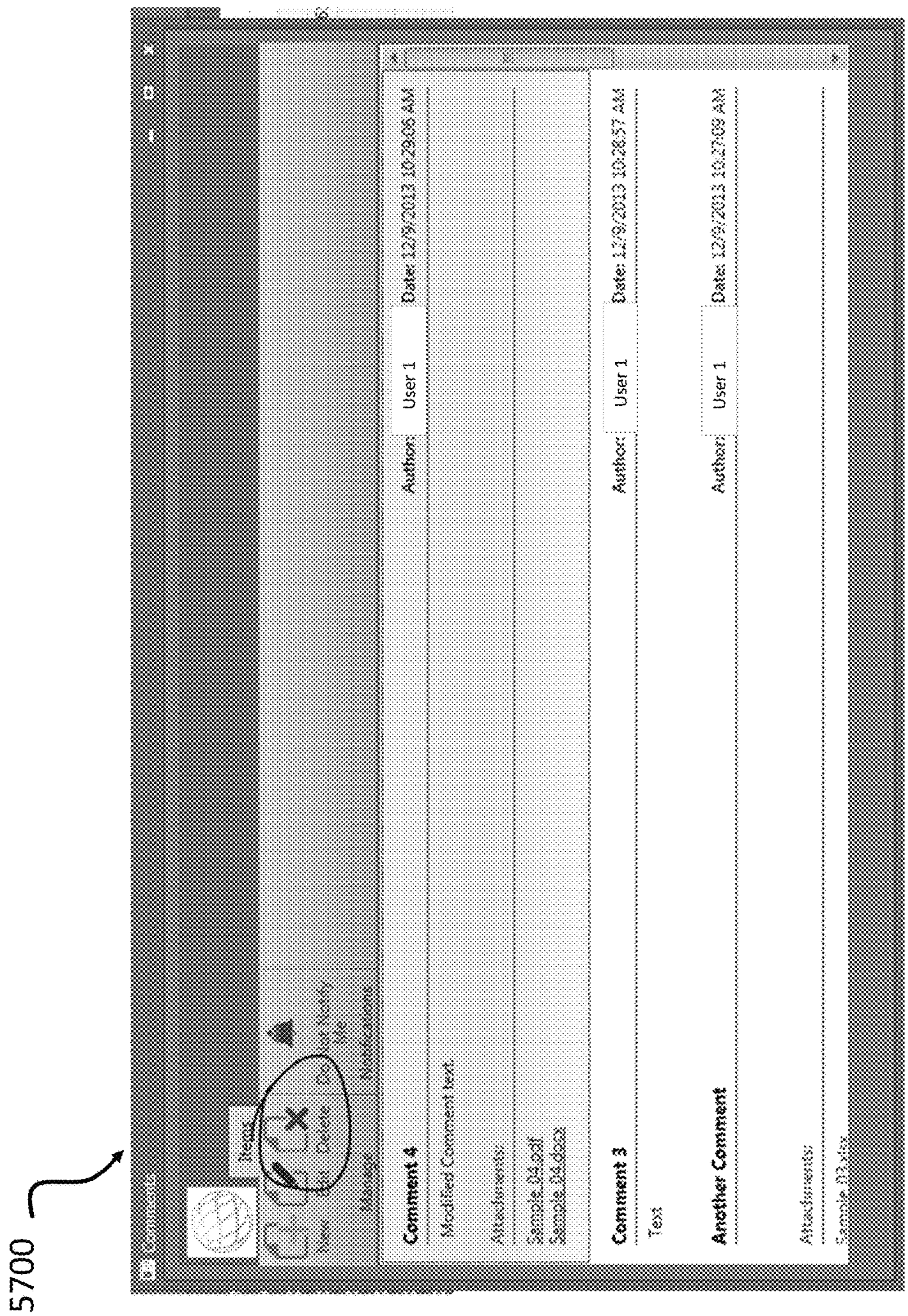

Moreover, a user can be authorized to delete comments, for example, that the user has authored. From the Comment Summary window, select the comment that the user wishes to delete and click the Delete button in the Comments Summary→Items tab→Manage group, as shown in example display screen 5700 set forth in FIG. 57.

Figure 58:
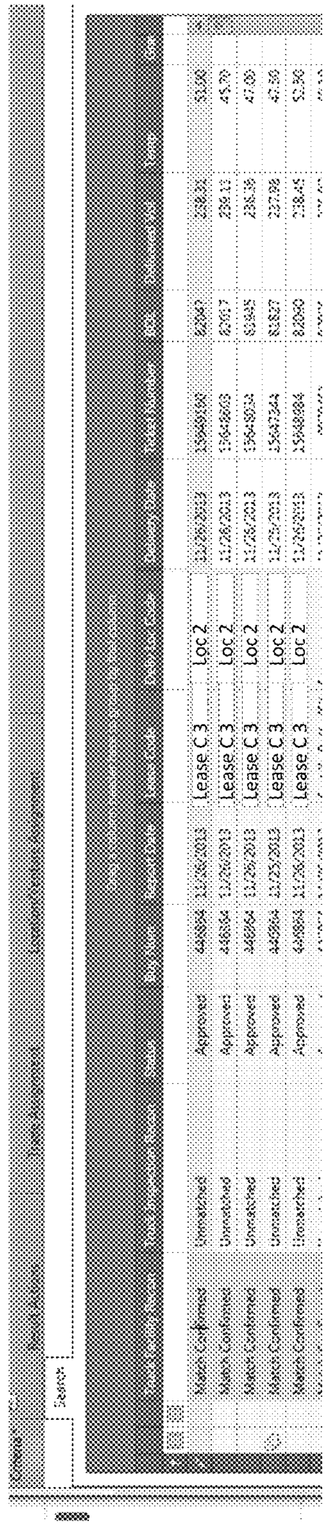

In one or more implementations, the present application supports notifications, including, for example, Thread Notifications and Document Type Notifications. With regard to Thread Notifications, a user can be subscribed automatically to notifications for a specific record when the user creates a first comment. This is referred to herein, generally, as a Comment thread, which includes that if a user comments on a selected record, the user will receive a notification for the comment that user created and any additional comments other users who add or modify comments and/or information associated with the record. An example is illustrated in display screen 5800 set forth in FIG. 58.

Figure 59:
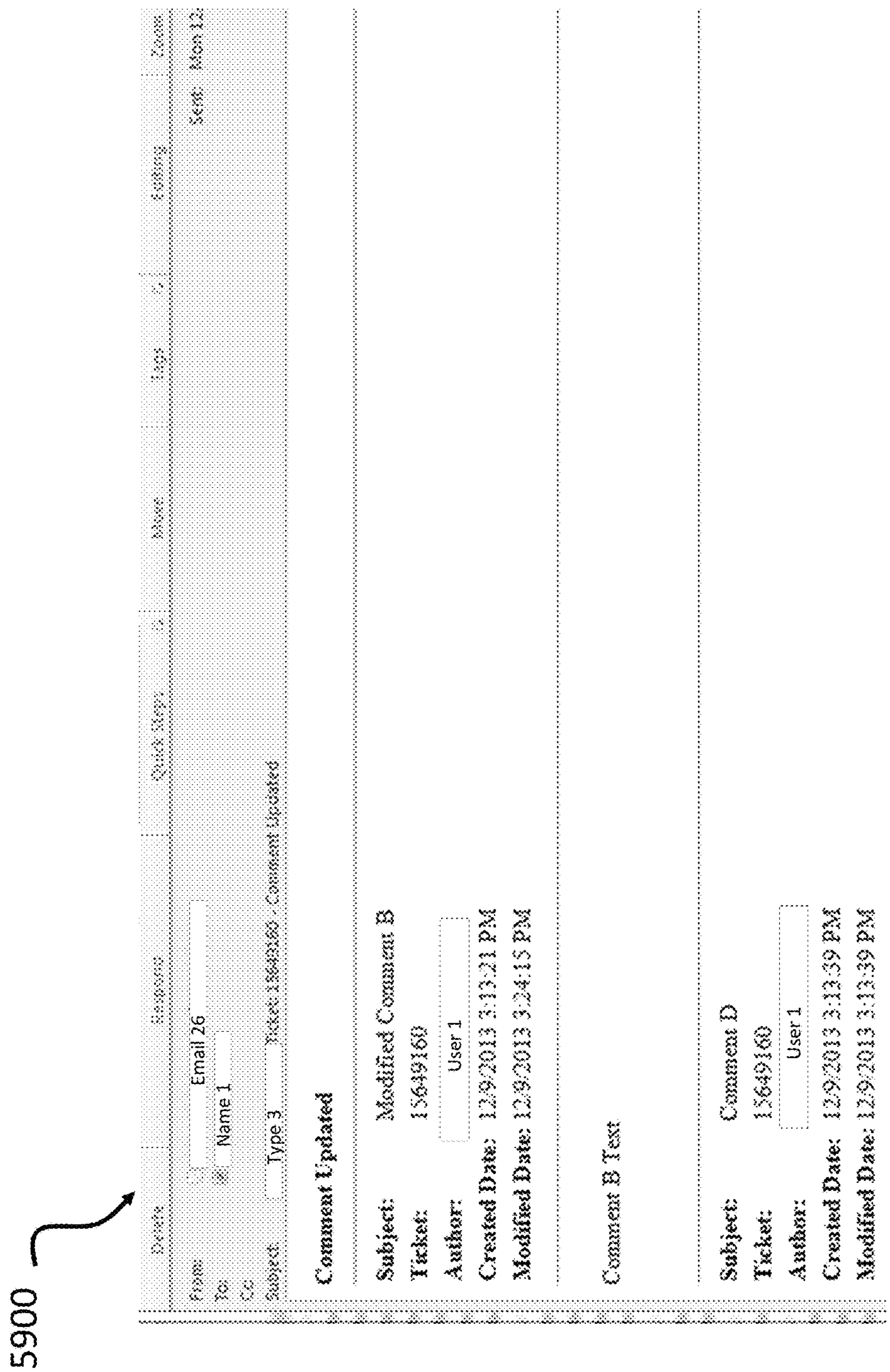
Figure 60:
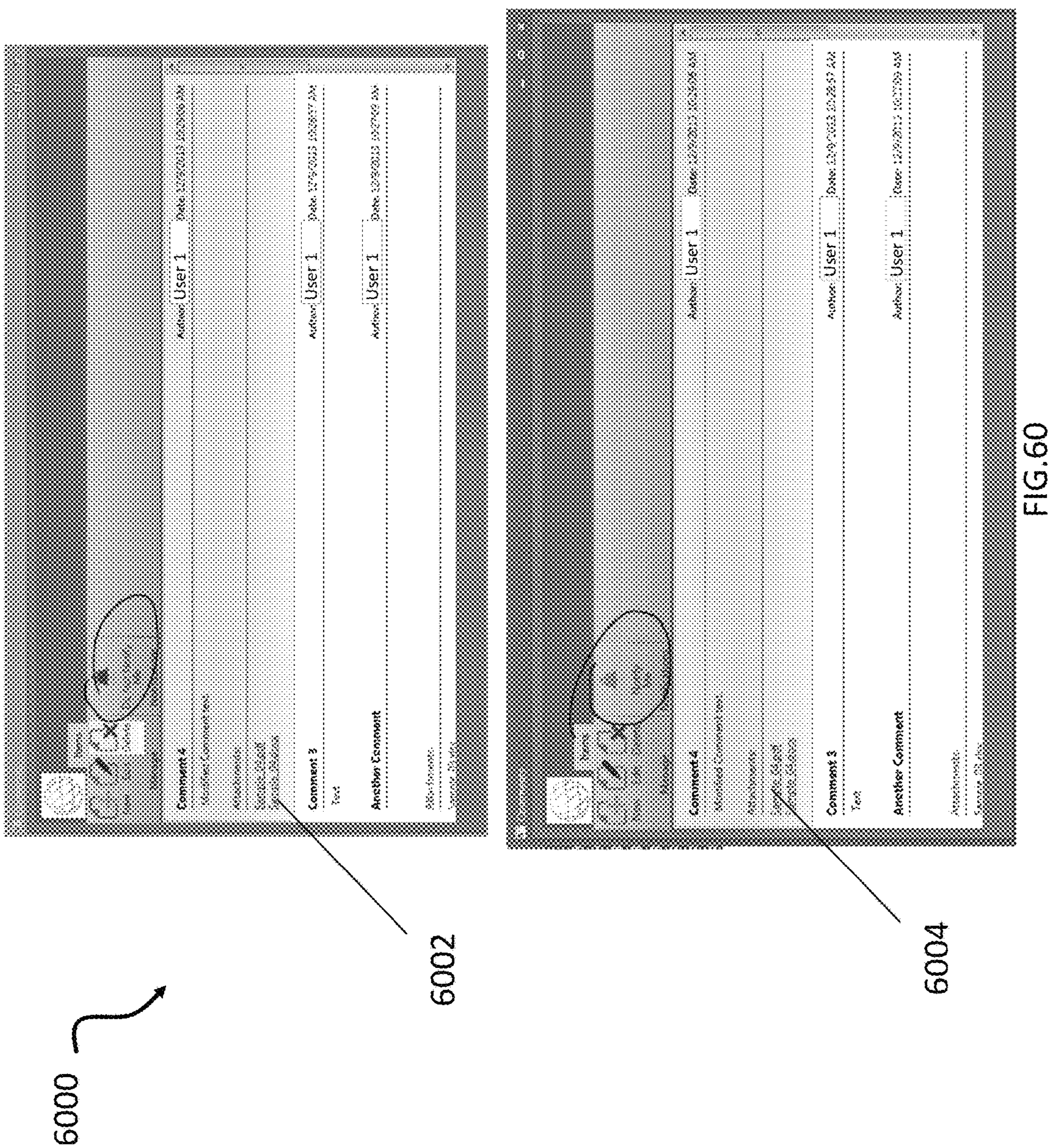

A Thread Notification can be delivered via e-mail or via other delivery mechanism (including as can be provided in an application substantially as shown and described herein, such as an in-box). The notification can be formatted to contain a subject line that references the Document Type, an identifier to locate the record and an action performed on the comment (e.g., created or updated). The body of the Notification (e.g., e-mail) can contain the most recent comment that is the subject of the email along with all additional comments that exists on this thread. An example is illustrated in display screen 5900 set forth in FIG. 59. In the event that the user wants to stop listening (e.g., receiving notifications) to a specific thread, the user can opt out of receiving notifications by opening the Comments Summary View and clicking on the Do Not Notify Me button in the Ribbon→Items tab→Notification group. An example is illustrated in display screen 6000, section 6002 set forth in FIG. 60. In one or more implementations, unsubscribing from a thread does not require that the user stops receiving emails permanently for comments on this record. If a user unsubscribes from notifications, the user can be prompted with a graphical screen control, such as a Notify Me button that allows the user to re-subscribe to notifications for this record. An example is illustrated in display screen 6000, section 6004 set forth in FIG. 60. Moreover, a user can choose to subscribe to comments for an entire document type even if the user is not directly involved in the thread. In such cases, the user receives an email notification when a comment is created for any record by any user for a specified document type.

In one or more implementations of the present application, data set forth in accordance with the teachings herein can be updated periodically a warehoused for real-time and historical reporting. In one or more implementations, data can be combined from a plurality of data sources to provide significant and comprehensive analysis. Data views are also provided to easily extract the normalized data, for example, for import into external data management systems.

Figure 61:
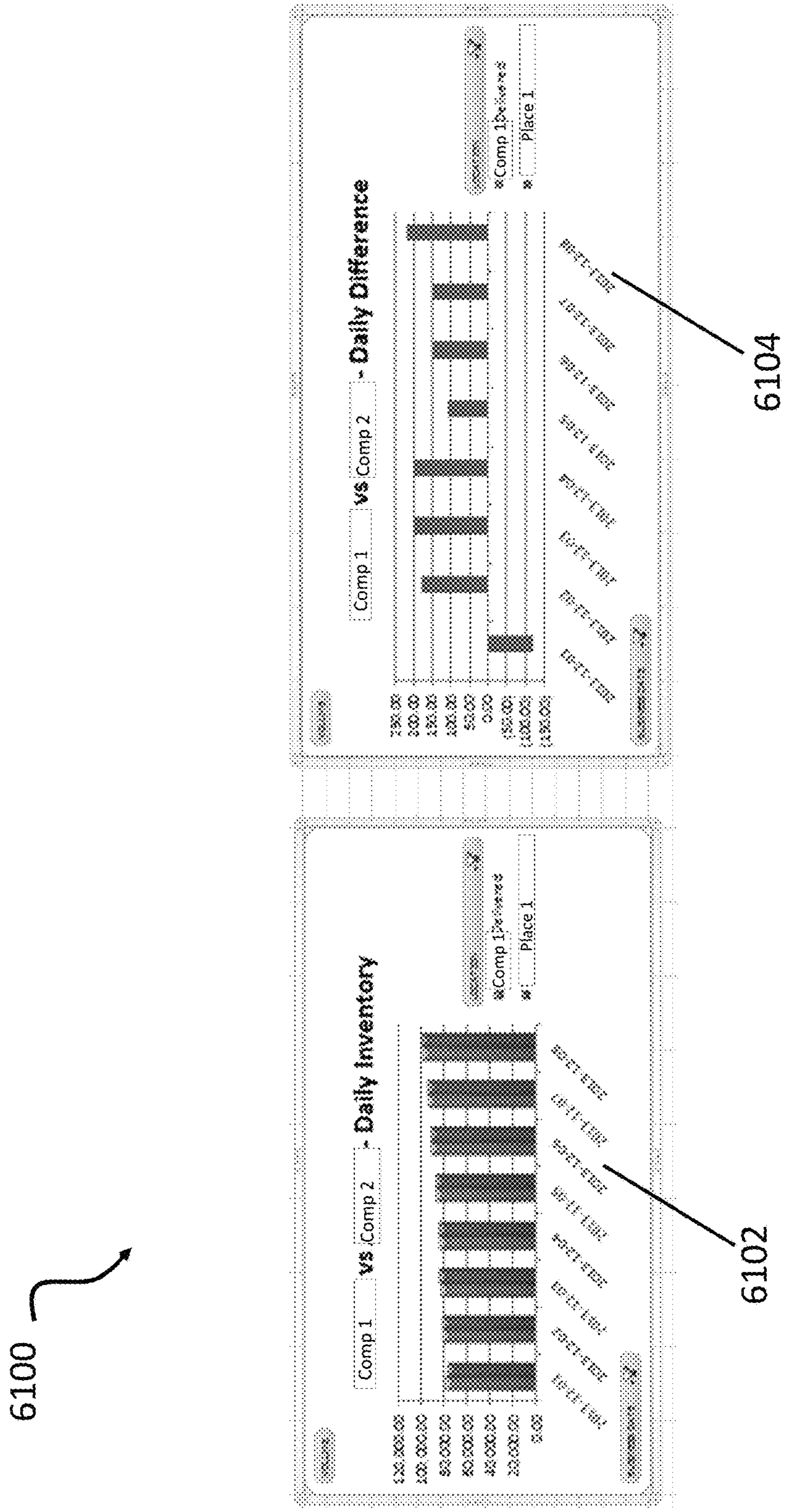

The present application can provide reporting mechanisms that identify daily inventory at each location (facility, vessel, or the like), for example, by tank and product. This allows independent inventory reports to be reconciled against the transported volumes. FIG. 61 illustrates reports 6102 and 6104 that show the trucking volumes delivered to the transport vessel and that are compared against the inventory reading on the vessel, and a daily difference is calculated. FIG. 62 illustrates report 6200, which is a Well Delivery report and that shows the volume and truck count of the product transported between the pickup and delivery locations. This allows the schedulers to gauge the nominal quantities verses the actual quantities transported and to make future scheduling decisions based on the data.

A discussion associated with a plurality of example display screens and data reports is provided below.

Figure 63:
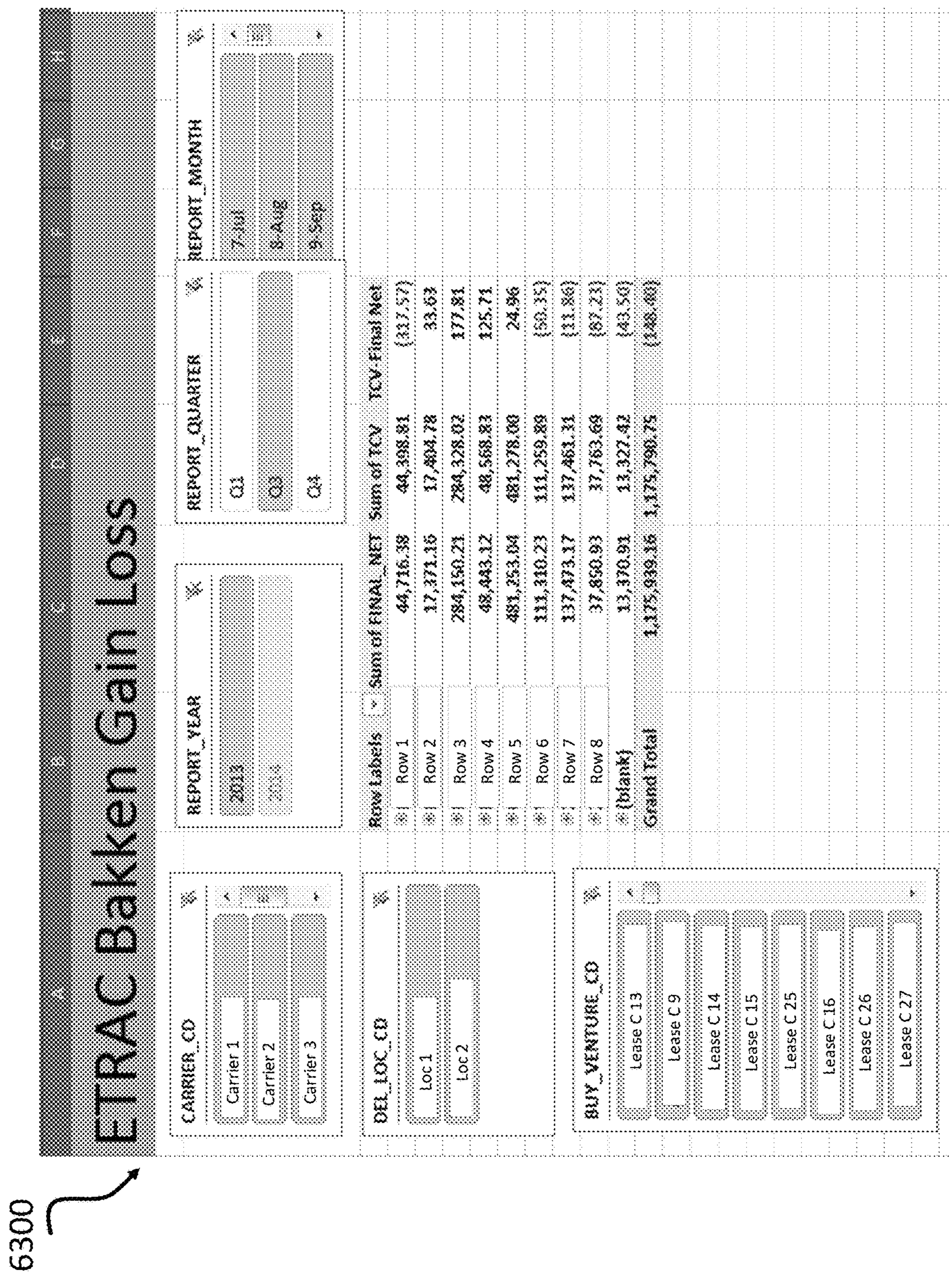

FIG. 63 shows an example display screen 6300 that includes a gain/loss report in accordance with an example implementation of the present application. As shown in example display screen 6300, a difference between loaded volume of oil versus the discharge volume is displayed and with reference to two respective delivery points. As shown in example display screen 6300, a gain/loss is shown between information associated with a plurality of oil wells for a respective producer and information associated with discharge into a trans-load facility. Plus or minus net values are illustrated.

Figure 64:
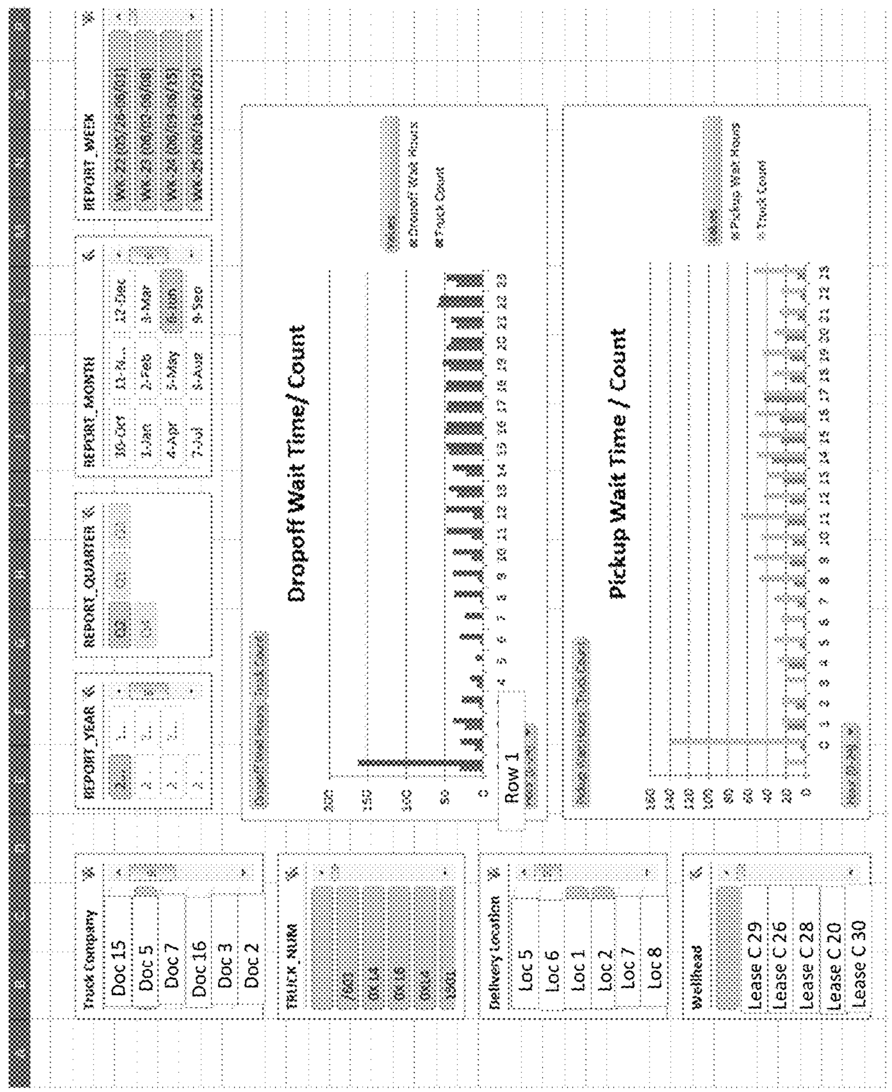

FIG. 64 shows an example display screen 6400 that includes an example truck wait time report. As shown in example display screen 6400, the amount of time and a count of trucks organized by hour are displayed in connection with a load location and a discharge location. Information provided in example display screen 6400 is usable to optimize scheduling, for example, as well as to view historical information to improve efficiency and lower costs.

FIG. 65 shows an example display screen 6500 that displays an example inventory report. The example inventory report shown in FIG. 65 is usable to identify, for example, daily inventory that is reported by a trans-load facility (and/or other suitable storage facility, e.g., a vessel). Information provided in example display screen 6500 is usable, as well, to reconcile information associated with various activity, such as deliveries to a storage facility, or deliveries from a storage location.

Figure 66:
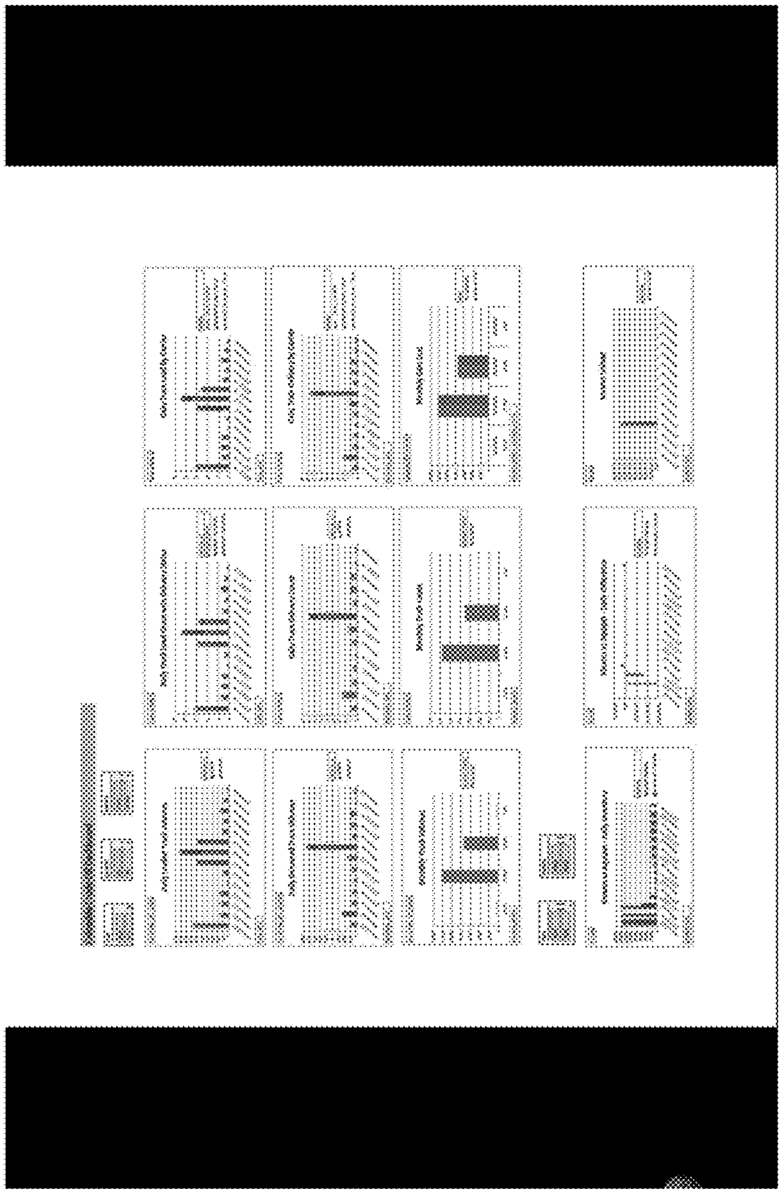

FIG. 66 shows an example display screen 6600 that displays an example dashboard report for a transport carrier. Dashboards, as known in the art, are useful for receiving and identifying volumes of information conveniently. The example dashboard report shown in FIG. 66 identifies movement of oil from a producer (e.g. a well) to a carrier (e.g. a truck) and to a storage facility (e.g. a storage barge). The example dashboard report shown in FIG. 66 identifies an example of end-to-end tracking and reconciliation.

Figure 67:
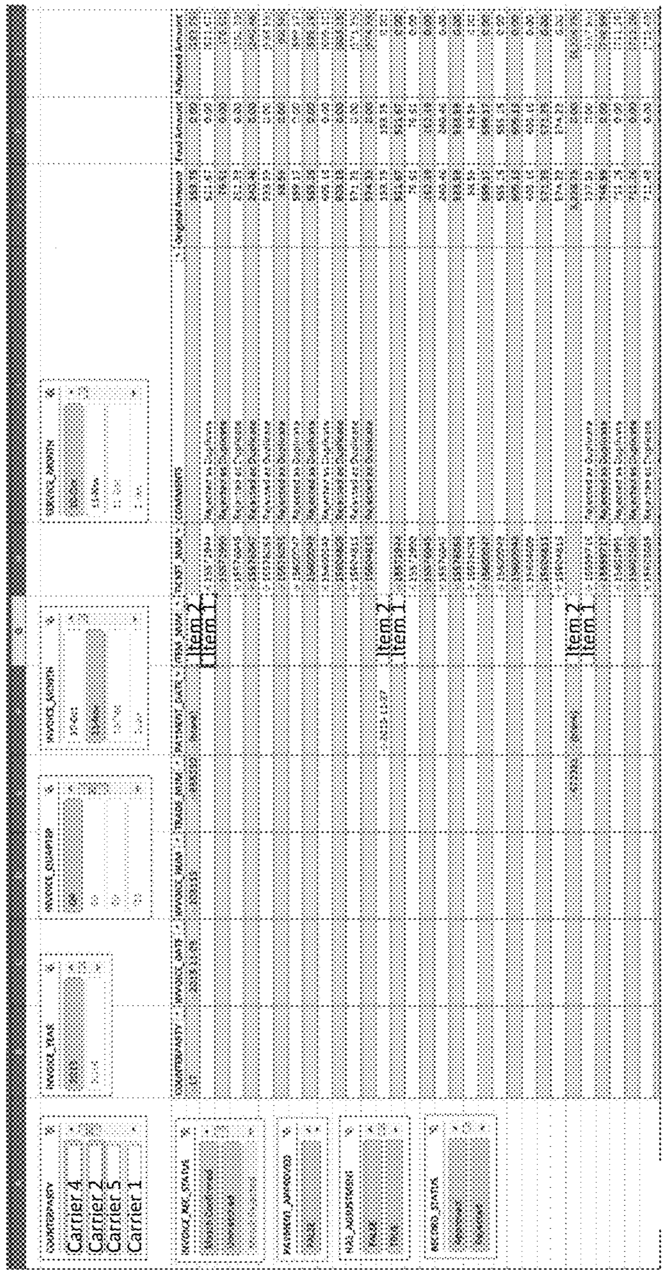

FIG. 67 shows an example display screen 6700 that displays an example invoice payment report, in accordance with an example implementation of the present application. In the example invoice payment report shown in FIG. 67, invoice charges submitted originally by a counterparty are provided, as well as final adjusted charges and comments that were determined and/or calculated and provided as a function of one or more reconciliation processes, such as shown and described herein. For example, an invoice reconciliation process is usable to generate adjusted charges in connection with one or more invoices.

FIG. 68 shows an example display screen 6800 that includes an example outlier report. In the example shown in FIG. 68, anomalies in reported wait times are identified for the user and, for example, any truck that reports a wait time that is inconsistent with a wait time that is reported by one or more trucks that arrive at or near the same time as a reporting truck, can be flagged as an outlier record.

Figure 69:
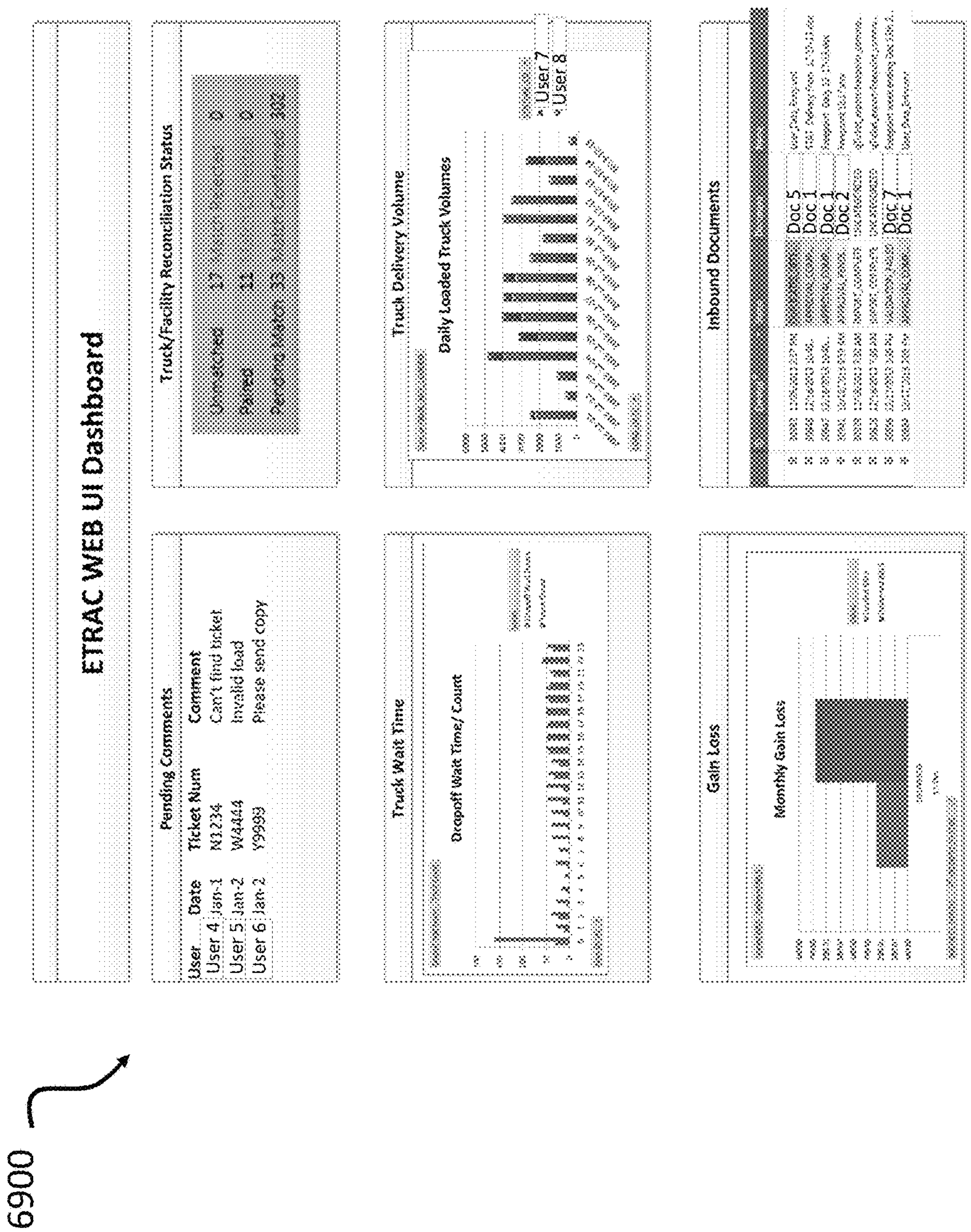

FIG. 69 illustrates an example display screen 6900 of an Internet-based dashboard that is usable by users of computing devices, such as via web browser software applications or mobile apps. Display screen 6900 provides an example web-based front end that can be configurable per user and that provides information from one or more modules, such as shown and described herein. For example, information associated with inbound documents, reconciliation reports, business intelligence reports or the like can be provided as a function of one or more "widgets" on a particular display screen. For example, a widget represents a section of a dashboard display screen that can be specific to a respective module of the present application. The user can identify status information associated with reconciliations, inbound documents, pending comments, delivery metrics or the like, as desired. Moreover, the user can navigate from any widget within a dashboard to a respective module via a web-based graphical user interface. Information, such as specific data that are displayed via the web-based dashboard. For example, a dashboard widget identifies truck delivery records and associated comments that can prompt the user for a reply. The user selects a graphical screen control to navigate to a specific truck delivery record, such as via a search screen, and selects the record identified on the dashboard to reply to the respective comment.

FIG. 70 shows an example display screen 7000 of an email message that includes a hyperlink to a web-based graphical user interface, such as the example dashboard shown in display screen 6900 (FIG. 69). In the example shown in FIG. 70, and Internet hyperlink is embedded in the comments notification email and directs the user to a ticket within the web-based graphical user interface. This expedites navigation for the user to locate a ticket and respond to her respective comment.

Accordingly, and as shown and described herein, the present application provides a generic platform for capturing and parsing data in virtually any format, normalizing the data and enriching the data into one or more predefined schemas. Once data are successfully extracted into the normalized schema and enriched, the data are eligible for downstream processes, such as reconciliation, reporting and/or consumption into external systems such as a trade capture system.

Moreover, a reconciliation process is provided to compare data between virtually any predefined schemas, and to compare data in each data set and identify any discrepancies and/or missing records from each data set. Furthermore, online collaboration is supported for users to identify and quickly resolve discrepancies, such as identified in the data. Additionally, business intelligence reporting provides complex and intuitive reports operable across virtually all data sets, including to enable users to uncover information that would otherwise not be known.

Figure 71:
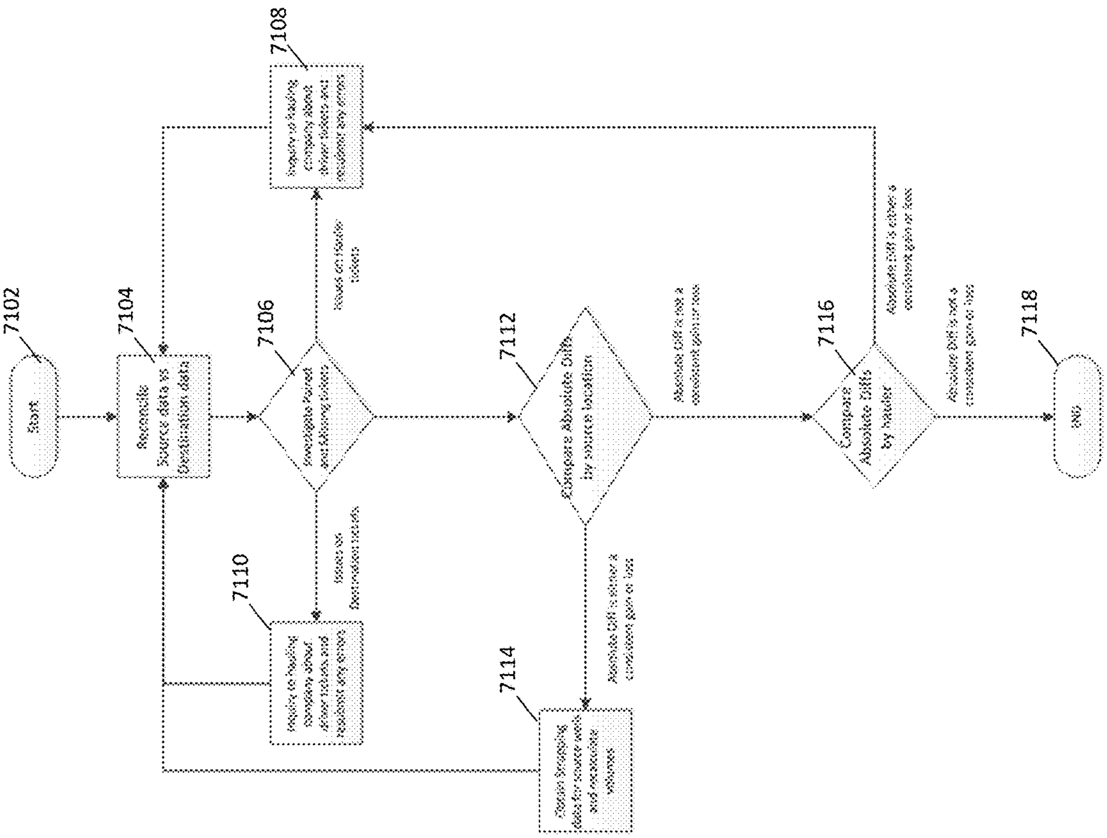
FIG. 71 is a flowchart of an example method for ensuring accuracy in connection with information received from various sources and that is processed for analysis, in accordance with an example implementation of the present application.

FIG. 71 is a flowchart of an example method 7100 for ensuring accuracy in connection with information received from various sources and that is processed for data analytics. In some implementations, the method 7100 can be performed by a processor executing instructions in a computer-readable storage medium. For example, the method 7100 can be performed by the information processor 7802 of FIG. 78.

The process begins at step 7102 by implementing a routine 7104 to reconcile source data versus destination data. For example, source data can include information received from producers (well data). Destination data can include, for example, information received from facilities and/or hauling companies. Thereafter, a determination is made at step 7106 to investigate paired and missing tickets. In the event of a ticket issue associated with a hauler, the process branches to step 7108 and an inquiry is made to a respective hauling company regarding one or more driver tickets. A request may further be made in step 7108 for any tickets resulting in an error to be resubmitted. Thereafter, the process returns to step 7104 for reconciling. Alternatively, if the determination in step 7106 is that an issue exists on one or more destination tickets, then the process branches to step 7110 and an inquiry is made to the destination company about one or more driver tickets. A request may further be made in step 7110 for any tickets resulting in an error to be resubmitted and the process returns to step 7104 for reconciling.

Figure 76:
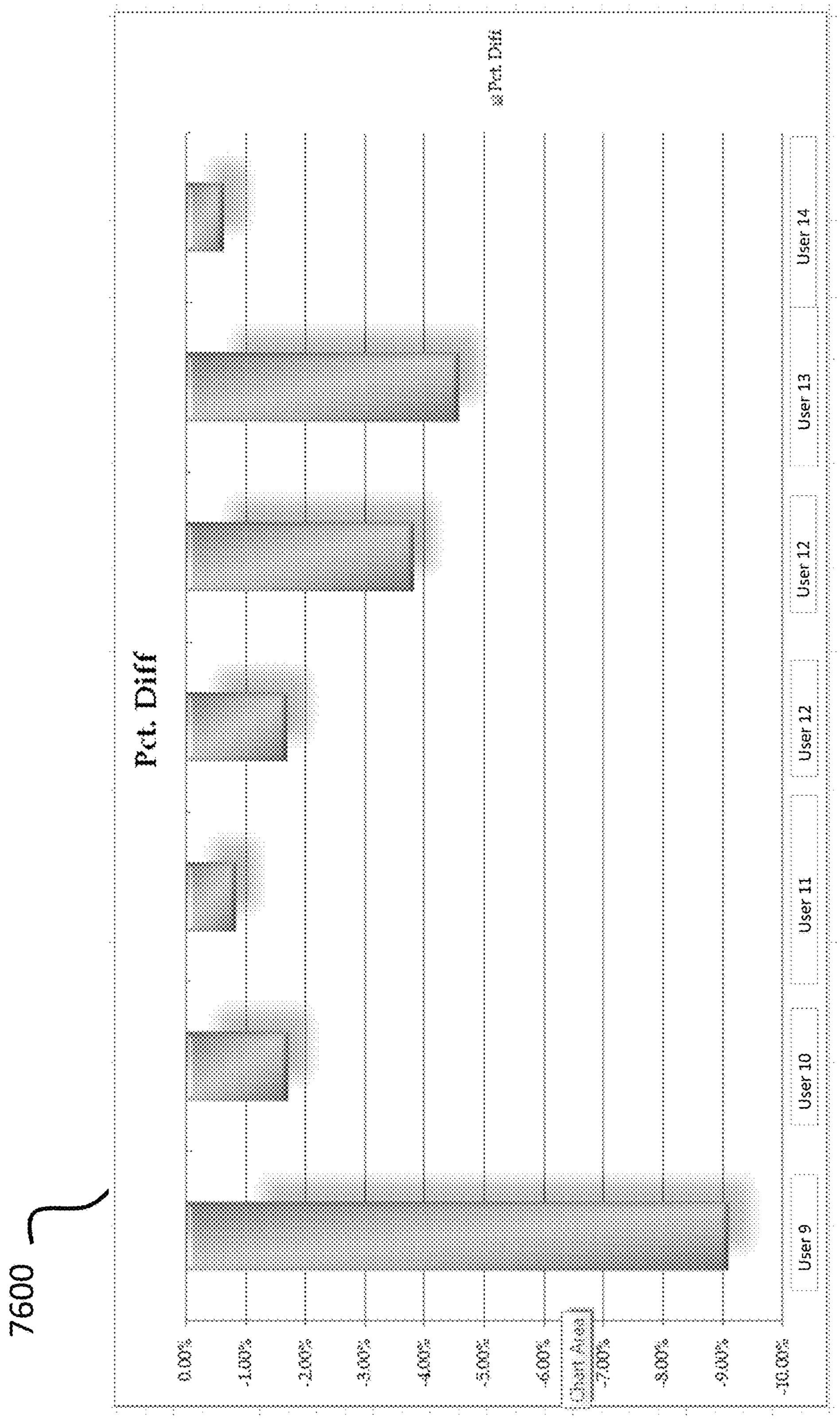

In the event that the determination in step 7106 is that there are no paired or missing tickets errors, the process continues to step 7112 and a comparison is made with regard to absolute differential data by source location. For example, the calculated absolute differential can represent a volume of a commodity (e.g., oil) that has been picked up by a hauler versus the volume that is discharged, and may be a gain or a loss. Absolute differential values can represent discrepancies between hand measured values and machine measured values, or can represent discrepancies between units of measurement. For example, and as illustrated in FIG. 76, absolute differential ("Abs. Diff") information can be represented by information received from a well for multiple drivers, and after being processed and performance can be determined, If the determination in step 7112 is that the absolute differential is either a consistent gain or consistent loss (e.g., for a respective well), then the process branches to step 7114 and "strapping" data for source wells are obtained and volumes are recalculated. Strapping may be provided as a function of detailed surveillance of a storage area, such as an oil tank, and can be extremely precise, such as volume measurements by ¼ inch lengths. Information received from one or more data sources may indicate that inspection and/or calibration services are needed to provide accurate results. After strapping data are obtained, then the process returns to step 7104 for reconciling.

If, in the alternative, the determination in step 7112 is that the absolute differential of source well information is not a consistent gain or consistent loss, then the process branches to step 7116 and a comparison of absolute differential is performed by hauler. If the determination in step 7116 is that the absolute differential is either a consistent gain or consistent loss (e.g., for a respective hauler), then the process branches to step 7108 and an inquiry is made to a respective hauling company regarding one or more driver tickets. A request may further be made in step 7108 for any tickets resulting in an error to be resubmitted. Thereafter, the process returns to step 7104 for reconciling. Alternatively, if the determination in step 7116 is that the absolute differential is not a consistent gain or consistent loss (e.g., for a respective hauler), then the process branches to step 7118 and the process ends.

Figure 72:
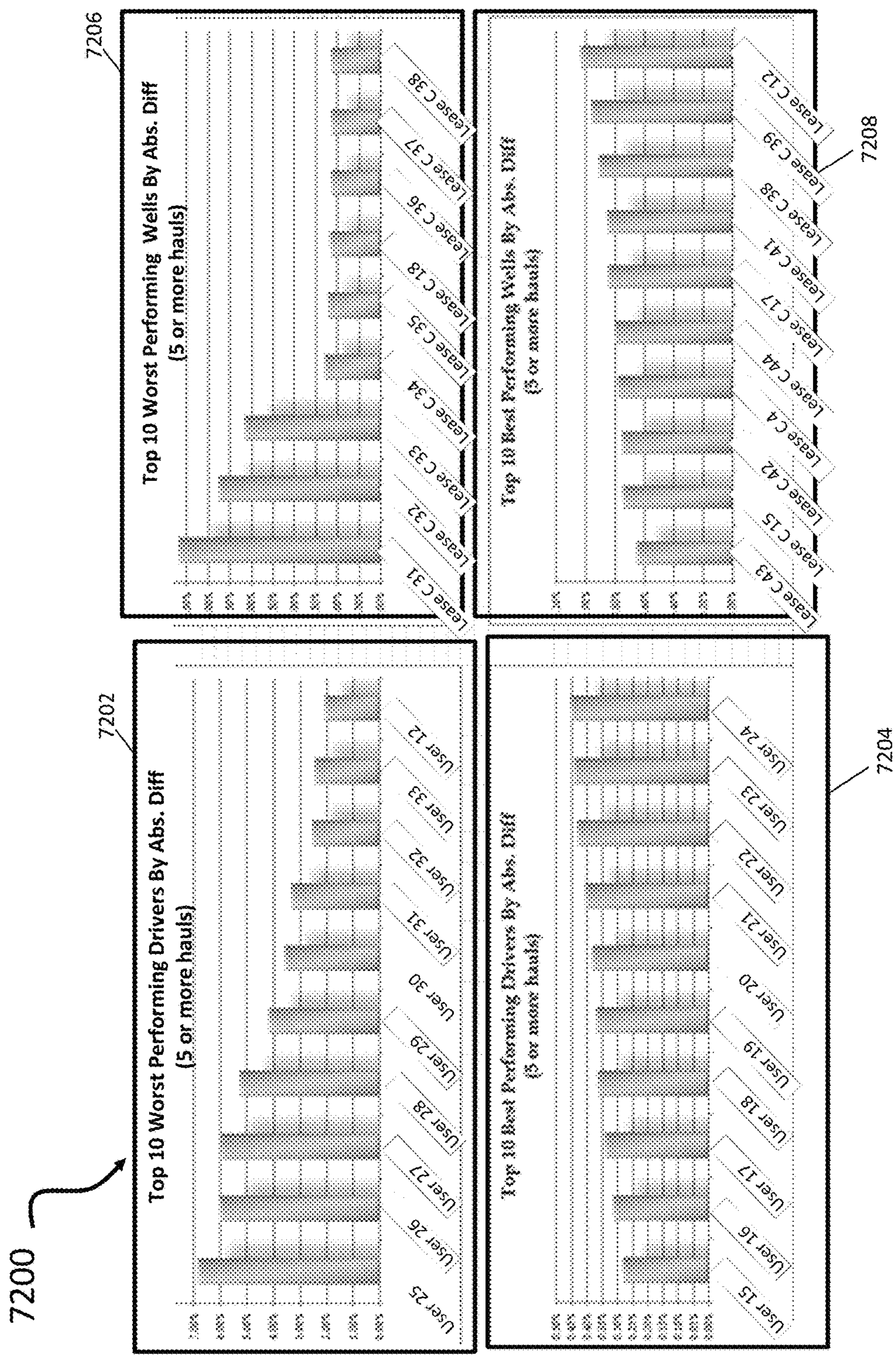

FIGS. 72-77 illustrate example reports and graphs for data analytics. For example and as shown in FIG. 72, graphs 7202 and 7204 represent the top ten worst performing drivers and the top best performing drivers, respectively. The information associated with graphs 7202 and 7204 is reflective of absolute differential and in connection with information that is processed, such as shown and described in connection with the example flowchart in FIG. 71. Moreover, graphs 7206 and 7208 represent the top ten worst performing drivers and the top best performing wells, respectively. As with graphs 7202 and 7204, graphs 7206 and 7208 is reflective of absolute differences and in connection with information that is processed, such as shown and described in connection with the example flowchart in FIG. 71. Processed information, such as in connection with such graphs is represented in table 7300 (FIG. 73).

Figure 74:
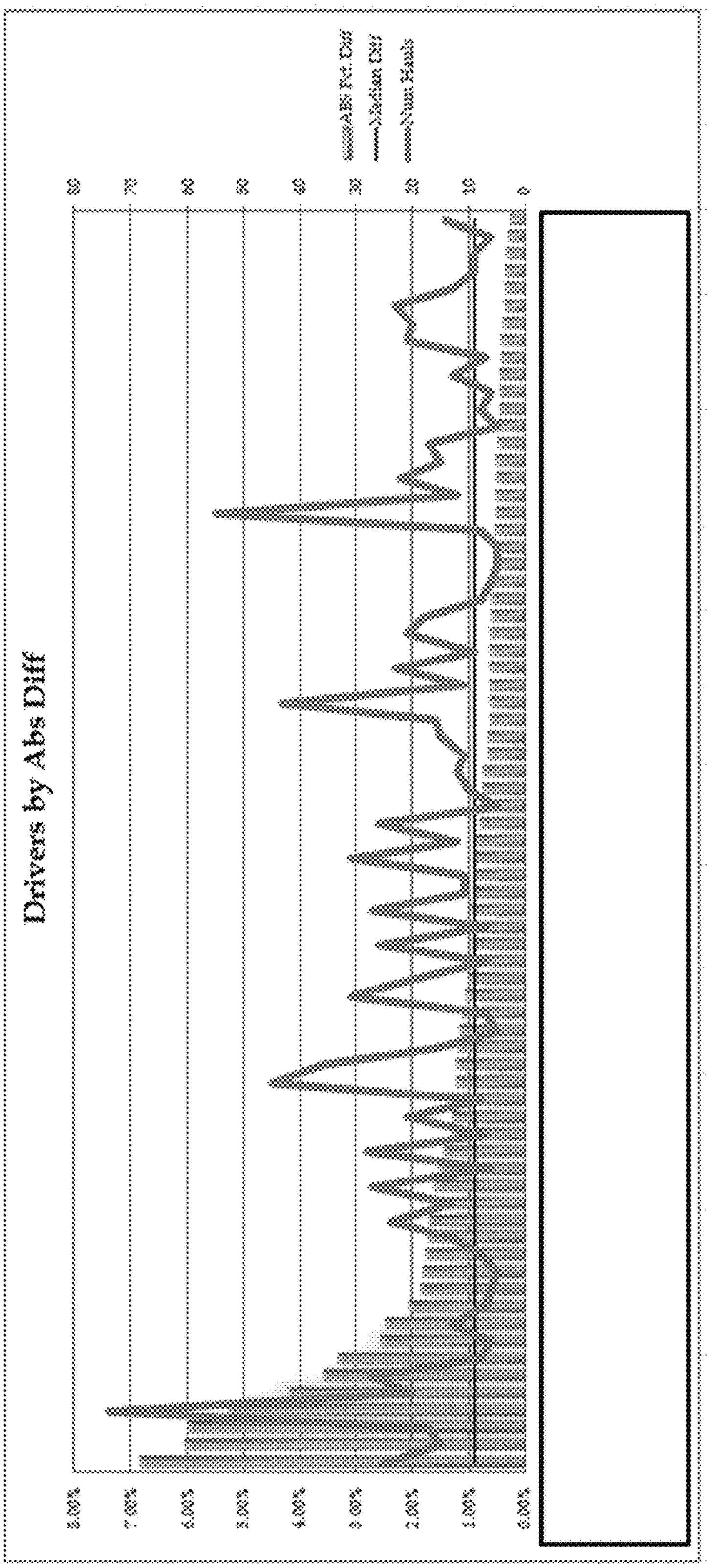
Figure 75:
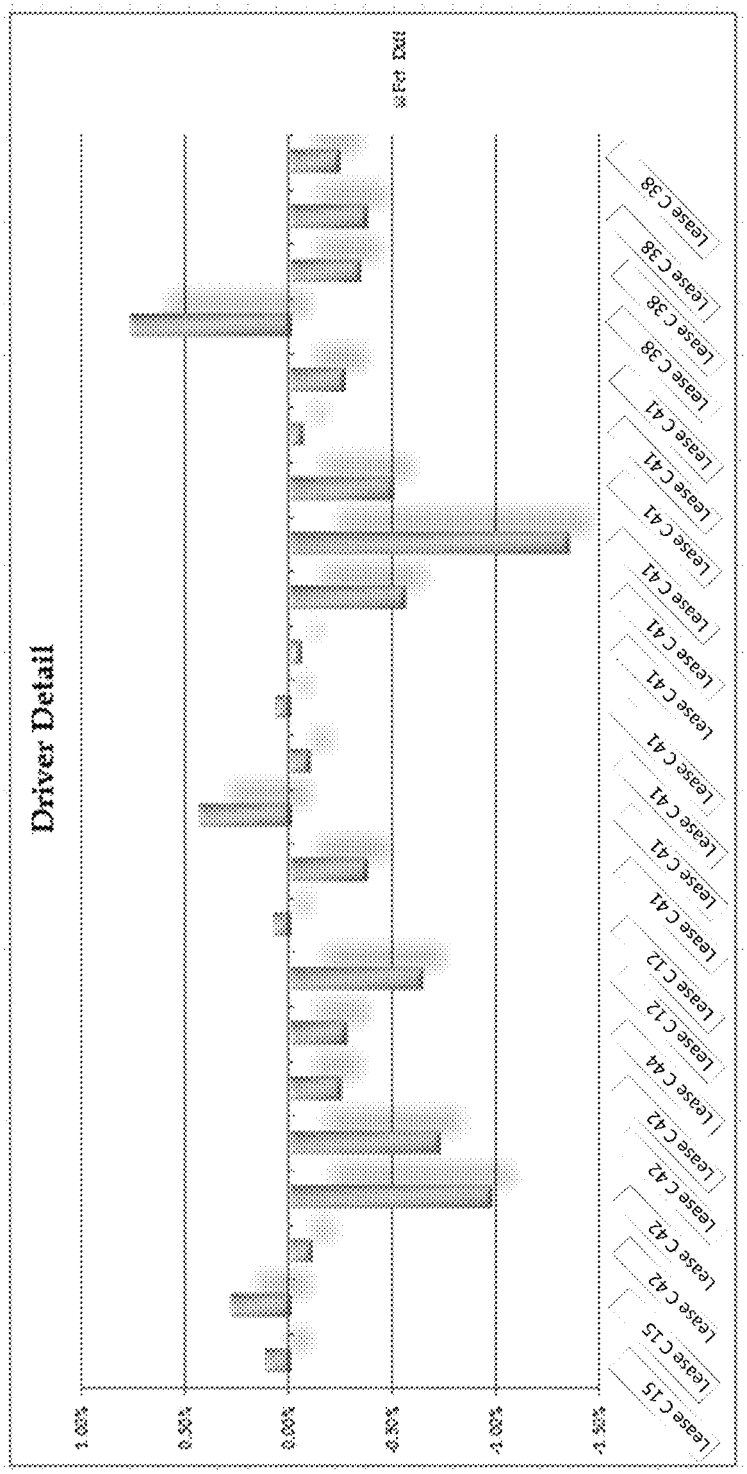
Figure 77:
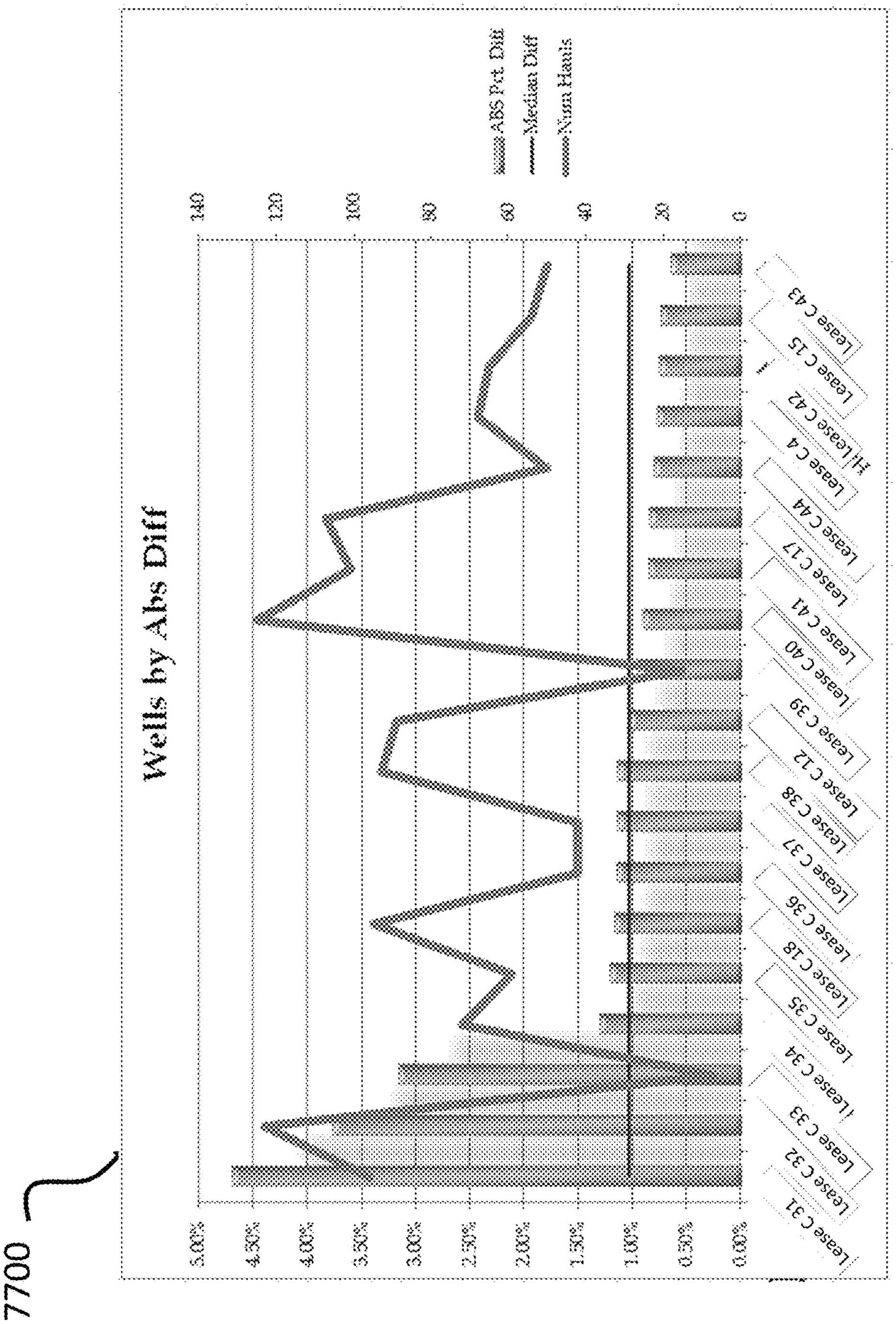

FIG. 74 illustrates an example graph 7400 that represents information for a plurality of drivers, and includes a bar chart showing ABS percentage differences, and line graphs representing a median difference and the number of hauls per driver. FIG. 75 illustrates an example graph 7500 that represents information for a single driver over a plurality of source locations (e.g., oil wells). The graph 7500 identifies driver details of actual percentages by source location. FIG. 76 illustrates an example graph 7600 that represents percentage differences for a plurality of drivers for a single source location. In the example graph 7600, drivers are identified that are each performing at a loss (e.g., losing barrels of oil). The values reflected in the graph 7600 can be identified as percentage differences that either positive or negative. The select sample of drivers in graph 7600 happen to be all operating a loss, i.e., having negative percentages for the given source location. FIG. 77 illustrates an example graph 7700 that represents information for a plurality of wells, and includes a bar chart showing ABS percentage differences, and line graphs representing a median difference and the number of hauls per well.

Thus, the present application provides for processing of accurate data and convenient forms of output that represent results of complex data analysis of individual and group performance. For example, hauling companies can access concise and accurate information on their drivers that would otherwise not be available, for example, due to the disparate sources and nature of the information. Producers can be provided information representing, for example, amount of a commodity that has been produced, draws on inventory or the like. Haulers can be provided information that can include, for example, individual driver performance, quantities of a commodity (e.g., barrels of oil) that are picked up, hauled and/or delivered. The teachings herein provide for processing of complex information that enables sharing of such information, including at a granular and meaningful level.

Figure 78:
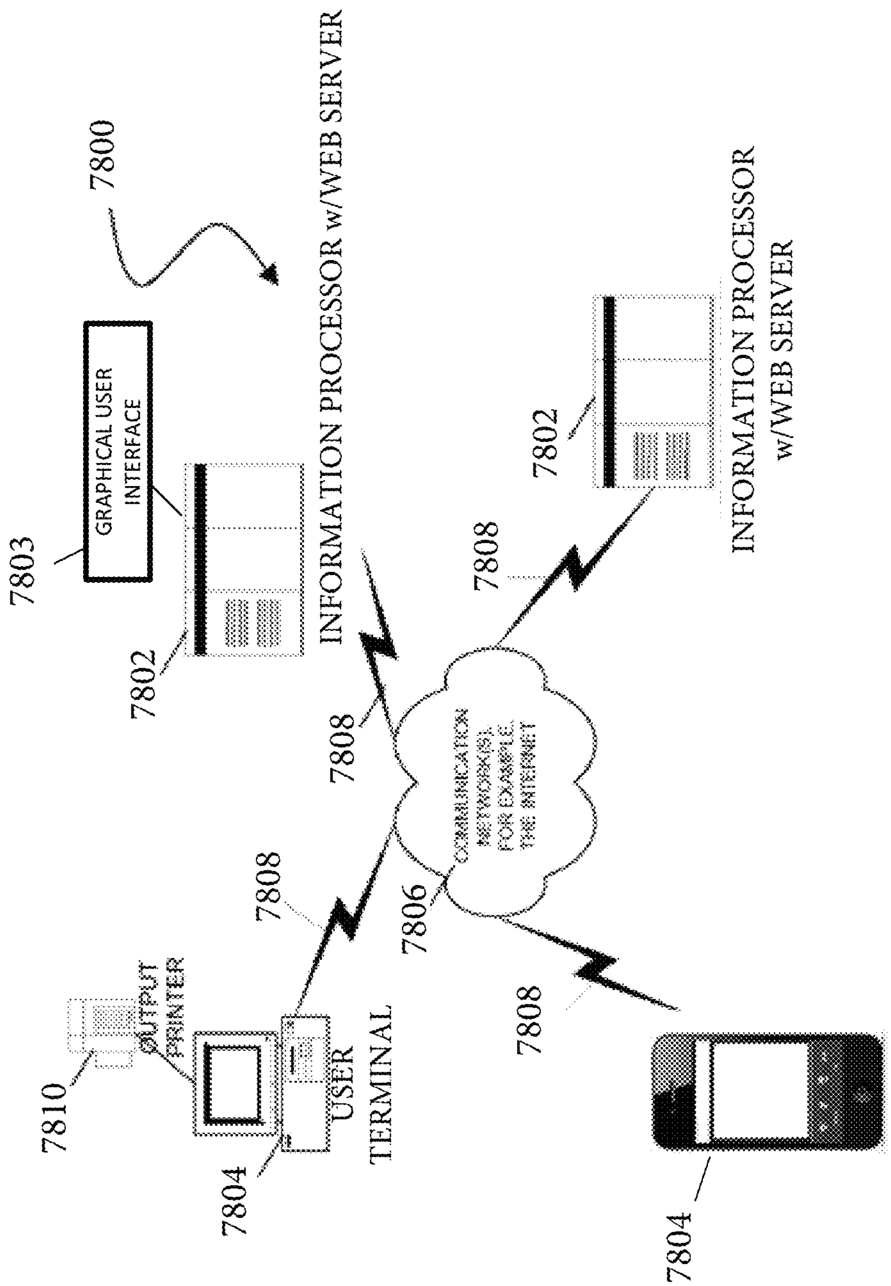
FIG. 78 is a block diagram of an example hardware arrangement that operates for providing the systems and methods disclosed herein, in accordance with one more implementations of the present application.

FIG. 78 is a block diagram of an example hardware arrangement that operates for providing the systems and methods disclosed herein, and designated generally as system 7800. System 7800 is preferably comprised of one or more information processors 7802 coupled to one or more user workstations 77804 across communication network 7806. User workstations may include, for example, mobile computing devices such as tablet computing devices, smartphones, personal digital assistants or the like. Further, printed output is provided, for example, via output printers 7810.

Information processor 7802 preferably includes all necessary databases for the present invention, including image files, metadata and other information such as shown and described herein. However, it is contemplated that information processor 7802 can access any required databases via communication network 7806 or any other communication network to which information processor 7802 has access. Information processor 7802 can communicate with devices comprising databases using any known communication method, including a direct serial, parallel, USB interface, or via a local or wide area network.

User workstations 7804 communicate with information processors 7802 using data connections 108, which are respectively coupled to communication network 7806. Communication network 7806 can be any communication network, but is typically the Internet or some other global computer network. Data connections 7808 can be any known arrangement for accessing communication network 7806, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User workstations 7804 preferably have the ability to send and receive data across communication network 7806, and are equipped with web browsers to display the received data on display devices incorporated therewith. By way of example, user workstation 7804 may be personal computers such as Intel Pentium-class computers or Apple Macintosh computers, but are not limited to such computers. Other workstations which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106. Of course, one skilled in the art will recognize that wireless devices can communicate with information processors 7802 using wireless data communication connections (e.g., Wi-Fi).

According to an embodiment of the present application, user workstation 7804 provides user access to information processor 7802 for the purpose of receiving and providing information. The specific functionality provided by system 7800, and in particular information processors 7802, is described in detail below.

System 7800 preferably includes software that provides functionality described in greater detail herein, and preferably resides on one or more information processors 7802 and/or user workstations 7804. One of the functions performed by information processor 7802 is that of operating as a web server and/or a web site host. Information processors 7802 typically communicate with communication network 106 across a permanent i.e., unswitched data connection 7808. Permanent connectivity ensures that access to information processors 7802 is always available.

Figure 79:
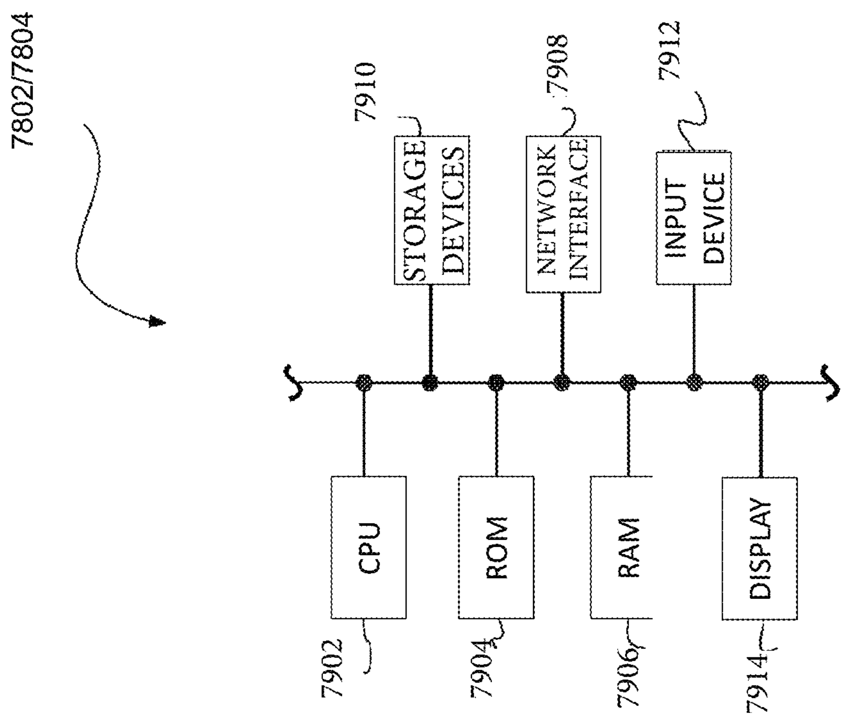
FIG. 79 is a block diagram illustrating example functional elements of an information processor and/or workstation.

As shown in FIG. 79 the functional elements of an information processor 7802 and/or workstation 7804 are shown, and preferably include one or more central processing units (CPU) 7902 used to execute software code in order to control the operation of information processor 7792, read only memory (ROM) 7904, random access memory (RAM) 7906, one or more network interfaces 7908 to transmit and receive data to and from other computing devices across a communication network, storage devices 7910 such as a hard disk drive, floppy disk drive, tape drive, CD-ROM or DVD drive for storing program code, databases and application code, one or more input devices 7912 such as a keyboard, mouse, track ball and the like, and a display 7914.

The various components of information processor 7802 need not be physically contained within the same chassis or even located in a single location. For example, as explained above with respect to databases which can reside on storage device 7910, storage device 7910 may be located at a site which is remote from the remaining elements of information processors 7802, and may even be connected to CPU 7902 across communication network 7806 via network interface 7908.

The functional elements shown in FIG. 79 (designated by reference numbers 7902-7914) are preferably the same categories of functional elements preferably present in user workstation 7804. However, not all elements need be present, for example, storage devices in the case of PDAs, and the capacities of the various elements are arranged to accommodate expected user demand. For example, CPU 7902 in user workstation 7804 may be of a smaller capacity than CPU 7902 as present in information processor 7802. Similarly, it is likely that information processor 7802 will include storage devices 7910 of a much higher capacity than storage devices 7910 present in workstation 7804. Of course, one of ordinary skill in the art will understand that the capacities of the functional elements can be adjusted as needed.

The nature of the present application is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, IOS, ANDROID, TORR and various web application development environments.

As used herein, references to displaying data on user workstation 7804 refer to the process of communicating data to the workstation across communication network 7806 and processing the data such that the data can be viewed on the user workstation 7804 display 7914 using a web browser or the like. The display screens on user workstation 7804 present areas within control allocation system 7800 such that a user can proceed from area to area within the control allocation system 7800 by selecting a desired link. Therefore, each user's experience with control allocation system 7800 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of control allocation system 7800.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Thus, the subject matter described above is provided by way of illustration only and should not be construed as limiting. Various modifications and changes can be made to the subject matter described herein without following the example embodiments and applications illustrated and described, and without departing from the true spirit and scope of the present invention.

What is claimed is:

1. A method for reconciling and associating electronic transport information associated with transport of a commodity and electronic destination information associated with a destination of the transported commodity, and generating, as a function of the association, output information that is usable by an external system, the method comprising:

normalizing, by at least one processor executing code, at least some of the electronic transport information and the electronic destination information, wherein each of the electronic transport information and the electronic destination information originates from a different respective computing device and is automatically imported by the at least one processor, further wherein the step of normalizing includes:

applying at least one rule to extract the at least some of the electronic transport information and the electronic destination information;

designating a respective document type for each of the electronic transport information and the electronic destination information, each document type associated with a respective corresponding document schema;

identifying at least the source of the electronic transport information to determine a first custom parser of a plurality of custom parsers for extracting the electronic transport information;

identifying at least the source of the electronic destination information to determine a second custom parser of a plurality of custom parsers for extracting the electronic destination information;

extracting, using the first custom parser, the electronic transport information and storing the extracted electronic transport information in a respective first document schema;

extracting, using the second custom parser, the electronic destination information and storing the extracted electronic destination information in a respective second document schema;

automatically executing, by the at least one processor, respective mapping rules contained in each of the respective first and second document schemas, wherein the mapping rules, when executed, enrich the electronic information in the respective first and second document schemas with additional information;

reconciling, by the at least one processor, the normalized and enriched electronic transport and destination information by:

comparing normalized and enriched information from any one document schema to normalized and enriched information from any other document schemas;

executing match rules to determine that at least some of the normalized and enriched information from the any one document schema is inside or outside of a pre-defined tolerance with respect to the normalized and enriched information in the any other document schemas; and associating, by the at least one processor, at least some of the normalized and enriched information in one of the document schemas with the normalized and enriched information in at least one other of the document schemas;

generating, by the at least one processor, output information to be used by an external system, wherein the generated output information includes at least some reference data received from the external system, and at least some information from the one of the document schemas and/or the at least one other of the document schemas; and transmitting, by the at least one processor, the generated output information to the external system.

2. The method of claim 1, wherein the at least some of the electronic transport information and the electronic destination information is received in a plurality of respective data formats.

3. The method of claim 1, further comprising transmitting, by the at least one processor, at least some of the normalized electronic transport information and electronic destination information to at least one external system.

4. The method of claim 3, wherein the external system includes at least one of a trade capture system, accounting system, inventory system, dispatching system, regulatory system executing on at least one computing device.

5. The method of claim 1, further comprising:

determining, by the at least one processor, an absolute differential of one transport and/or one destination;

comparing, by the at least one processor, the absolute differential of the one transport and/or one destination to a percentage value representing a plurality of sources, a plurality of transports and/or a plurality of destinations.

6. The method of claim 5, wherein the steps of determining and comparing occur as a function of a plurality of received, normalized and reconciled records.

7. The method of claim 6, wherein a report is generated that includes at least a graph representing one or more of the absolute differential and the comparison.

8. The method of claim 1, wherein the reconciliation can be formatted as a prompt for further processing.

9. The method of claim 1, wherein the mapping rules, when executed, augment and/or transform any of the electronic transport information and the electronic destination information.

10. A system for reconciling and associating electronic transport information associated with transport of a commodity and electronic destination information associated with a destination of the transported commodity, and generating, as a function of the association, output information that is usable by an external system, the system comprising:

non-transitory processor readable media;

at least one processor operatively coupled to the at least one processor readable media;

the non-transitory processor readable media having instructions for causing the following steps to be performed by the at least one processor:

normalizing, by at least one processor executing code in, at least some of the electronic transport information and the electronic destination information, wherein each of the electronic transport information and the electronic destination information originates from a respective computing device and is automatically imported by the at least one processor, further wherein the step of normalizing includes:

applying at least one rule to extract the at least some of the electronic transport information and the electronic destination information;

designating a respective document type for each of the electronic transport information and the electronic destination information, each document type associated with a respective corresponding document schema;

identifying at least the source of the electronic transport information to determine a first custom parser of a plurality of custom parsers for extracting the electronic transport information;

identifying at least the source of the electronic destination information to determine a second custom parser of a plurality of custom parsers for extracting the electronic destination information;

extracting, using the first custom parser, the electronic transport information and storing the extracted electronic transport information in a respective first document schema;

extracting, using the second custom parser, the electronic destination information and storing the extracted electronic destination information in a respective second document schema;

automatically executing, by the at least one processor, respective mapping rules contained in each of the respective first and second document schemas, wherein the mapping rules, when executed, enrich the electronic information in the respective first and second document schemas with additional information;

reconciling, by the at least one processor, the normalized and enriched electronic transport and destination information by:

comparing normalized and enriched information from any one document schema to normalized and enriched information from any other document schemas;

executing match rules to determine that at least some of the normalized and enriched information from the any one document schema is inside or outside of a pre-defined tolerance with respect to the normalized and enriched information in the any other document schemas; and associating, by the at least one processor, at least some of the normalized and enriched information in one of the document schemas with the normalized and enriched information in at least one other of the document schemas;

generating, by the at least one processor, output information to be used by an external system, wherein the generated output information includes at least some reference data received from the external system, and at least some information from the one of the document schemas and/or the at least one other of the document schemas; and transmitting, by the at least one processor, the generated output information to the external system.

11. The system of claim 10, wherein the at least some of the electronic transport information and the electronic destination information is received in a plurality of respective data formats.

12. The system of claim 10, wherein the non-transitory processor readable media further have instructions for causing the following steps to be performed by the at least one processor:

transmitting, at least some of the normalized electronic transport information and electronic destination information to at least one external system.

13. The system, of claim 12, wherein the external system includes at least one of a trade capture system, accounting system, inventory system, dispatching system, regulatory system executing on at least one computing device.

14. The system of claim 10, wherein the non-transitory processor readable media further have instructions for causing the following steps to be performed by the at least one processor:

determining an absolute differential of one transport and/or one destination;

comparing the absolute differential of the one transport and/or one destination to a percentage value representing a plurality of sources, a plurality of transports and/or a plurality of destinations.

15. The system of claim 14, wherein the steps of determining and comparing occur as a function of a plurality of received, normalized and reconciled records.

16. The system of claim 15, wherein a report is generated that includes at least a graph representing at least one of the absolute differential and the comparison.

17. The system of claim 10, wherein the reconciliation can be formatted as a prompt for further processing.

18. The system of claim 10, wherein the mapping rules, when executed, further cause the following steps to be performed by the at least one processor:

adding, augmenting and/or transforming any of the electronic transport information and the electronic destination information.

19. The method of claim 1, wherein none of the reference data is included in, the electronic transport information or the electronic destination information.

20. The system of claim 10, wherein none of the reference data is included in, the electronic transport information or the electronic destination information.

* * * * *